(12) United States Patent
Tuchman et al.

(10) Patent No.: US 8,533,857 B2
(45) Date of Patent: Sep. 10, 2013

(54) METHODS FOR PROVIDING CROSS-VENDOR SUPPORT SERVICES

(75) Inventors: Kenneth D. Tuchman, Cherry Hills Village, CO (US); Bruce A. Sharpe, Aurora, CO (US); Henry D. Truong, Chelmsford, MA (US); Alan B. Rahn, Highlands Ranch, CO (US)

(73) Assignee: TeleTech Holdings, Inc., Englewood, CO (US)

( * ) Notice: Subject to any disclaimer, the term of this patent is extended or adjusted under 35 U.S.C. 154(b) by 167 days.

(21) Appl. No.: 13/085,401

(22) Filed: Apr. 12, 2011

(65) Prior Publication Data

US 2012/0266258 A1   Oct. 18, 2012

(51) Int. Cl.
*G06F 17/30* (2006.01)
*G06F 15/16* (2006.01)
*G06F 7/00* (2006.01)
*G06Q 10/00* (2012.01)

(52) U.S. Cl.
USPC ............. 726/28; 709/203; 705/304; 707/603; 707/607; 707/687; 707/705

(58) Field of Classification Search
USPC .......... 726/28; 709/203; 705/304; 707/603, 707/607, 687, 705
See application file for complete search history.

(56) References Cited

U.S. PATENT DOCUMENTS

| | | | |
|---|---|---|---|
| 6,138,139 A | 10/2000 | Beck et al. | |
| 6,212,178 B1 | 4/2001 | Beck et al. | |
| 6,226,623 B1 | 5/2001 | Schein et al. | |
| 6,519,571 B1 | 2/2003 | Guheen et al. | |
| 6,690,788 B1 | 2/2004 | Bauer et al. | |
| 6,819,759 B1 | 11/2004 | Khuc et al. | |
| 6,934,381 B1 | 8/2005 | Klein et al. | |
| 6,988,126 B2 | 1/2006 | Wilcock et al. | |
| 7,162,451 B2 | 1/2007 | Berger et al. | |
| 7,165,213 B1 | 1/2007 | Busey | |
| 7,228,282 B1 | 6/2007 | Philyaw et al. | |

(Continued)

FOREIGN PATENT DOCUMENTS

| | | |
|---|---|---|
| WO | WO 2004/044708 A2 | 5/2004 |
| WO | WO 2008/084207 A1 | 7/2008 |

OTHER PUBLICATIONS

"Afaria OneTouch" iAnywhere Solutions, Inc., Dublin, California, 2005, 2 pages.

(Continued)

*Primary Examiner* — Aravind Moorthy
(74) *Attorney, Agent, or Firm* — Blakely Sokoloff Taylor & Zafman LLP

(57) ABSTRACT

According to one aspect, a first request is received at a services application programming interface (API) of a support center from a first user for a first product provided by a first client. A second request is received at the services API of the support center from a second user for a second product provided by a second client. A first knowledgebase (KB) associated with the first client and a second KB associated with the second client are identified. A third KB that contains information common to the first product and the second product is identified. The first KB and the third KB are enabled to be accessible by a first agent assigned to provide support services of the first product. The second KB and the third KB are enabled to be accessible by a second agent assigned to provide support services of the second product.

21 Claims, 45 Drawing Sheets

(56) References Cited

U.S. PATENT DOCUMENTS

| | | |
|---|---|---|
| 7,418,092 B2 | 8/2008 | Brown |
| 7,450,567 B1 | 11/2008 | Mamnani |
| 7,496,053 B1 | 2/2009 | Seabaugh |
| 7,506,257 B1 | 3/2009 | Chavez et al. |
| 7,558,382 B2 | 7/2009 | Torres et al. |
| 7,658,327 B2 | 2/2010 | Tuchman et al. |
| 7,746,362 B2 | 6/2010 | Busey et al. |
| 7,761,321 B2 | 7/2010 | Kannan et al. |
| 7,787,609 B1 | 8/2010 | Flockhart et al. |
| 2001/0053980 A1 | 12/2001 | Suliman et al. |
| 2002/0091607 A1 | 7/2002 | Sloan et al. |
| 2003/0009392 A1 | 1/2003 | Perkowski |
| 2004/0064351 A1 | 4/2004 | Mikurak |
| 2004/0245332 A1 | 12/2004 | Silverbrook et al. |
| 2005/0011957 A1 | 1/2005 | Attia et al. |
| 2006/0011716 A1 | 1/2006 | Perkowski |
| 2006/0116926 A1 | 6/2006 | Chen |
| 2006/0171402 A1 | 8/2006 | Moore et al. |
| 2006/0217113 A1 | 9/2006 | Rao et al. |
| 2006/0218061 A1 | 9/2006 | Mouline |
| 2007/0041523 A1 | 2/2007 | Paden et al. |
| 2007/0160188 A1 | 7/2007 | Sharpe et al. |
| 2007/0276722 A1 | 11/2007 | Silvera et al. |
| 2007/0293200 A1 | 12/2007 | Roundtree et al. |
| 2008/0005240 A1 | 1/2008 | Knighton et al. |
| 2008/0074264 A1 | 3/2008 | Sharpe et al. |
| 2008/0120129 A1 | 5/2008 | Seubert et al. |
| 2008/0140438 A1 | 6/2008 | Bares |
| 2008/0195659 A1 | 8/2008 | Rawle |
| 2008/0280588 A1 | 11/2008 | Roundtree et al. |
| 2009/0043669 A1 | 2/2009 | Hibbets et al. |
| 2009/0043882 A1 | 2/2009 | Hibbets et al. |
| 2009/0063175 A1 | 3/2009 | Hibbets et al. |
| 2009/0063260 A1 | 3/2009 | Hibbets |
| 2009/0063386 A1 | 3/2009 | Hibbets |
| 2009/0063635 A1 | 3/2009 | Pierce et al. |
| 2010/0030881 A1 | 2/2010 | Moreira Sa de Souza et al. |
| 2010/0145730 A1 | 6/2010 | Abreu |
| 2010/0205540 A1 | 8/2010 | Gupta et al. |
| 2011/0166904 A1 | 7/2011 | Arrowood et al. |
| 2011/0320277 A1 | 12/2011 | Isaacs |
| 2012/0002664 A1 | 1/2012 | Berk |
| 2012/0096523 A1* | 4/2012 | Ollila et al. .................... 726/5 |

OTHER PUBLICATIONS

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

International Search Report and Written Opinion mailed Dec. 18, 2012, for International Application No. PCT/US/12/33403, 9 pages.

* cited by examiner

| Channels / Entities | Voice | Email | Chat | ... | Web |
|---|---|---|---|---|---|
| Client Preference | No | Yes | No | ... | Yes |
| Customer Preference | Yes | Yes | Yes | ... | Yes |

FIG. 17

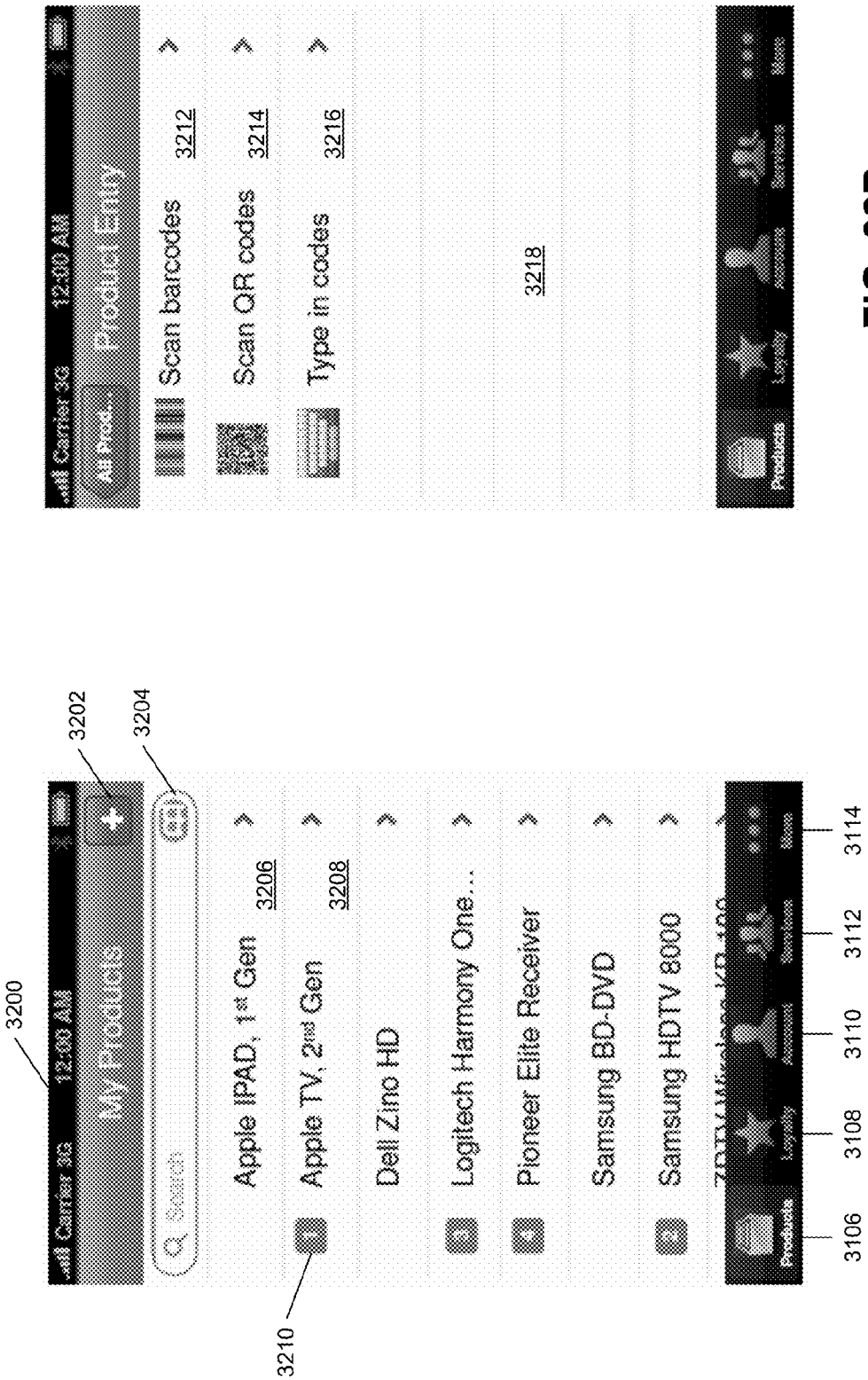

METHODS FOR PROVIDING CROSS-VENDOR SUPPORT SERVICES

RELATED APPLICATIONS

This application is related to the following co-pending U.S. patent applications:
U.S. patent application Ser. No. 13/085,397, entitled "One-Touch Platform for Product Registration and Support," filed Apr. 12, 2011;
U.S. patent application Ser. No. 13/085,398, entitled "One-Touch Support Services Application Programming Interfaces," filed Apr. 12, 2011;
U.S. patent application Ser. No. 13/085,399, entitled "Methods for Providing Dynamic and Proactive Support Services," filed Apr. 12, 2011;
U.S. patent application Ser. No. 13/085,404, entitled "Methods for Providing Support Services via an Available Communication Channel Based on User Preference and Client Preference," filed Apr. 12, 2011; and
U.S. patent application Ser. No. 13/085,406, entitled "Methods for Providing Self-Support Services Using Information from a Viral Source," filed Apr. 12, 2011.
The above-identified applications are hereby incorporated by reference herein.

FIELD OF THE INVENTION

Embodiments of the present invention relate generally to customer support services. More particularly, embodiments of the invention relate to methods for providing cross-vendor support services.

BACKGROUND

Prior to the advent and prolific use of distributed network environments such as the Internet, customer service sessions typically occurred over a teleconference between a customer service agent and a customer. These teleconferences, which incidentally are still very popular today, are initiated by a customer placing a phone call to a customer service agent. The customer service agent's phone receives the call through a public-switched telephone network (PTSN). Many call centers handle a large volume of inquiries, usually by phone, for sales, information, customer support and other services. Typical call centers provide the ability to route multiple incoming, customer-initiated calls to agents which provide sales, information, or support on behalf of an entity interested in establishing or maintaining a relationship with the customer.

Modern call center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls.

As the Internet is getting more popular, customer service providers now provide for computer-based customer service interaction by way of the World Wide Web. Instead of initiating a customer service session by using the phone, customers may access a website and engage in a web-based customer service session to make inquiries (e.g., technical support) and/or perform tasks (e.g., paying bills). Web-based customer service sessions offer numerous advantages over teleconference-based sessions. For example, the graphical user interface of web-based customer service applications permit customers to view illustrations or written explanations and thus ameliorate the miscommunications which may arise with oral conversations between a customer service agent and a customer.

Further, web-based customer service sessions enable a customer to directly target his/her needs on the website and thus reduce the time expended both in navigating through a series of vocal menu choices inapplicable to the consumer's particular needs and in waiting to speak to a service agent. Significantly, web-based customer service sessions are particularly cost-effective for the customer service provider given that fewer agents are required to communicate with customers. Indeed, customers are provided functionality for finding answers to their questions or performing tasks without any help from a live agent. These customer service sessions may be entirely computer-based or, alternatively, involve interaction with a customer service agent.

While there are advantages to performing customer service sessions over the web or other distributed network environments, there has been a lack of efficient platforms to take full advantage of today's technologies, particularly, the mobile technologies. In order to obtain customer support from a support center, the customer is still required to take many steps of manual processes such as a complicated process for registering a product. While there are many ways (e.g., email, chat, voice) to communicate between a customer and an agent, there has been a lack of an efficient mechanism to provide the customer the best available and cost effective communication channels to an agent.

In addition, the availability of information of a knowledgebase (KB) associated with a product of a vendor is limited to an agent who specifically handles that product for the vendor. Often a support issue of a product may involve multiple components from multiple vendors. There has been a lack of an efficient way to share certain knowledge across multiple vendors without jeopardizing the safety of confidential information of the vendors. Furthermore, a customer typically has to initiate a support call to the support center and the support center provides support services to the customer by responding to the support call. There has been a lack of an efficient way to provide proactive support services to a customer.

SUMMARY OF THE DESCRIPTION

According to one aspect of the invention, a first request is received at a services application programming interface (API) of a support center from a first user for support services of a first product provided by a first client of the support center. The support center provides support services for multiple products provided by multiple clients. A second request is received at the services API of the support center from a second user for support services of a second product provided by a second client of the support center. A first knowledgebase (KB) associated with the first client and a second KB associated with the second client are identified. A third KB that contains information common to the first product and the second product is identified. The first KB and the third KB are enabled to be accessible by a first agent assigned to provide support services of the first product to the first user without exposing the second KB to the second agent. The second KB and the third KB are enabled to be accessible by a second agent assigned to provide support services of the second product to the second user without exposing the first KB to the first agent. As a result, confidential information of the first KB of the first client and the second KB of the second client is not shared across different clients.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

FIG. 17 is an example of data structure illustrating available communication channels according to one embodiment of the invention.

FIGS. 32A-32F are screenshots representing examples of graphical user interfaces of a one-touch application according to another embodiment of the invention.

FIGS. 34A-34L are screenshots representing examples of graphical user interfaces of a one-touch application according to another embodiment of the invention.

DETAILED DESCRIPTION

Figure 1:
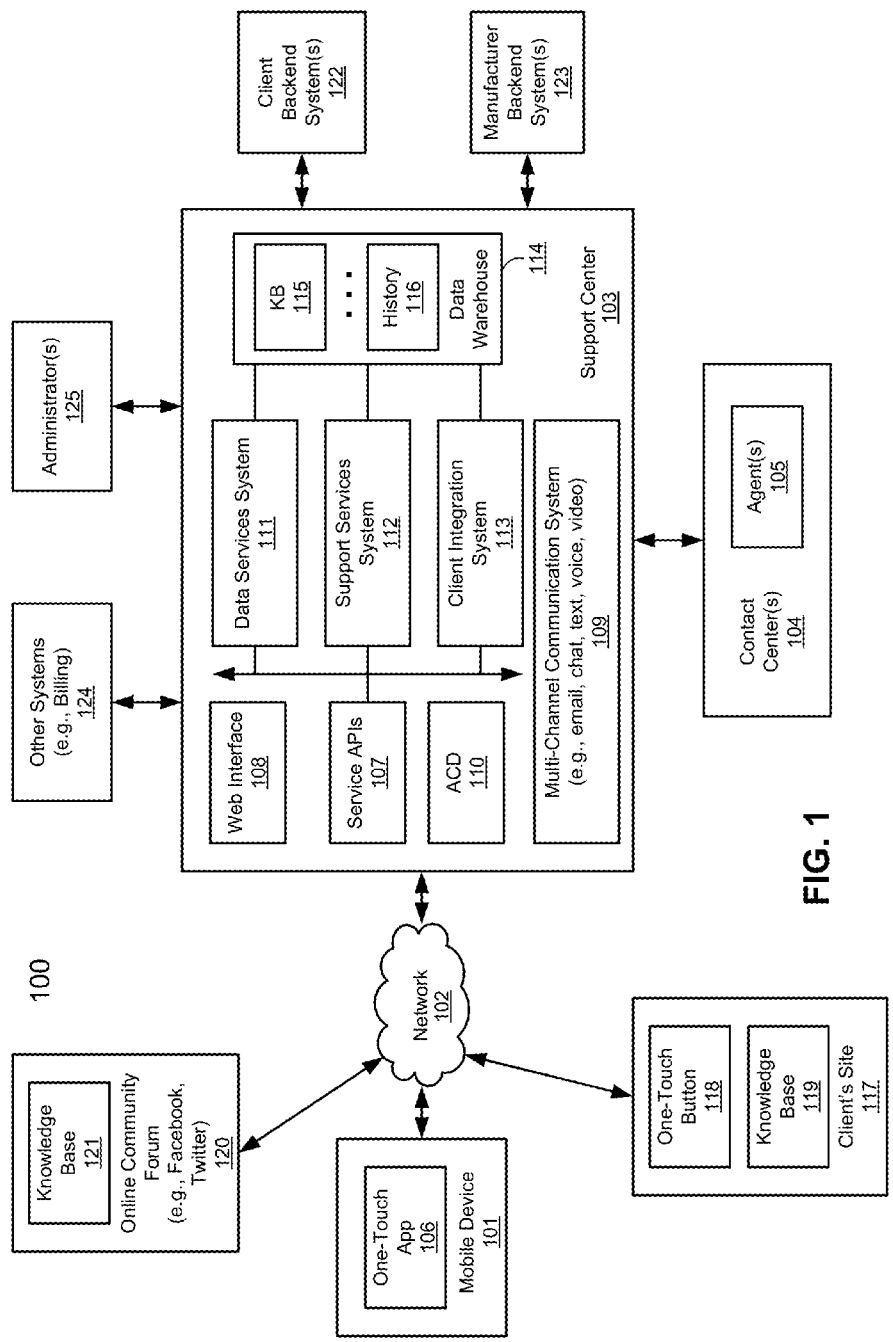
FIG. 1 is a block diagram illustrating a one-touch support service system according to one embodiment of the invention.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments of the invention, a one-touch application is installed on a mobile device of a customer or user, where the one-touch application can serve as a central service point to a support center that provides support services to a variety of products or services provided by a variety of vendors. The vendors can be, for example, the manufacturers, distributors, retailers, service brokers, purchasing houses, etc. of the products. Vendors may be the clients of the support center or entities having a business relationship with the support center. A user (also referred to herein as a customer) can activate the one-touch application from the user's mobile device to reach an agent, the support center, or a KB data center via a variety of communication channels or medias, such as, for example, email, chat, voice (including automated interactive voice recognition or IVR, voice over Internet protocol or VoIP), video, Web, and/or online community-based forum, etc.

According to one embodiment, an efficient registration mechanism is provided to allow a user to register a product with the support center in a simple and efficient way without having to specifically provide detailed information of the product. In one embodiment, a user can activate the one-touch application from a mobile device to transmit a machine-readable code that uniquely identifies a product to the support center, where the support center is configured to determine the product and a vendor (e.g., manufacturer or retailer) that provides the product based on the machine-readable code. For example, according to a particular embodiment, the user can use a scanner or camera of its mobile device to capture an image of a serial number or a universal product code (UPC) of a product and use the one-touch application to transmit the image to the support center using a variety of communication channels. As a result, the user does not have to specifically provide detailed product information for registration purposes. Subsequently, the user can activate or launch the one-touch application from the user's mobile device for support services of the registered product.

According to one embodiment, when a one-touch application is activated or launched from a mobile device by a user, the one-touch application is configured to communicate with a service application programming interface (API) of the support center. The service API invokes a security system to authenticate the user based on the information transmitted from the one-touch application without requiring the user to specifically provide user information. For example, according to one embodiment, the user may be authenticated based on a media access control (MAC) address or international mobile subscriber identity (IMSI) code of the mobile device associated with the user. Such information may have been previously provided to the support center when the user registered with the support center by installing the one-touch application on the user's mobile device.

Once the user has been authenticated, according to one embodiment, the service API transmits a list of one or more products that have been registered to the user. The list of the registered products may be displayed on a display of the mobile device, where each product is associated with one or more communication channels that are available for the user to contact an agent of the support center. In one embodiment, the availability of the communication channels is determined based on the user preference and the vendor preference at the point in time. Such user preference and vendor preference may be configured in a user profile and vendor profile, respectively, which may be maintained by the support center.

In response to a selection of one or more of the available communication channels received at the service API, according to one embodiment, a unique case identification (ID) is instantly created to uniquely represent a current instant of the support case. In addition, a touch plan is created and tracked by the unique case ID, where the touch plan represents a blueprint or outline of the corresponding support case. The touch plan is forwarded to an agent assigned to the current case and a communication session is established between the assigned agent and the user via the selected communication channel. The interaction between the user and the agent is logged and tracked based on the touch plan and the unique case ID, which may be stored in an interactive history database, for example, for subsequent analysis.

In some situations, according to one embodiment of the invention, the touch plan may include information that identifies a relationship between two products or services that have been purchased via a client (e.g., purchasing house). When a first product/service changes, the support center may determine that a second product/service may need to change as well based on the touch plan. Accordingly, the support center proactively notifies the user regarding the possible change of the second product/service and offers support services for the second product/service, without requiring the user to initiate a support call.

According to one embodiment, prior to contacting an agent, a list of support options may be presented to the user, including a link to a publication forum that may contain one or more solutions that the user is seeking. Such solutions may have been previously generated by extracting certain information from knowledgebase (KB) of a variety of informational sources, such as, for example, internal support KB, client/vendor KB, manufacturer KB, online community KB, and/or customer interactive history KB, etc. As a result, the user may find a solution from the publication forum and does not need to contact an agent of the support center, which in turn may lower the cost for the client.

System Overview

FIG. 1 is a block diagram illustrating a one-touch support service system according to one embodiment of the invention. Referring to FIG. 1, system 100 includes a mobile device 101 of a user, customer, or individual communicatively coupled to support center 103 over network 102. Note that the terms of "user," "customer," and "individual" are interchangeable terms throughout this application. Network 102 may be a packet switched network (e.g., local area network or LAN, metropolitan area network or MAN, a wide area network or WAN or Internet), a circuit switched network (e.g., public switched telephone network or PSTN), or a combination of both. Other network types such as wired or wireless networks for Internet telephony, cellular networks, unlicensed mobile access (UMA) networks, and the like may also be implemented. Mobile device 101 may be any kind of mobile devices including, but is not limited to, a laptop, mobile phone, tablet, media player, personal digital assistant or PDA, etc. Although one mobile device is shown in FIG. 1, multiple mobile devices from multiple users can also be applied. Other devices such as desktops or traditional analog phones may also be utilized by users to contact support center 103.

Support center 103 (also referred to as a customer service center or call center) may be implemented in a centralized facility or server. Alternatively, support center 103 may be implemented in multiple facilities or servers in a distributed manner (e.g., cloud-based service platforms). Support center 103 provides support services to a variety of products or services from a variety of clients or vendors. A client may be a manufacturer, a distributor, a retailer, a service provider or broker, a purchasing facility (e.g., Amazon™, Expedia™, or ISIST™), or a combination thereof. In one embodiment, support center 103 includes service APIs 107 to communicate with other systems such as mobile device 101, client's site 117, online community forum 120, contact center 104 including agents or experts 105, administrators 125, client backend system 122, manufacturer backend system 123, and other auxiliary systems 124 (e.g., billing system). Client backend system 122 and manufacturer backend system 123 may be implemented as a Web server or other types of servers using a variety of network connections or communication protocols. Support center 103 can handle service requests from customers of multiple clients. For example, a support center may handle customer service requests for a number of retail sales companies, sales calls for catalog sales companies, and patient follow-up contacts for health care providers. In such a structure, the support center may receive service requests directly from the customers or through client support management systems.

Support center 103 further includes data services system 111, support services system 112, and client integration system 113. Support services system 112 is responsible for handling support services requests from the users, including identifying and registering a product, creating an instance case context (also referred to herein as a touch plan), selecting and assigning a customer representative (also referred to herein as an agent or expert) to provide support services to the users, and managing work flows, etc. An agent may be selected based on a skill set or expertise of the agent, as well as other factors such as geographic location, of the agent. The term "agent" refers to support center personnel or a computerized application, in some cases, that respond to customer requests. An agent may be locally situated at the support center or remotely situated over a network.

Data services system 111 is responsible for managing and tracking data stored in data warehouse 114, including knowledgebase 115 and customer interactive history 116. Data services system 111 is also responsible for analyzing the data stored in data warehouse 114 and other informational sources (e.g., client backend system 122, manufacturer backend system 123, KB 121, and KB 119, etc.) to collect performance statistics or to generate some solution articles to be published in an online publishing forum for self-support purposes. Client integration system 113 is responsible for integrating support information and processes to be customized in a client hosted support environment such as client hosted site 117, which can be a Web site or other servers using a variety of network connections and/or communication protocols. The term "client" refers to an entity interested in establishing or maintaining a relationship with the customer, on whose behalf the support center processes support services requests.

Support center 103 further includes Web interface 108 to allow a user or client to access certain functionalities or resources of support center 103 over the Internet, such as information stored in data warehouse 114 (e.g., knowledgebase 115). For example, Web interface 108 may allow a user to browse or search information stored in KB 115 or alternatively, to allow an administrator to configure certain settings of a client (e.g., business rules of the client). Support center 103 further includes a multi-channel communication system 109 to provide one or more communication channels to any user or client to substantially concurrently access support center 103. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that multi-channel communication system 109 may be fully or partially integrated with support center 103 or alternatively, it may be maintained or provided by a third party or partner (e.g., communicatively coupled via service API 107 over a network).

Support center 103 further includes an automatic caller distribution (ACD) system 110 to receive, route, and manage voice calls exchanged via multi-channel communication system 109. An ACD is a device that handles incoming and outgoing call volume, from, and to the customers. It sends a call to a selected or first available customer representative and if all the customer service representatives are busy, plays a recorded message and puts calls in a queue until a customer representative becomes available. When a customer calls into the customer service center, the ACD distributes the incoming calls between various customer service representatives in a manner that ensures that the customer is connected to the correct representative in minimal time. The ACD keeps track of the estimated wait time of each queue of customers. The estimated wait time for an incoming call is the time for which the customer has to wait until he/she is connected with a customer representative at the customer service center.

A customer can obtain support services from support center 103 via a variety of communication mechanisms. A customer can initiate a support request to contact a live agent such as agents 105 in a live manner. Alternatively, a customer may browse certain knowledgebase, such as KB 115 via Web interface 108 or KB 119 via client's site 117, in an attempt to find a solution to a problem of a product he/she purchased from a manufacturer via a client of support center 103. A knowledgebase stores technical manuals and technical information. In addition to this, the knowledgebase may store certain automated responses and information related to general queries from the customers. Further, the knowledgebase may store details of interactions occurring between each customer and the support center, for a certain period of time. The interaction may include placing a request or a posted query through email or a query entered to search for information in the knowledgebase. Further, the responses sent to the customers through emails may be stored in the knowledgebase.

In one embodiment, when browsing a knowledgebase on a Web forum, a one-touch button such as one-touch button 118 may be provided to allow a customer to initiate a support service request to reach an agent of support center 103 or an agent of the corresponding Web site. In this configuration, live support may be a fee-based or subscription-based support service. Furthermore, a customer may also access KB 121 of online community discussion forum 120, such as Facebook™, Twitter™, or Youtube™, to obtain an answer or solution to its problem.

According to one embodiment, one-touch application 106 is installed on mobile device 101 of a customer or user, where one-touch application 106 can serve as a central service point to support center 103 that provides support services to a variety of products or services provided by a variety of vendors. The vendors can be, for example, manufacturers, distributors, retailers, service brokers, purchasing houses, etc. of the products. Vendors may be the clients of support center 103 or entities having a business relationship with support center 103. A user (also referred to herein as a customer) can activate one-touch application 106 from the user's mobile device 101 to reach agents 105 the support center 103 or KB data center 114 via a variety of communication channels or media, such as, for example, email, chat, voice (including automated interactive voice recognition or IVR, voice over Internet protocol or VoIP), video, Web, and/or online community-based forum, etc. One-touch application 106 can be a thin/thick client application or a Web-based application.

Note that a support center described throughout this application is not limited to a traditional support center or call center, nor is it implemented in a single physical location. A support center described herein represents a collection of service logic or providers communicatively coupled to each other over a network in a distributed or a cloud-based fashion.

The term of a support center herein represents any kind of service providers that provide a variety of services to customers or users. As described throughout this application, a support center can be a set of enabling cloud-based service APIs, which enable a variety of consumer product services and support offerings via an intelligent set of technologies providing automated and/or live communications. In one embodiment, services provided by a support center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via services APIs of the support center, without a need of a real person involved. Such processing logic and/or functional blocks can be implemented in software, hardware, or a combination thereof.

Figure 2:
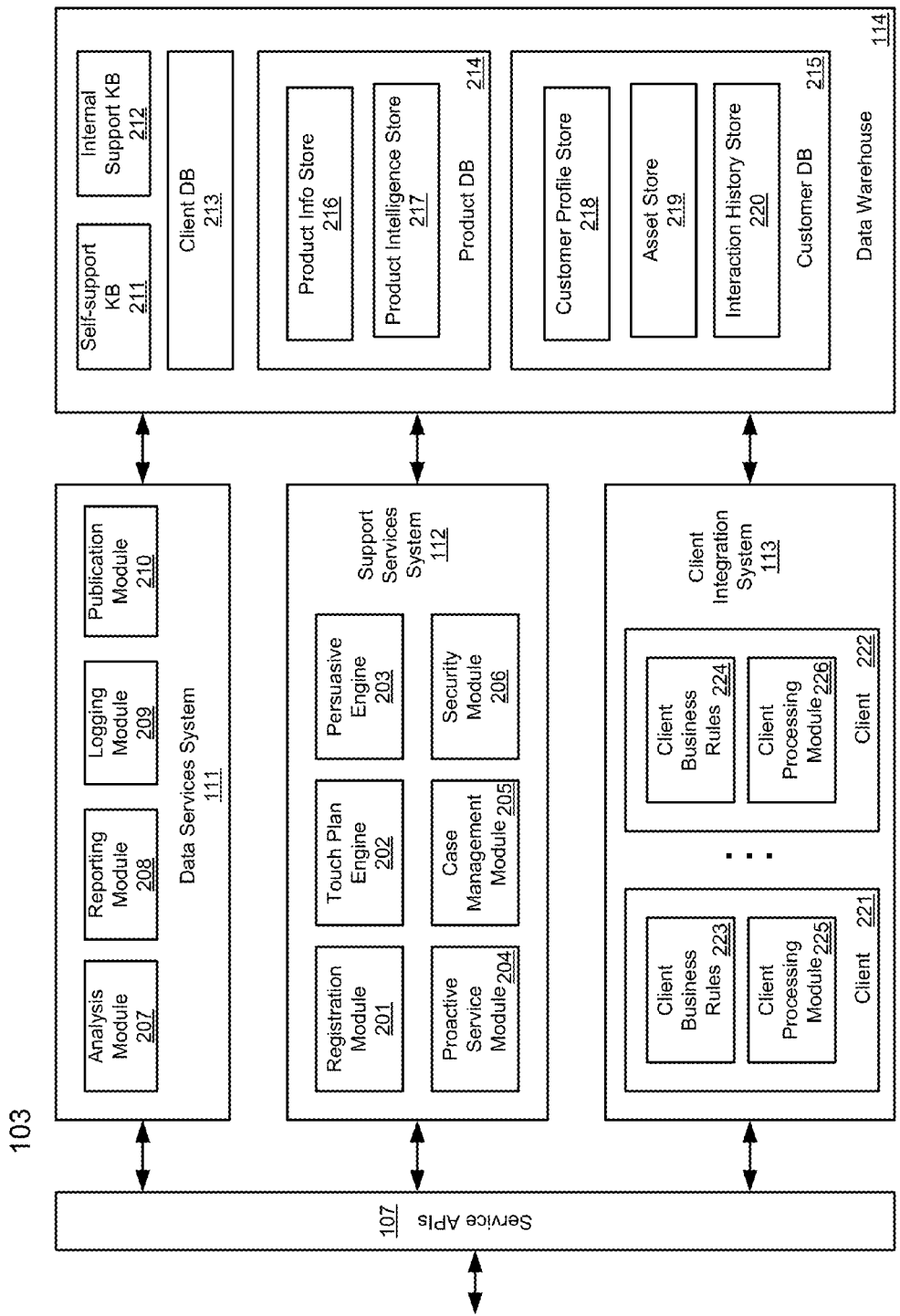
FIG. 2 is a block diagram illustrating an example of a support center according to one embodiment of the invention.

FIG. 2 is a block diagram illustrating an example of a support center according to one embodiment of the invention. For example, the system as shown in FIG. 2 may be implemented as a part of support center 103 of FIG. 1. Note that for purposes of illustration, certain reference numbers for components having the same or similar functionalities are maintained the same across different figures. Referring to FIG. 2, support services system 112 includes, but is not limited to, registration module 201, touch plan engine 202, persuasive engine 203, proactive service module 204, case management module 205, and security module 206. Data services system 111 includes, but is not limited to, analysis module 207, reporting module 208, logging module 209, and publication module 210. Note that components 201-210 are shown for illustration purposes only. They may be implemented in different configurations. Certain modules may be implemented as a single module or be integrated in other systems or components.

Data warehouse 114 includes, but is not limited to, self-support KB 211, internal support KB 212, client database (DB) 213, product database 214, and customer database 215. Internal support KB 212 may store any support information or communications between an agent and a customer. Self-support KB 211 contains published information extracted from other informational sources, such as internal support KB 212 and other systems (e.g., client backend systems 122 and manufacturer backend systems 123). Self-support KB 211 allows a customer to browse in an attempt to find a solution for the customer's problem, hopefully without having to contact a live support agent. Client database 213 may store any client related information, including a client profile for each client supported by support center 103. For example, client database 213 may store client's preference of communication channels to be utilized between a customer and an agent. Client database 213 may also contain membership information of the customers.

Product information store 216 may store any user manual or technical manual of products while product intelligence store 217 may store customer loyalty, rewards, or product rating information of the products. Product detailed information may further include complementary products and services, availability, etc. Such information may be drawn from external systems such as client's backend systems 122 and/or manufacturer's backend systems 123.

Customer profile store 218 may store any customer related information such as personal information (e.g., name, address, phone numbers, sex, age), security credential, device ID of its mobile device, etc. Customer asset store 219 may store any product that has been registered by a customer. Customer interactive history store 220 may store information regarding any interaction between a customer and an agent of previous support sessions, such as topics, detailed discussions, time of the discussions, contact mechanisms used, reasons of the support, products or services involved in the discussions, last agent or expert the customer interacted with, etc.

Other databases may also be included and utilized. For example, an agent or expert database may be maintained for the purpose of selecting an appropriate agent or expert in response to a support service from a customer. An agent and expert information database may include a profile for each agent or expert, respectively, that includes individual agent or expert identifier, individual name, address, communication device information, personal information (e.g., age, sex, hobbies, physical condition, spoken languages, ethnicity, geographic area of expertise, etc.), individual skills and/or areas of expertise. The agent/expert database may further include day(s) and time(s) during which and/or areas in which the agent/expert may be contacted to service customer contacts and/or a number of times over a selected period in which the agent/expert may be contacted to service customer contacts (e.g., similar to presence information).

In addition, a service statistics database may also be maintained. A service statistics database may represent any database that stores data related to the operation and management of the support center system 103. Data such as the number of customers in queue at a certain date and time, the duration of support contact in queue, the rate of contact abandonment, and the use of communication resources are stored in the statistics database. Note that the databases and data stores are shown and described for the purposes of illustration only. These databases and data stores can be implemented or configured in a variety of configurations, which may be implemented locally or remotely over a network. Note that some databases or data stores may be implemented as a single database or store or multiple databases or stores. For example, customer interactive history store 220 may be implemented as part of internal support KB 212.

In one embodiment, registration module 201 is responsible for registering a customer and/or a product of a customer, where the customer's personal information or preferences may be stored in customer profile store 218, while the registered product information may be stored in customer asset store 219 of customer database 215. For example, when a customer installs a one-touch application (e.g., one-touch application 106) on its mobile device, the customer typically performs an initial login to set up a user account, including a username and/or password, as well as customer's preferences (e.g., communication channel preferences). In one embodiment, registration module 201 can also be used to assist in registering a user for other accounts such as a loyalty account across one or more loyalty programs, a rewards program, etc. This information may be stored in customer profile store 218. In addition, a unique device ID such as a MAC address or IMSI code may be captured and stored in customer profile store 218. As a result, when the customer subsequently launches the one-touch application, the customer can be automatically authenticated by security module 206 based on this information without requiring the customer to provide the same information again.

According to one embodiment, when a one-touch application (e.g., one-touch application 106) is activated or launched from a mobile device by a user, the one-touch application is configured to communicate with service API 107. Service API 107 invokes security module 206 to authenticate the user based on the information (e.g., MAC or IMSI) transmitted from the one-touch application without requiring the user to specifically provide user information.

Once the user has been authenticated, according to one embodiment, service API 107 transmits a personalized page having a list of one or more products from customer asset store 219 that have been registered to the user. The list of the registered products may be displayed on a display of the mobile device, where each product is associated with one or more communication channels that are available for the user to contact an agent of the support center. In one embodiment, the availability of the communication channels is determined based on the user preference obtained from customer profile 218 and the client/vendor preference from client database 213 at that point in time. Such user preference and client/vendor preference may be configured in a user profile and client/vendor profile, respectively, which may be maintained by the support center.

In response to a selection of one or more of the available communication channels received at the service API, according to one embodiment, a unique case identification (ID) is instantly created by case management module 205 to uniquely represent a current instant of the support case. In addition, a touch plan is created by touch plan engine 202 and tracked by the unique case ID, where the touch plan represents a roadmap or outline of the corresponding support case activities to be performed throughout the life of the touch plan. The touch plan is updated regarding all activity of the user and is forwarded to an agent assigned to the current case and a communication session is established between the assigned agent and the user via the selected communication channel. Throughout the session the touch plan is updated on all activity between the user, agent and their respective applications.

An agent may be selected based on a variety of considerations, such as a skill set or expertise of the agent, as well as whether the agent has previous experience with the same customer. The touch plan may include one or more references linked with all the information related to the current instant support service, such as related product information, client information, customer information, and support history with the customer, etc., such that the agent can provide the best possible services to the customer. The touch plan may further include suggestion or prediction of products or services that the agent can provide the customer an alternative solution. The suggestion or prediction may be generated by persuasive engine 203 based on the product information and the customer's interactive history, etc. The interaction between the user and the agent is logged by logging module 209 and tracked based on the touch plan and the unique case ID, which may be stored in an interaction history database 220, for example, for subsequent analysis by analysis module 207.

Processing logic associated with the touch plan (e.g., touch plan engine, case management module, or some other logic) also monitors for positive and negative activities from the user, the agent and respective applications. If a negative event is occurring the processing logic can perform adjustments according to the touch plan in knowledge provided, agent scripting spoken to the user and many others in a manner such to turn the interaction positive (e.g., adapt to changing conditions and circumstances). If the activity is positive the processing logic can provide an additional activity in and around product or service upsell, cross sell, upgrades, and product sales, etc. The positive and negative activity monitoring and adjustments are not limited to a user and agent, they can support any form of interaction even long running interactions that exceed the user activity for any period of time.

In some situations, according to one embodiment of the invention, the touch plan may include information that identifies a relationship between two products or services that have been purchased via a client (e.g., purchasing house). When a first product/service changes, the support center may determine that a second product/service may need to change as well based on the touch plan. Accordingly, proactive service module 204 is configured to proactively notify the user regarding the possible change of the second product/service and offers support services for the second product/service, without requiring the user to initiate a support call. A suggestion or offer can be made to the customer by persuasive engine 203 based on the information obtained from databases 211-215 of data warehouse 114.

According to one embodiment, prior to contacting an agent, a list of support options may be presented to the user, including a link to a publication forum that may contain one or more solutions to a problem associated with the user. Such solutions may be generated by publication module 210 by extracting certain information from knowledgebase from a variety of informational sources, such as, for example, internal support KB 212, client/vendor KB (e.g., client database 213, client KB 119, and client backend system), manufacturer KB (e.g., product database 214 and manufacturer backend system), online community KB (e.g., KB 121), and/or customer interactive history KB 220, etc. As a result, a user may find a solution from the publication forum and does not need to contact an agent of the support center, which in turn may lower the cost for the client and/or the customer. This is also referred to as a call avoidance feature. Certain information from data warehouse 114 may be queried and reported by reporting module 208.

In one embodiment, client integration system 113 is responsible for integrating customized client data, which may be used by client's other systems such as client's own Web site (e.g., site 117). For each of clients 221-222 supported by support center 103, a set of one or more client business rules (e.g., rules 223-224) is provided and processed by client processing module (e.g., modules 225-226). These rules and processing modules may be provided by the client's developer and integrated with support center via an API (e.g., service API 107). The client business rules may further define one or more processes or methods that have been specifically tailored to certain clients' needs. These methods may be invoked by the associated touch plan under certain circumstances.

Note that components or modules shown in FIG. 2 are described for the purpose of illustration only; more or fewer components or modules may also be implemented. For example, a customer satisfaction system (CSAT) may also be implemented within support center 103. A CSAT system provides a feedback form to a customer, through a variety of communication channels at the completion of a request or a query made by the customer. The feedback form filled out and provided by customers is stored, reviewed, and analyzed by the CSAT system. All feedback forms stored in the CSAT system are used as a tool to conduct a customer service related survey. The feedback forms are, further used to enhance the service provided by support center 103.

In one embodiment, system as shown in FIG. 2 may be implemented as a part of the GIGAPOP™ system available from TeleTech Holdings, Inc. of Englewood, Colo. The GIGAPOP™ system, in embodiments, is a centralized datacenter facility for contact center specific technology. The GIGAPOP™ system, in embodiments, provides hosted interaction management technologies, including, but not limited to, chat and web collaboration support for agents engaged in providing customer service and sales support to retail store customers. Also, the GIGAPOP™ system includes interaction disposition data collection, data warehousing, reporting, and related systems. The GIGAPOP™ system coordinates communication with components of support center 103 and outside systems (e.g., backend systems 122-123).

Figure 3:
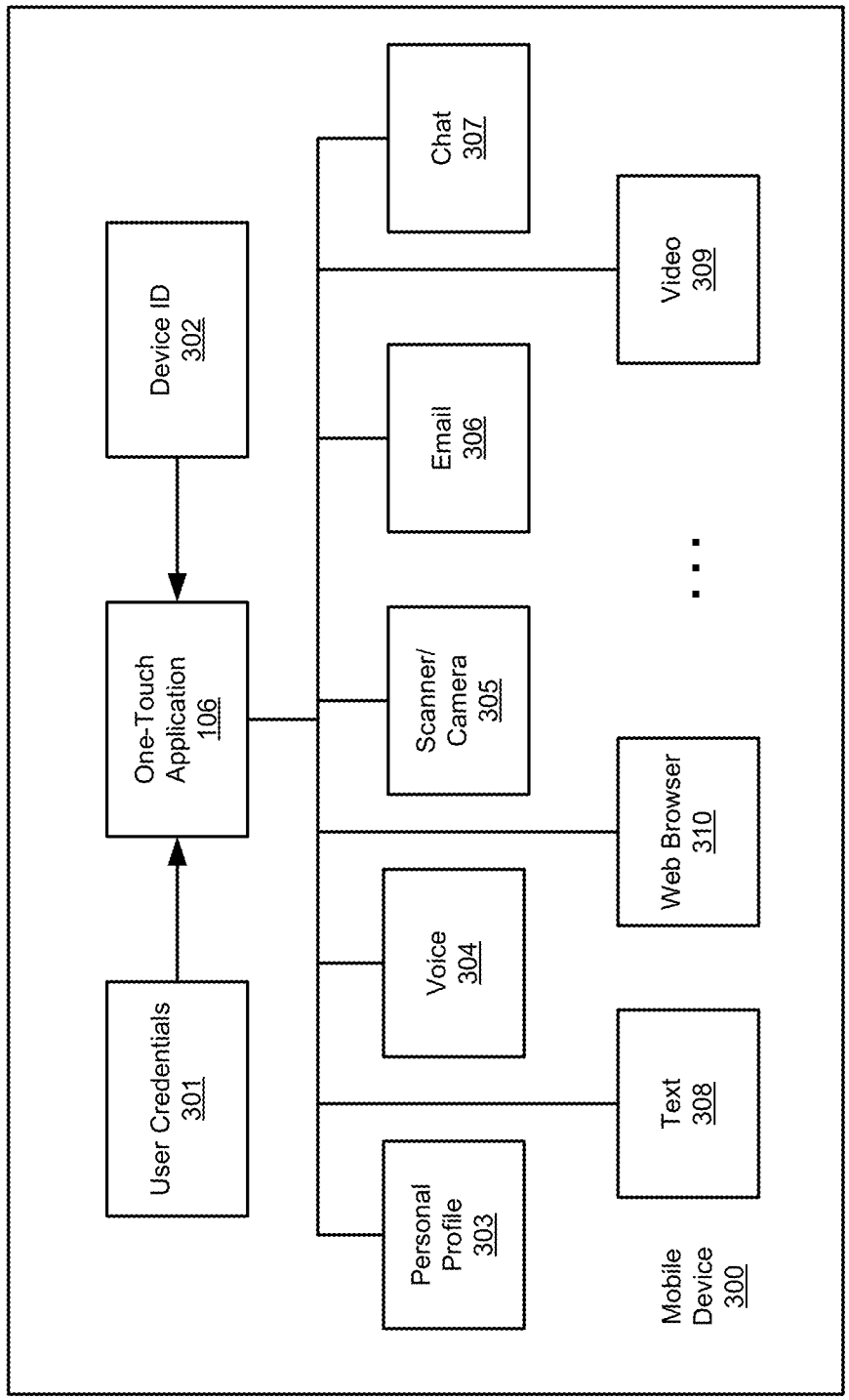
FIG. 3 is a block diagram illustrating an example of a mobile device according to one embodiment of the invention.

FIG. 3 is a block diagram illustrating an example of a mobile device according to one embodiment of the invention. For example, mobile device 300 may represent mobile device 101 of FIG. 1. Referring to FIG. 3, mobile device 300 includes, but is not limited to, one-touch application 106 communicatively coupled (e.g., via an API such as a plug-in interface) to a variety of communication client applications, such as, for example, voice application 304, scanner/camera application 305, email application 306, chat application 307, texting application 308, and video chat or conferencing application 309, etc. In addition, mobile device 300 includes a Web browsing application 310 to access the Web. Note that communication client applications 304-309 may be Web-based applications that can be accessed via Web browser 310. One-touch application 106 can also access user credentials 301 (e.g., username and password) and device ID 302 (e.g., MAC address or which can be used to authenticate a customer when accessing the support center. One-touch application 106 can also access and/or maintain personal profile 303 of the customer, which may contains certain personal information such as name, address, payment information, personal preferences, etc.

One-touch application 106 can be downloaded from an application store (e.g., iTune from Apple® Inc.) and installed on mobile device 300. One-touch application 106 may be specifically developed, configured, or tailored to a specific client of the support center. Alternatively, one-touch application 106 may be developed and maintained by the support center and capable of being configured to a variety of clients. As a result, a customer can use one-touch application 106 as a central or global services point to access the support center that provides support services to one or more products of the customer without the conventional unpleasant customer support experience.

Figure 4:
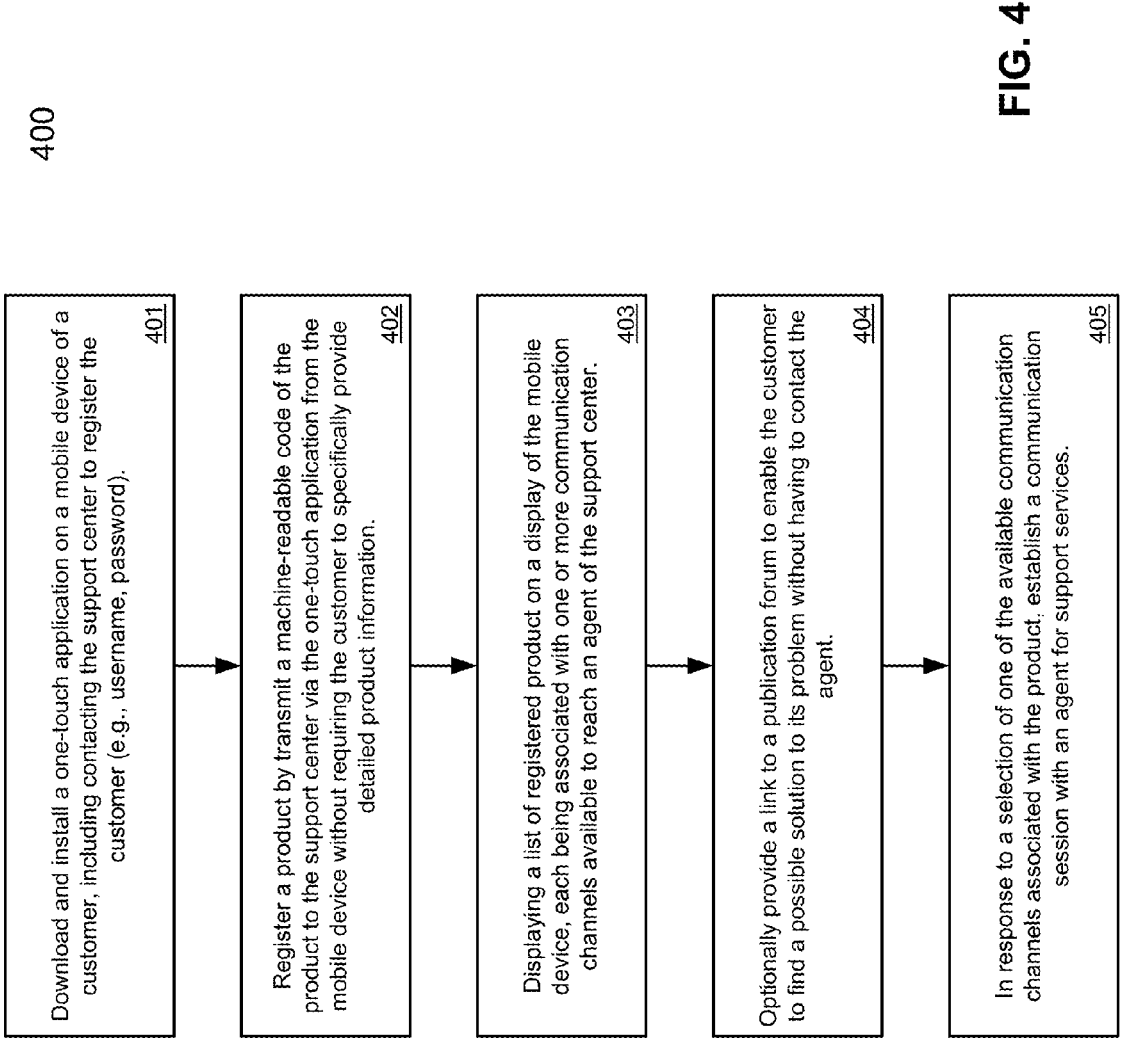
FIG. 4 is a flow diagram illustrating a method for providing customer support services according to one embodiment of the invention.

FIG. 4 is a flow diagram illustrating a method for providing customer support services according to one embodiment of the invention. For example, method 400 may be performed by system 100 of FIG. 1. Referring to FIG. 4, at block 401, a one-touch application is downloaded from an application store and installed on a mobile device of a customer. Once the one-touch application has been installed, the customer may initially launch the one-touch application to access the support center to set up a customer account and register the customer and/or its mobile device, including providing user credential (e.g., username and password) for login purposes. The one-touch application may also provide the support center a device ID that uniquely identifies the mobile device, such as, for example, a MAC address or IMSI code, which may be stored in a user profile (e.g., profile store 218) of the support center. Such information may be subsequently utilized to authenticate the customer and/or the mobile device automatically, without requiring the customer to specifically provide the same information for the purposes of authentication.

Once the one-touch application has been installed on the mobile device, at block 402, the customer can launch the one-touch application to access a service API of the support center over a network for login and to transmit a machine-readable code associated with a product to the support center for registering the product. The support center is able to compile all the necessary information including, but is not limited to, product information, client information, and customer information based on the machine-readable code, without requiring the customer to specifically provide the same information. The machine-readable code may represent at least one of a serial number, a UPC code, a QR code, or a high capacity color barcode (HCCB) of the product. Alternatively, the machine-readable code may represent an electronic receipt of a purchase order via a purchasing facility (e.g., Amazon™, Expedia™ and ISIS™). The machine-readable code may be obtained by scanning the code from the product using a scanner or camera of the mobile device or alternatively, electronically received from a client of the support center.

At block 403, the one-touch application can also retrieve information from the support center via the service API concerning all of the products associated with the customer that have been registered with the support center. The one-touch application is configured to display on a display of the mobile device a personalized page having a list of registered products. Each of the registered products may be associated with one or more communication channels that are available for the customer to initiate a contact with an agent of the support center. The availability of the communication channels may be determined and compiled based on the customer's preferences and the client's preferences.

Optionally, at block 404, a link to a self-support publication forum may also be presented to the customer to allow a customer to access certain published articles that may contain a solution to the customer's problem with the product, such that the customer does not have to contact a live agent for solving the same problem. This in turn may lower the support cost for the client and/or the customer as a live support service can be avoided. If the customer decides to contact a live agent, at block 405, the customer can select at least one of the available communication channels and a communication session will be established via the selected communication channel(s) between the customer and an agent that has been assigned to the instant support case. An agent may be selected based on a variety of considerations, such as its expertise or skill set, prior relationship with the customer, demographic location, language, or other factors.

Efficient Mechanism for Product Registration

As described above, a conventional method for registering a product requires a customer to specifically provide all the detailed information regarding the product. Such process is time consuming and sometimes discourages a customer from registering a product to begin with, which may lead to an unsatisfied customer. According to one embodiment, an efficient mechanism is provided for a customer to register a product in a simple way without the hassle of a conventional time consuming registration process.

Figure 5:
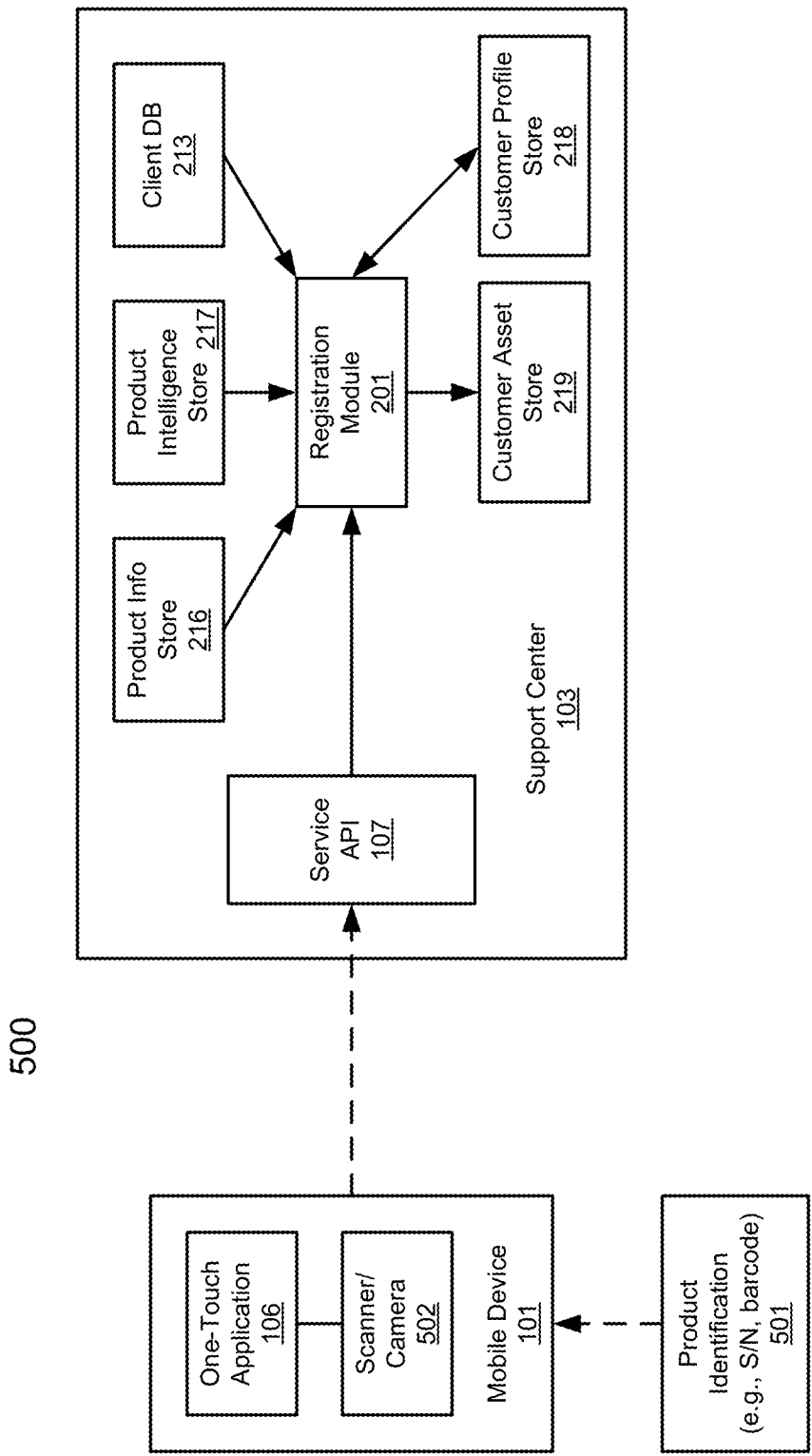
FIG. 5 is a block diagram illustrating a system for registering a product according to one embodiment of the invention.

FIG. 5 is a block diagram illustrating a system for registering a product according to one embodiment of the invention. For example, system 500 may be implemented as part of system 100 of FIG. 1. Referring to FIG. 5, mobile device 101 of a customer is communicatively coupled to support center 103 over a network. According to one embodiment, when the customer desires to register a product, the customer can scan a machine-readable code 501 of the product to obtain an image of the machine-readable code using scanner or camera

502 of mobile device 101. As described above, a machine-readable code may represent at least one of a serial number, barcode, UPC code, QR code, HCCB code, or an electronic receipt of a purchase order of a product.

The customer can then utilize one-touch application 106 to access support center 103 via service API 107. The customer and/or mobile device is authenticated by a security module (e.g., security module 206 of FIG. 2). The customer may be authenticated automatically by the security module based on the customer information previously provided during registration of the customer and/or mobile device 101, without having the customer to specifically provide detailed customer or mobile device information. For example, a customer may be authenticated by the customer's credentials such as username and password cached and automatically provided by one-touch application. Mobile device 101 may be authenticated or verified based on its unique device ID such as MAC address or IMSI code of mobile device 101.

Thereafter, according to one embodiment, one-touch application 106 is configured to transmit the machine-readable code to service API 107. The transmitted machine-readable code may be the actual machine-readable code converted from an image obtained from scanner or camera 502, for example, via an optical character recognition (OCR) process. OCR is the mechanical or electronic translation of scanned images of handwritten, typewritten or printed text into machine-encoded text. It is widely used to convert books and documents into electronic files, to computerize a record-keeping system in an office, or to publish the text on a website. OCR makes it possible to edit the text, search for a word or phrase, store it more compactly, display or print a copy free of scanning artifacts, and apply techniques such as machine translation, text-to-speech and text mining to it. Alternatively, one-touch application 106 will either locally translate the scanned image via the one-touch application on the mobile device thus sending the translated product information to the service API or simply transmits an image of the machine-readable code or an image of an electronic receipt to service API 107, where registration module 201 can process the translated image data or extract or invoke another process to extract the actual machine-readable code.

Based on the machine-readable code received from one-touch application 106, registration module 201 is configured to determine and compile all necessary information concerning the product and a vendor of the product (e.g., client). In one embodiment, registration module 201 accesses product information store 216 to obtain detailed product information and accesses client database 213 to obtain client information of a client from which the product was purchased based on the machine-readable code. Product information may be acquired via a combination of several methods, such as, for example, 1) licensed from a product data provider like CNET or other services where data will be provided in a self-hosted database and updated through a batch process on a pre-determined frequent basis in order to have the latest product information at hand; and 2) via an API call to a manufacturer database of products where the data is not provided via a service like CNET or others. The data is collected in a support center product database and enhanced with data necessary to provide services to a user via the service API.

In addition, registration module 201 can further determine and compile customer information from customer profile store 218 based on customer login and/or device identification information. The compiled information can then be stored in customer asset store 219. Further, registration module 201 may also compile and store in customer asset store 219 any product related information such as product rebates, product warranties, product ratings, support ratings information, for example, from product intelligence store 217. Such information may be obtained from client's backend system (s) and manufacturer's backend system(s). Furthermore, registration module 201 may also determine, for each registered product, a list of one or more communication channels that are available for the customer to reach an agent for support services of that particular product. The availability of the communication channels may be determined based on client's preference available from client database 213 and customer's preference available from customer profile store 219. Thus, customer asset store 219 is configured to store all of the products that have been registered by the customer. Such information may be subsequently presented to the customer when the customer launches the one-touch application from is mobile device and accesses support centre 103 via service API 107.

Figure 6:
FIG. 6 shows an example of products that have been registered by a customer and stored in customer asset store according to one embodiment of the invention.

FIG. 6 shows an example of a list of products that have been registered by a customer and stored in customer asset store 219. In this example, the products are related to an electronic device purchased from retailers or manufacturers. Referring to FIG. 6, the registered products can be arranged by retailer 601, manufacturer 602, products 603, and receipt 604, where retailer 601 and/or manufacturer may be clients of the support center. Note that a retailer and a manufacturer may be the same entity. In this example, when a customer registers products 608-609, the customer only needs to transmit a machine readable code of each product, such as at least one of machine-readable codes 605-606, respectively. The registration module is configured to obtain and compile the rest of the information, such as the manufacturers, retailers, including warranty information 610, etc. Alternatively, the customer can simply transmit an electronic receipt 604 having a receipt ID such as transaction ID 607 and based on transaction ID 607 of receipt 604, the registration module is capable of compiling the same information as shown in FIG. 6. As a result, the customer does not have to provide complicated detailed product information and retailer information for registering the products.

Figure 7B:
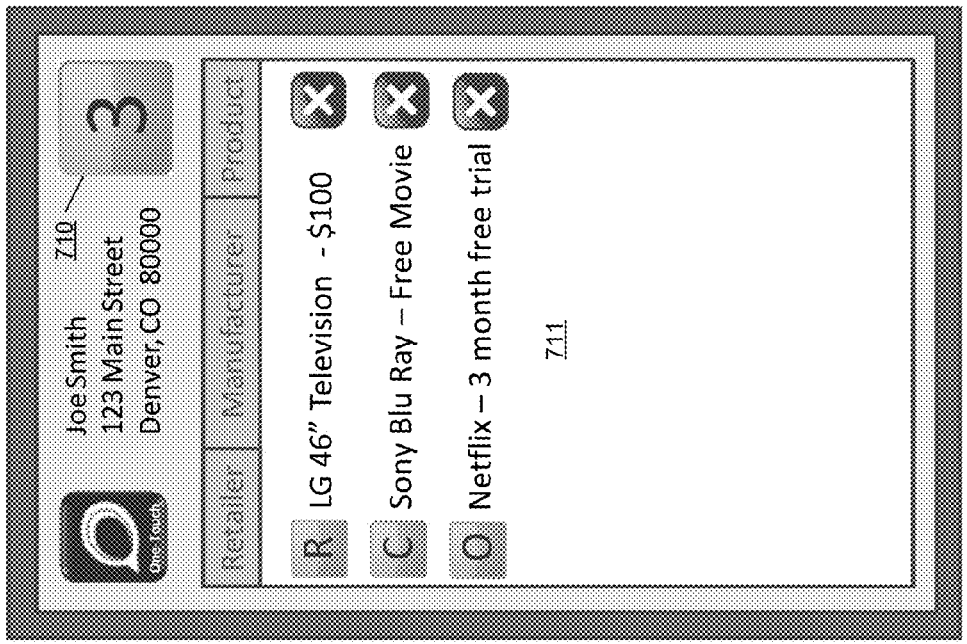
FIGS. 7A and 7B are screenshots illustrating graphical user interfaces of a one-touch application according to one embodiment of the invention.
Figure 7A:
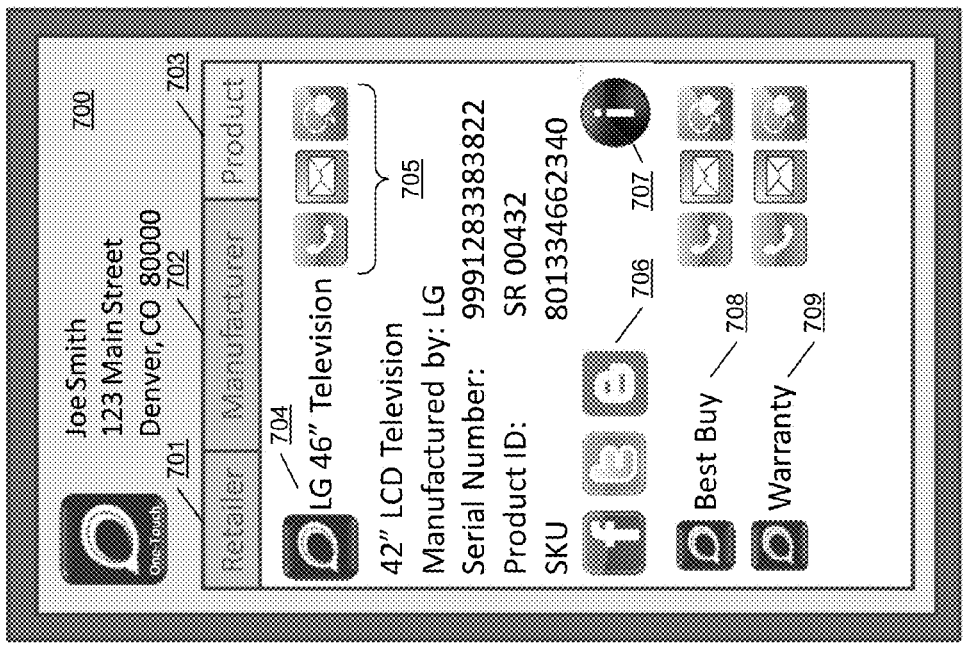

According to one embodiment, the information as shown in FIG. 6 can be retrievable, for example, by reporting module 208 of FIG. 2, transmitted to a customer, and displayed on a display of a mobile device of the customer. FIGS. 7A and 7B are screenshots illustrating a graphical user interface (GUI) of a one-touch application displayed on a display of a mobile device according to one embodiment of the invention. Referring to FIG. 7A, GUI 700 can display product information based on retailer 701, manufacturer 702, and actual product 703. When a user activates tab 703, detailed product information concerning one or more registered products, in this example, product 704, is displayed in GUI 700.

In addition, one or more communication channels 705 that are available to contact an agent are also displayed as graphical representations or icons thereof. In this example, the choices of voice, email and chat are available. The availability of communication channels 705 may be determined based on customer's preferences and client's preferences. A customer can select one or more of the available communication channels 705 to establish a communication session with an agent or expert. Furthermore, a customer can also access an online community forum to discuss with other users or agents or for self-support purposes via graphical representations 706.

If there is additional information available for the product, an icon 707 is displayed for indicating such a purpose. When a customer activates icon 707, more information concerning the product is displayed as shown in FIG. 7B. In this example, referring to FIG. 7B, rebates and free rewards are offered. A graphical representation 710 may be displayed indicating a number of the items available to be claimed. The additional information concerning the product may be obtained from product intelligence store 217 of FIG. 2. A customer may also access retailer 708 and warranty information 709 by activating the respective graphical representation.

Figure 8:
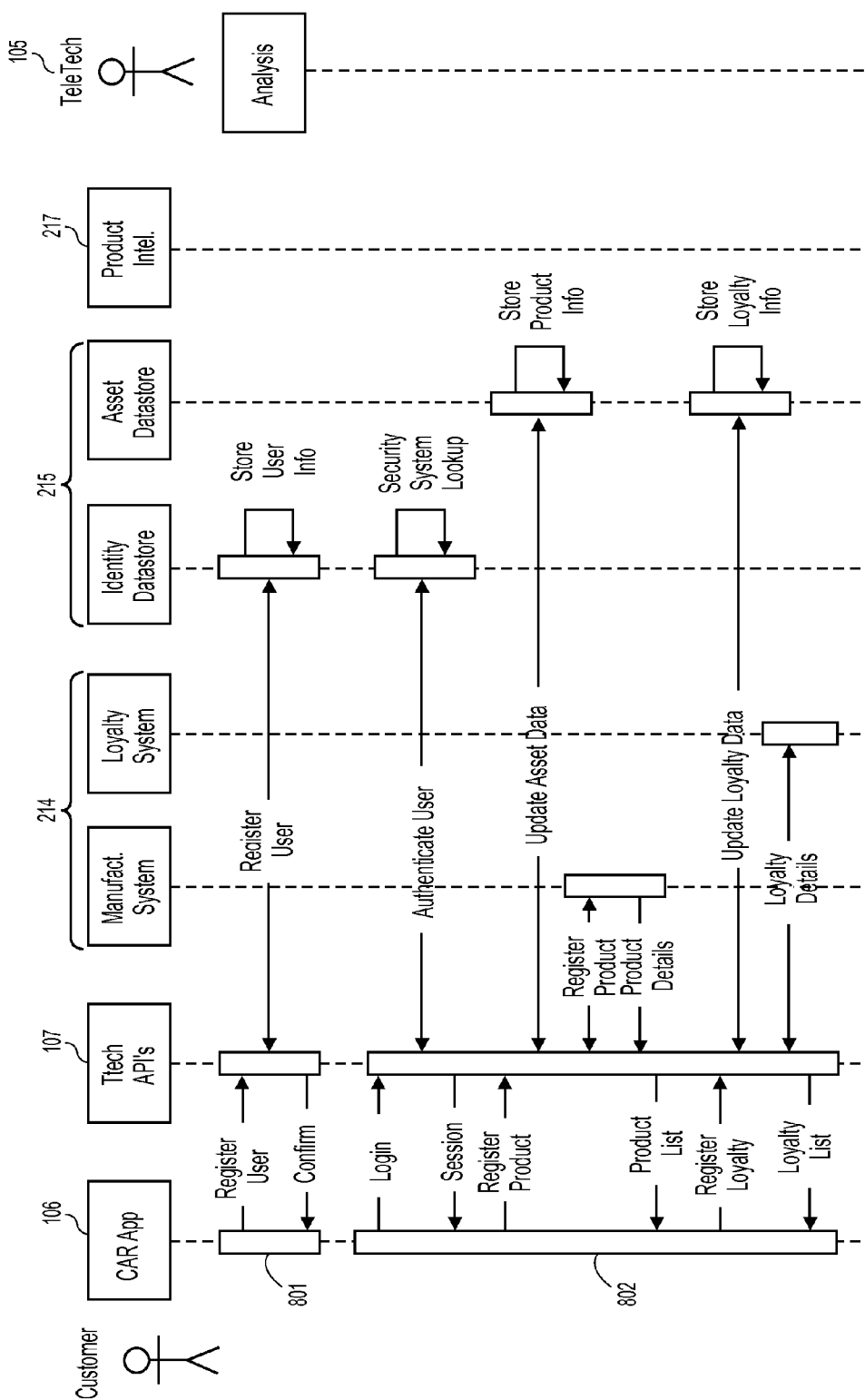
FIG. 8 shows transaction flows among certain components of a support center for registering a product according to one embodiment of the invention.
Figure 8:
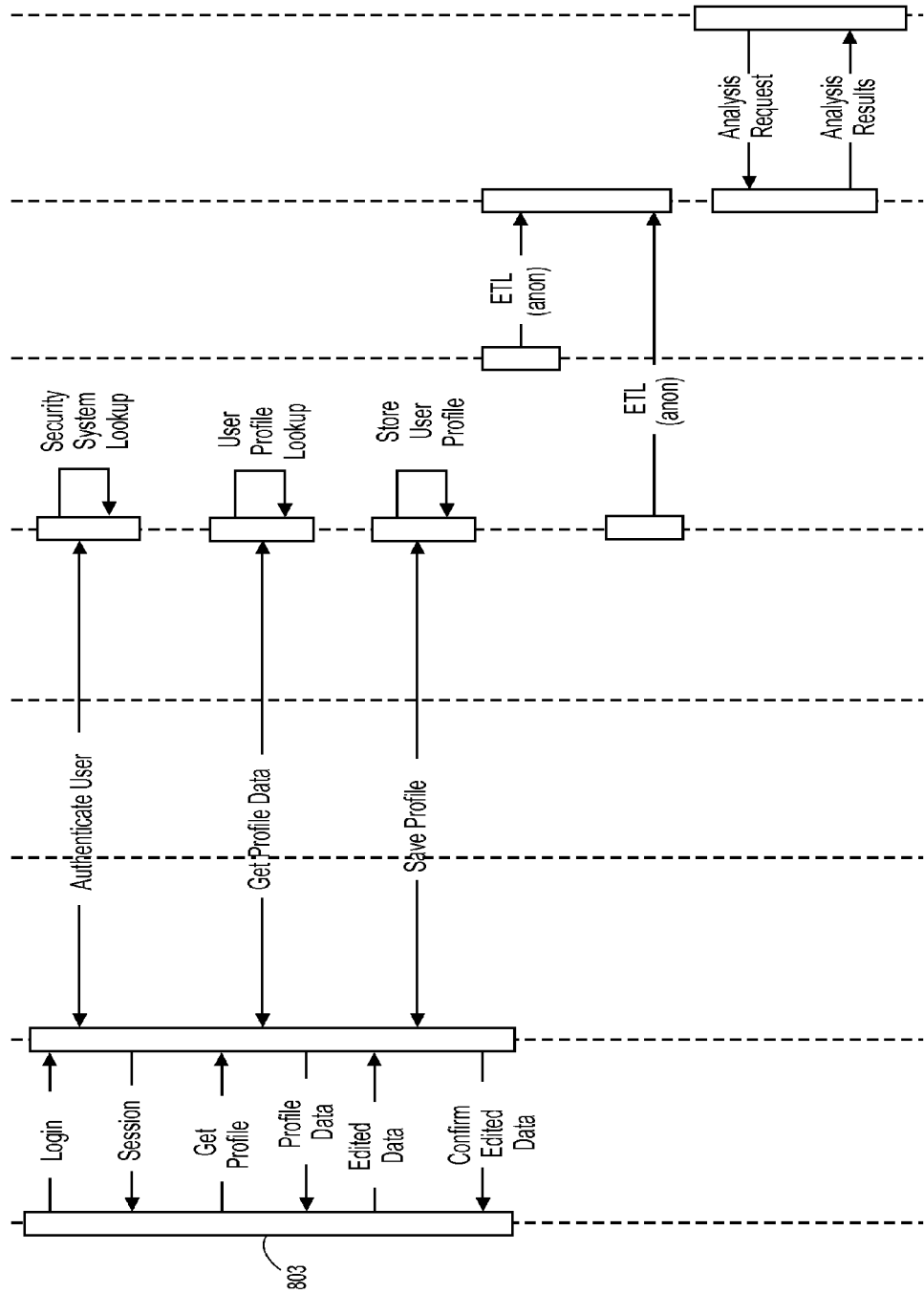

FIG. 8 shows transaction flows among certain components of a support center for registering a product according to one embodiment of the invention. Referring to FIG. 8, initially during transactions 801, a user or customer downloads and installs one-touch application 106 onto the customer's mobile device. One-touch application 106 communicates with service API 107 to perform an initial login process at the support center, including creating a user account with proper username and password. In addition, a device ID such as MAC address and IMSI code may also be captured to authenticate the mobile device. The user information and the device information may be stored in an identity store of customer DB 215. Subsequently, during transactions 802, the user can log in and be authenticated by a security module based on the user information and device information stored in customer DB 215. Once the user has been successfully authenticated, the user can register one or more products via one-touch application 106, where the registered products may be stored in customer asset store of customer DB 215. During transactions 803, the user can also log in and edit certain user profile information such as user preferences, etc.

Figure 9:
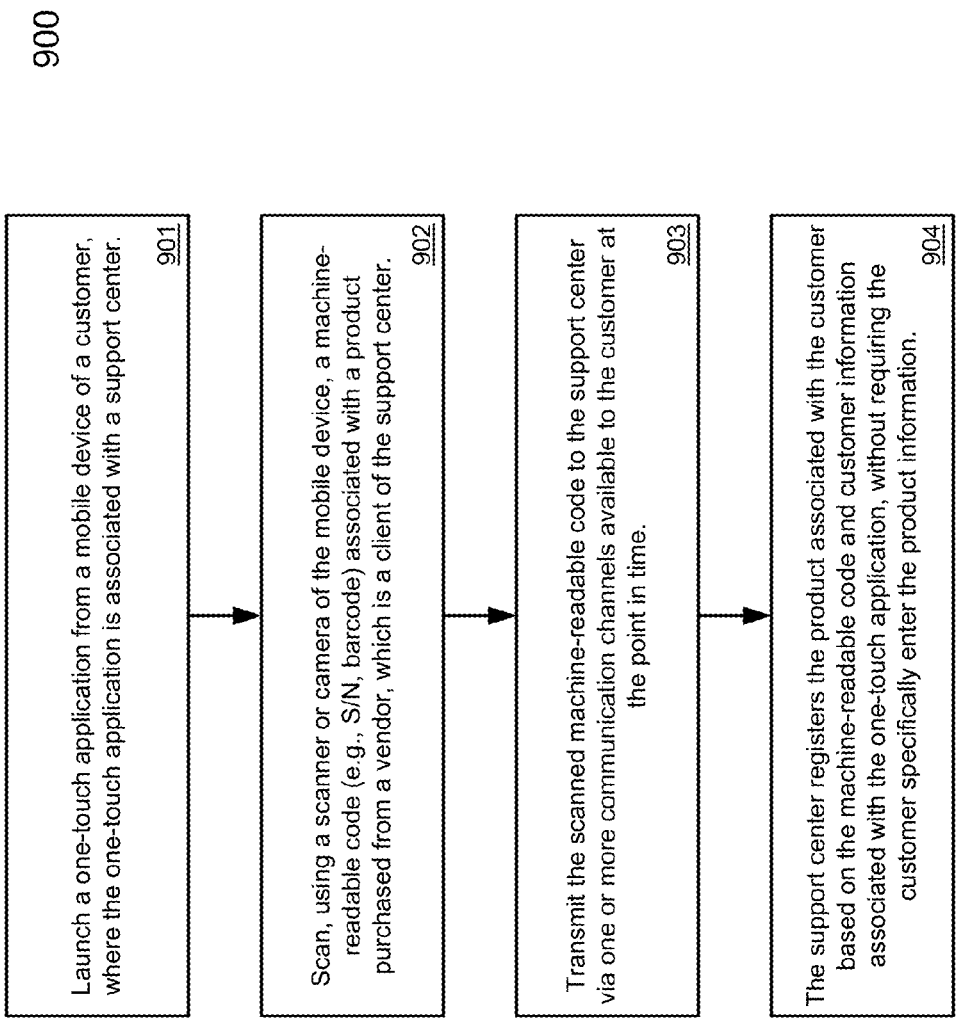
FIG. 9 is a flow diagram illustrating a method for registering a product with a support center according to one embodiment of the invention.

FIG. 9 is a flow diagram illustrating a method for registering a product with a support center according to one embodiment of the invention. For example, method 900 may be performed by system 100 of FIG. 1. Referring to FIG. 9, at block 901, a one-touch application is launched from a mobile device of a customer, where the one-touch application is associated with a client and communicatively coupled to a support center. At block 902, a machine-readable code of a product is scanned into an electronic image using a scanner or camera of the mobile device, where the machine-readable code can be at least one of a serial number, barcode, UPC code, QR code, HCCB code, and electronic receipt. At block 903, the machine-readable code is transmitted by the one-touch application to a service API of a support center. In response, at block 904, the support center registers the product based on the machine-readable code and the customer information associated with the one-touch application, without requiring the customer to specifically provide detailed product information.

Figure 10:
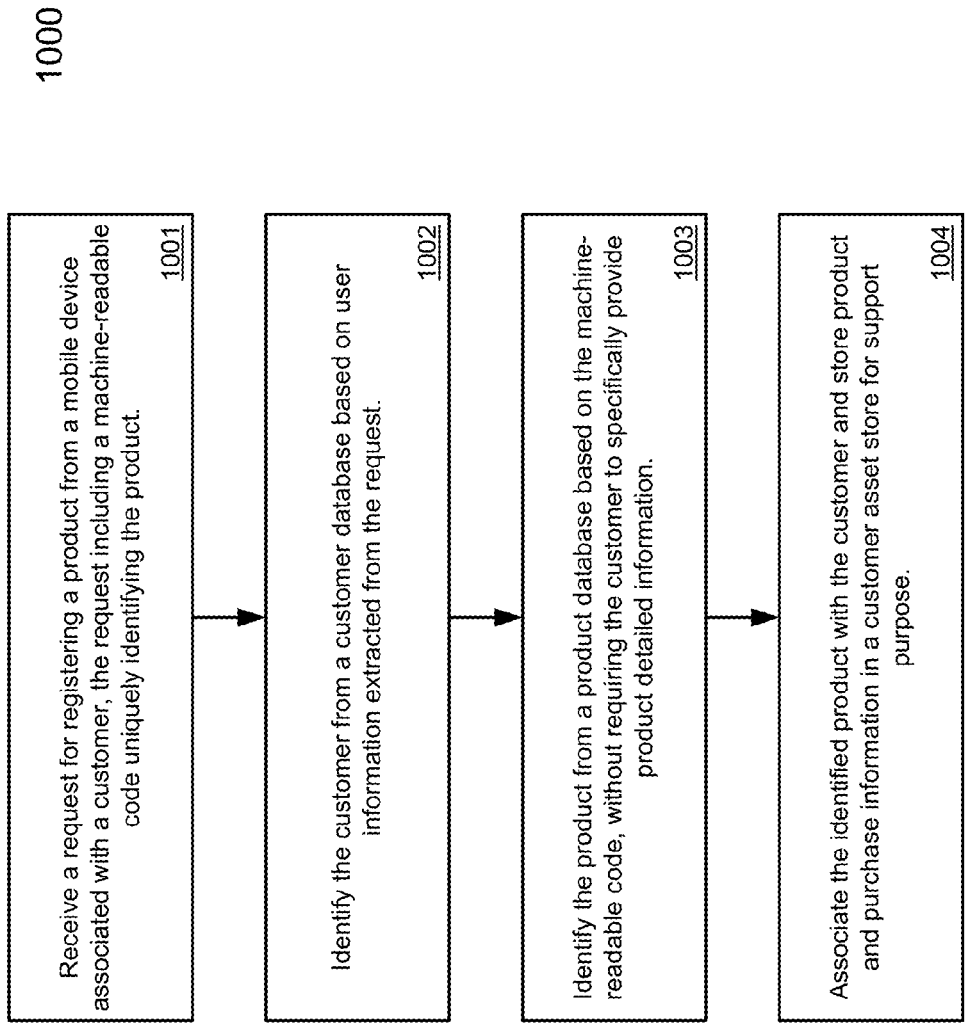
FIG. 10 is a flow diagram illustrating a method for registering a product according to another embodiment of the invention.

FIG. 10 is a flow diagram illustrating a method for registering a product according to another embodiment of the invention. For example, method 1000 may be performed by support center 103 of FIG. 1. Referring to FIG. 10, at block 1001, a request is received from a one-touch application of a mobile device of a customer for registering a product, where the request includes a machine-readable code uniquely identifying the product or service. The machine-readable code may be obtained by scanning of the product using a scanner or camera of the mobile device. The machine-readable code can be at least one of serial number, barcode, UPC code, QR code, HCCB code, and electronic receipt. At block 1002, the customer is identified from a customer database of the support center based on user information extracted from the request (e.g., username, password, device ID). At block 1003, the product is identified from a product database based on the machine-readable code, without requiring the customer to specifically provide the detailed product information. At block 1004, the identified product is associated with the identified customer and the information is stored in a customer asset store for subsequent support purposes. The information can be utilized subsequently for supporting the product or service.

Support Service APIs

According to some embodiments, certain components or systems of a support center may be fully or partially integrated within the support center. Some components may be developed and/or maintained by a third party (e.g., payment processing facility) or a partner enterprise (e.g., client or manufacturer backend systems) and communicatively coupled to the support center. According to one embodiment, a set of service APIs may be utilized to communicate various internal or external components to further improve the efficiency and performance, as well as providing more flexibility to the support center. The service API may also be utilized by customers to access the support center via a variety of communication channels.

Figure 11:
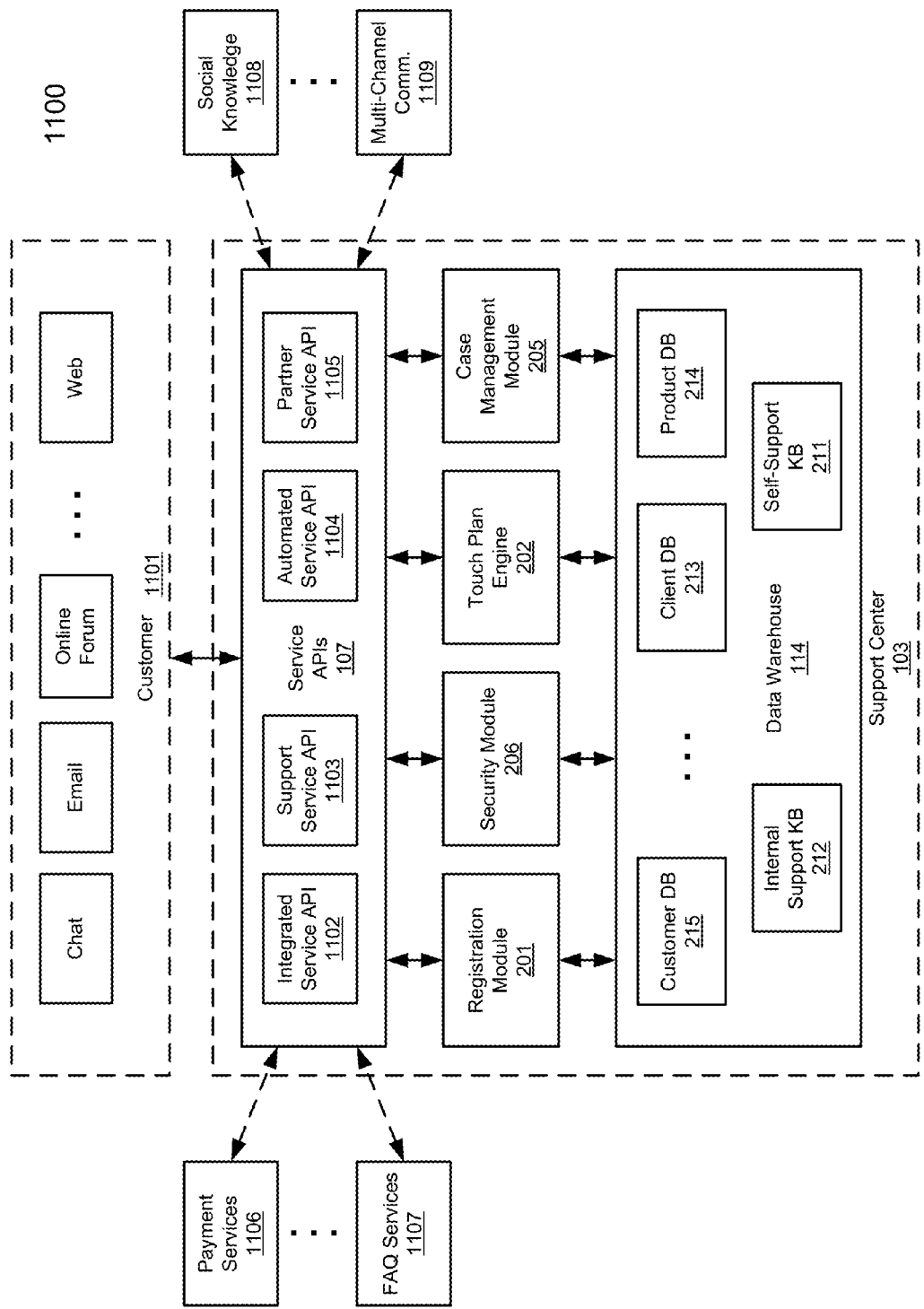
FIG. 11 is a block diagram illustrating an example of service API of a support center according to one embodiment of the invention.

FIG. 11 is a block diagram illustrating an example of service API of a support center according to one embodiment of the invention. For example, system 1100 may be implemented as a part of system 100 of FIG. 1. Referring to FIG. 11, system 1100 includes service APIs 107 to allow customer 1101 to reach support center via a variety of communication mediums such as chat, email, online forum, Web, video, voice, etc. Customer 1101 may initiate a contact with the support center via a one-touch application installed on the customer's mobile device as described above. Service APIs 107 may include a variety of subsets of APIs such as integrated service API 1102, support service API 1103, automated service API 1104, and partner service API 1105. Some or all of these APIs 1102-1105 may be implemented as cloud-based service APIs, where the service APIs may be maintained by a third party service provider as a part of software as a server (SaaS) on a subscription basis.

In one embodiment, integrated service API 1102 may be utilized by certain integrated service providers such as payment services 1106, dispatch services, location services, tracking and delivering services, short messaging services (SMS), social networking and blogging services (e.g., Twitter™), and customer relationship management (CRM) services (e.g., Salesforce™), etc. Automated service API 1104 may be utilized by AI Artificial Intelligence services, BOT services automated services (like roBOT) that mimic the actions or activity of a human processes or activities making the user think they are talking to a live person, frequently-asked question (FAQ) services 1107, survey services, eLearning services, etc. Partner service API 1105 may be utilized by certain partner entities of the support center such as social knowledge 1108, multi-channel communication system 1109, and social CRM (e.g., Lithium™), etc.

In one embodiment, support service API 1103 can be utilized by customer 1101 to reach the support center. Support service API 1103 may be utilized, for example, via a one-touch application launched from a mobile device, to register a user, register a product, access knowledgebase (e.g., KBs 212-213), and obtain a support service from an agent, AI, BOT service, etc. Initially, when a customer downloads and installs a one-touch application on its mobile device, the customer can access support center 103 via support service API 1103 to create a user account, which may be performed by registration module 201. Subsequently, the customer may also log into the account via support service API 1103, which may be authenticated by security module 206, to register a product and/or to retrieve a list of registered one or more products that have been registered with support center, using certain techniques described above.

When there is a need to contact support center 103 on a product, the customer can activate the one-touch application from its mobile device or press a one-touch button from a Web site, which will access and log into support center 103 via support service API 1103, where the customer and/or the mobile device can be authenticated by security module 206. In addition, case management module 205 is configured to create a unique case ID that uniquely identifies the instant support case. The case ID may be created based on a combination of at least some of the product identifiers (e.g., serial number, barcode, QR code, HCCB code, receipt transaction ID), client information (e.g., retailer ID, manufacturer product ID), customer information (e.g., personal information, username, password, mobile device ID), and other information (e.g., time, date).

In one embodiment, touch plan engine 202 is configured to create a touch plan which is identified and tracked by the case ID. The touch plan may be created according to one or more business rules or templates of the client. The touch plan represents a roadmap, an outline, a tracking record, or case context for the instant support case. The touch plan may also include or reference to other aiding information, such as, product information, product intelligence information, customer history data, client information, and manufacturer information, etc., which may be retrieved and compiled from various informational sources such as customer database 215, client database 213, product database 214, knowledgebase 211-212, client and/or manufacturer backend systems, etc. The touch plan is then forwarded to an agent that has been assigned to the instant case to allow the agent to have all the necessary information to enable the agent to provide the best customer experience. The agent may be assigned based on a variety of factors, such as, skill set, expertise, demographic location, language, prior customer relationship, etc.

Figure 12:
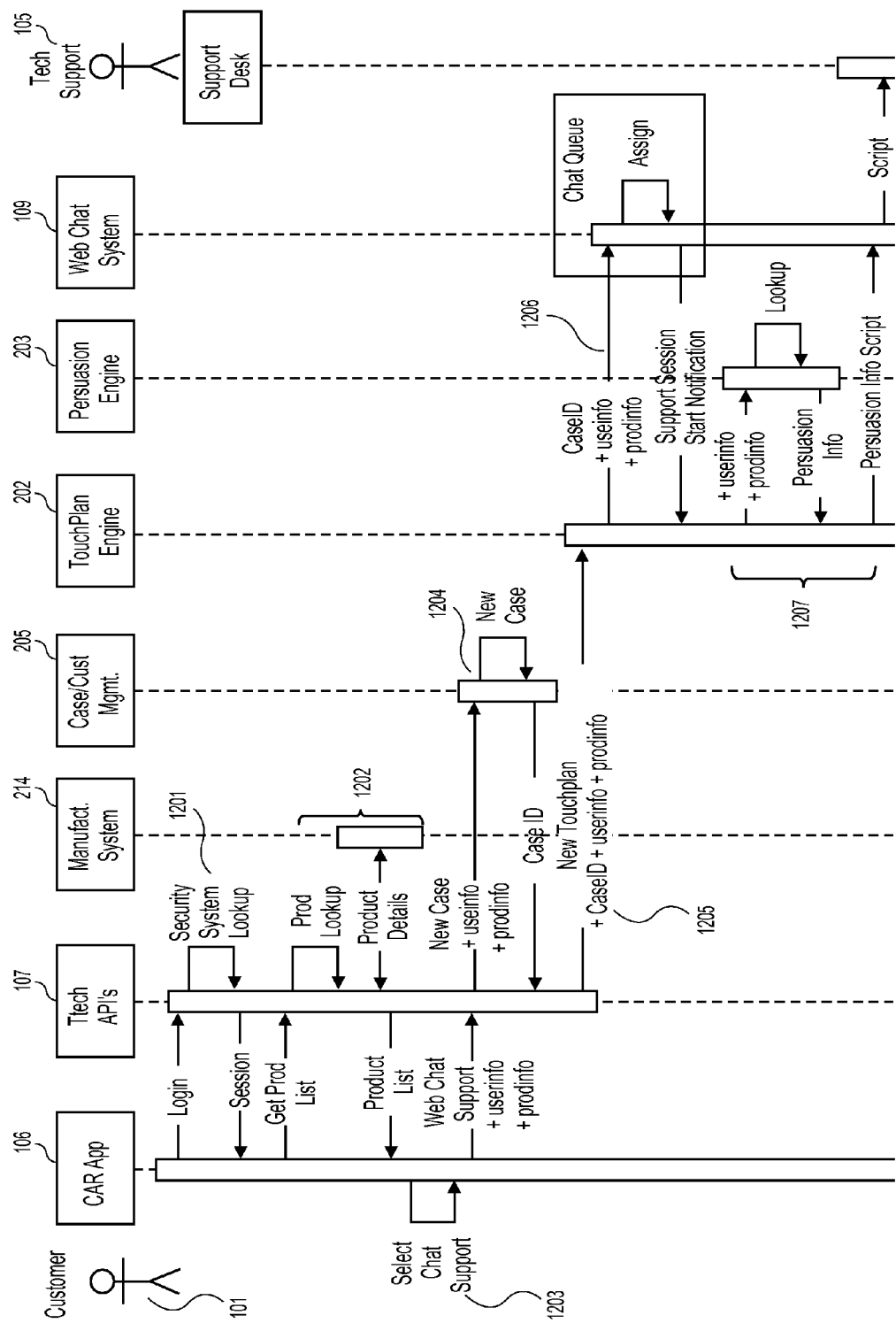
FIG. 12 is a transactional diagram illustrating a processing flow of a product support service according to one embodiment of the invention.
Figure 12:
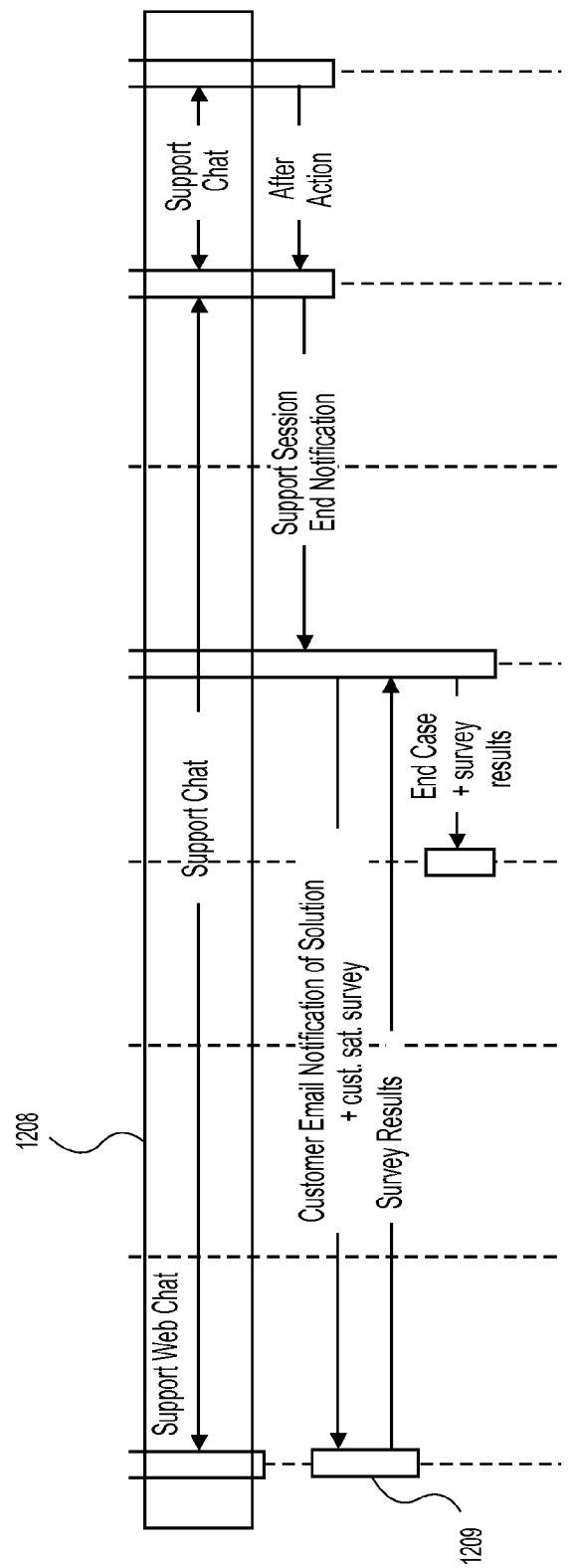

FIG. 12 is a transactional diagram illustrating a processing flow of a product support service according to one embodiment of the invention. Referring to FIG. 12, initially, a customer may launch one-touch application 106 from the customer's mobile device 101, which accesses service API 107 for login and is authenticated by a security module of the support center during transaction 1201. Once the customer has been authenticated successfully, a customized or personalized page having a list of registered products is retrieved via service API 107 and displayed on a display of mobile device 101 during transaction 1202. The customized page includes detailed product information obtained from product database 214 and/or client information obtained from client database 213. The customized or personalized page may be similar to the ones as shown in FIGS. 7A and 7B. At transaction 1203, a customer can select one of the registered products and one or more of the available communication channels to contact an agent of the support center. In this example, the customer selects a Web chat communication channel.

In response, service API 107 forwards information of the selected communication channel, user information, and/or product information to case management module 205. Case management module 205 is configured to instantly create a case ID that uniquely identifies the instant support session or case and return the new case ID to service API 107 via transaction 1204. Service API 107 in turn transmits the information to touch plan engine 202 via transaction 1205. In response, touch plan engine 202 is configured to create a touch plan together with all the necessary information and history data, select an appropriate agent, and forward the touch plan to the desktop of the selected agent via transaction 1206. The agent may be selected based on a variety of factors or considerations as described above. The touch plan may further invoke a persuasive engine during transaction 1207 to generate certain information to allow the agent to propose certain alternative solutions to the customer's problem. Thereafter, the agent can start a communication session (e.g., chat session) with the customer via transaction 1208. After the support session ends, optionally during transaction 1209, touch engine may invoke a customer satisfaction unit to perform a customer survey concerning the support session just ended.

Figure 13:
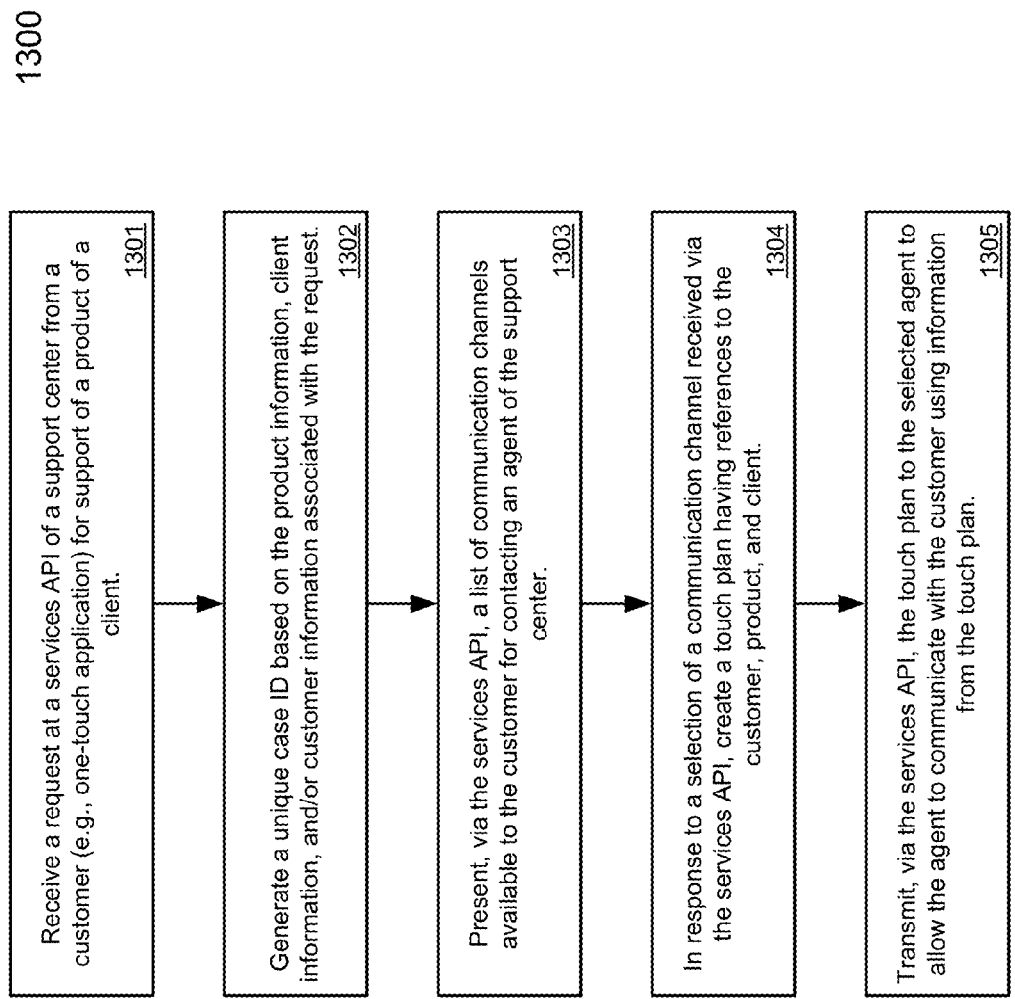
FIG. 13 is a flow diagram illustrating a method for providing support services to a customer according to one embodiment of the invention.

FIG. 13 is a flow diagram illustrating a method for providing support services to a customer according to one embodiment of the invention. For example, method 1300 may be performed by support center 103 of FIG. 1. Referring to FIG. 13, at block 1301, a request is received at a service API of a support center from a customer (e.g., via one-touch application launched from a mobile device) for support of a product of a client. Note that throughout this application, a product may be a retail product (e.g., an electronic device) or alternatively, a product may be a service (e.g., airline or hotel service) provided by a service provider as a client to the support center. At block 1302, a unique case ID is generated based on at least some of the product information, client information, and/or customer information associated with the request. In one embodiment, such information may be obtained and/or compiled based on a machine-readable code (e.g., barcode, S/N number, electronic transaction ID, etc.) that was received during the registration of the product or service, without requiring the customer to provide detailed information of the product or service. At block 1303, a personalized page having a list of communication channels available for contacting an agent is presented to the customer. At block 1304, in response to a selection of one or more of the communication channels received at the service API, a touch plan is created, where the touch plan includes or has references to information of the product, client, and customer. At block 1305, the touch plan is forwarded to an agent to allow the agent to communicate with the customer and to provide support services to the customer using information from the touch plan.

Figure 14:
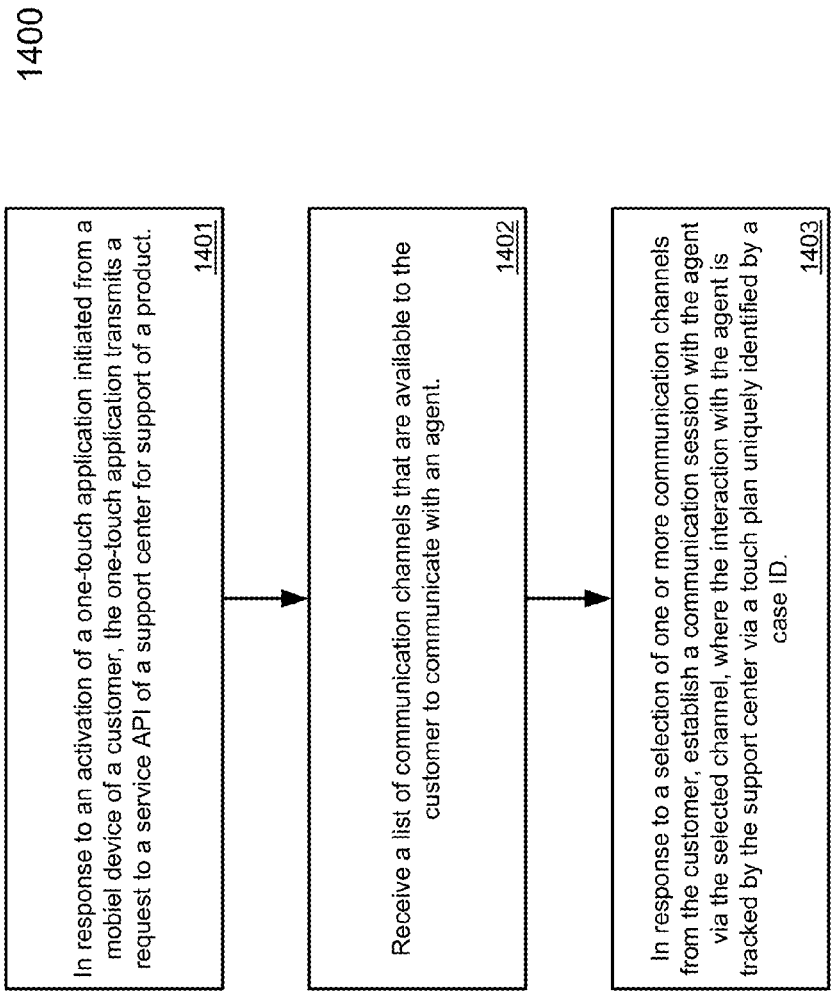
FIG. 14 is a flow diagram illustrating a method for providing support services to a customer according to another embodiment of the invention.

FIG. 14 is a flow diagram illustrating a method for providing support services to a customer according to another embodiment of the invention. For example, method 1400 may be performed by one-touch application 106 of mobile device 101 of FIG. 1. Referring to FIG. 14, at block 1401, in response to an activation of a one-touch application initiated from a mobile device of a customer, a request is transmitted by the one-touch application to a service API of a support center for support services of a product. At block 1402, a customized page having a list of communication channels is received from the service API of the support center, where the communication channels are those available for the customer to initiate a contact with an agent of the support center, which may be determined based on the client's preferences and customer's preferences. In response to a selection of one or more communication channels, a communication session is established between the customer and the agent, where the interaction between the customer and the agent is tracked via a touch plan uniquely identified by a case ID.

Customized Pages for Support Services

As described above, a support center can handle support requests from customers of multiple clients. For example, a support center may handle customer service calls for a number of retail sales companies, sales calls for catalog sales companies, and patient follow-up calls for health care providers. In such a structure, the support center may receive calls directly from the customers or through client call management systems. Each client and/or customer may have different support service requirements and demands. Conventional support centers typically provide a one-size-fit-all support interface, which may not provide the best customer experience.

According to some embodiments, a personalized page is constructed for each customer based on a variety of information, such as customer information, client information, product information, and certain knowledgebase. The personalized page for each customer may be different and specifically tailored to the corresponding customer's specific products and preferences, etc. The personalized page is presented to the customer when the customer launches the one-touch application from the customer's mobile device, such that the customer can have a very important person (VIP) type of feeling and experience.

Figure 15:
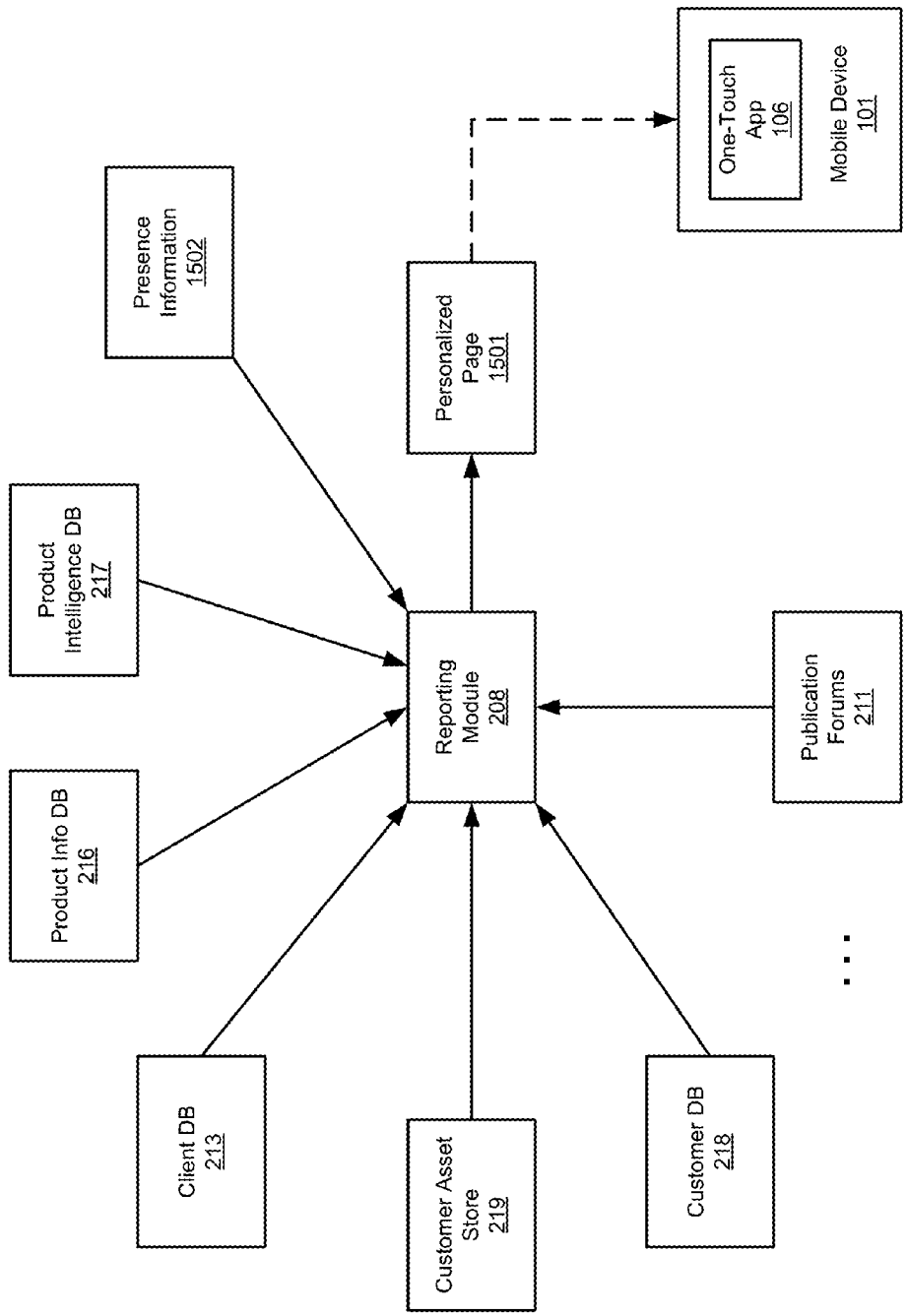
FIG. 15 is a block diagram illustrating a system for creating a personalized page for a customer according to one embodiment of the invention.

FIG. 15 is a block diagram illustrating a system for creating a personalized page for a customer according to one embodiment of the invention. Referring back to FIGS. 1 and 2, according to one embodiment of the invention, when a customer launches one-touch application 106 from its mobile device 101, one-touch application 106 accesses service API 107 to log into the support center. In response, service API 107 invokes a security module (e.g., security module 206 of FIG. 2) to authenticate the customer and/or its mobile device. Service API 107 may prompt the customer to provide certain credentials such as username and password or alternatively, the security module may automatically authenticate the customer and/or the customer's mobile device based on the username and password cached by one-touch application 106 and/or a device ID (e.g., MAC address, or IMSI) that uniquely identifies mobile device 101.

Upon having successfully authenticated the customer and/or mobile device 101, service API 107 may invoke an analysis module (e.g., analysis module 207) and/or reporting module (e.g., reporting module 208) to compile all the necessary information to generate a personalized page for the customer. Referring to FIG. 15, in one embodiment, personalized page 1501 may be generated based on one or more products that have been registered by the customer and stored in customer asset store 219. The products may be registered using certain techniques described above, such as, for example, based on a machine-readable code (e.g., serial number, barcode, QR code, UPC code, HCCB code, or transaction number of an electronic receipt, etc.), without requiring the customer to specifically provide the detailed product information.

For each of the registered products retrieved from customer asset store 219, detailed product information may be retrieved or identified from product information database 216, which may include information retrieved from manufacturer and/or client backend systems. In addition, certain client information may be retrieved from client database 213. Client information may include client's preferences on communication channels that can be utilized to reach an agent of the support center that provides support services of a registered product on behalf of the client. In addition, the client information may further include the nearby retail location or support center hosted by the client. Further, certain customer information may be retrieved from customer profile store 218. The customer information typically includes customer identity, customer personal information, customer financial information, customer type or membership class, customer sale history, customer service history, and the like. The customer information may also include customer's preference on communication channels that the customer prefers to utilize to reach an agent of the support center. The availability of communication channels may be determined based on the client's preference and customer's preference. The available communication channels may also determined based on the presence information 1502 of an agent assigned to the instant support case and the customer, where the presence information 1502 may be provided by an external or third party presence service via service API 107 (e.g., integrated and/or partner service API).

Presence information means any information associated with a network node and/or endpoint device, such as a communication device, that is in turn associated with a person or identity. Examples of presence information include registration information, information regarding the accessibility of the person's endpoint device, the endpoint device's telephone number or address, the recency of use of the endpoint device by the person, recency of authentication by the person to a network component, the geographic location of the person's endpoint device, the type of media, format language, session and communications capabilities of the currently available person's communications devices, the preferences of the person (e.g., contact mode preferences or profiles such as the communication device to be contacted for specific types of contacts or under specified factual scenarios, contact time preferences, impermissible contact types and/or subjects such as subjects about which the person does not wish to be contacted, and permissible contact type and/or subjects such as subjects about which the person does wish to be contacted). The presence information may include availability information from an electronic calendar or agenda maintained by the person in a calendar application. Presence information can be user configurable, i.e., the user can configure the number and type of communications and message devices by which they can be accessed and to define different profiles that define the communications and messaging options presented to incoming contactors in specified factual situations. The presence information can be associated with internal and external endpoints associated with each user.

Referring back to FIG. 15, personalized page 1501 may further include product rebates, rewards, and warranties, etc. obtained from product intelligence database 217. Alternatively, the personalized page may further include an upsell option or promotion, for example, generated by a persuasive engine, based on the product information and/or customer's purchase or interactive history. Personalized page 1501 may further include a link to a self-support knowledgebase 211 that allows a customer to attempt to find a solution to the customer's problem without having to contact a live agent. Note that the above described information may be previously compiled and stored in customer asset store 219 or customer's profile when the customer registered the products. Alternatively, the above information can be dynamically compiled from various informational sources as described above in response to a request. FIGS. 7A and 7B are screenshots representing examples of personalized page 1501. Thereafter, data representing personalized page 1501 is then transmitted by service API 107 to one-touch application 106 to be displayed on a display of mobile device 101.

Figure 16:
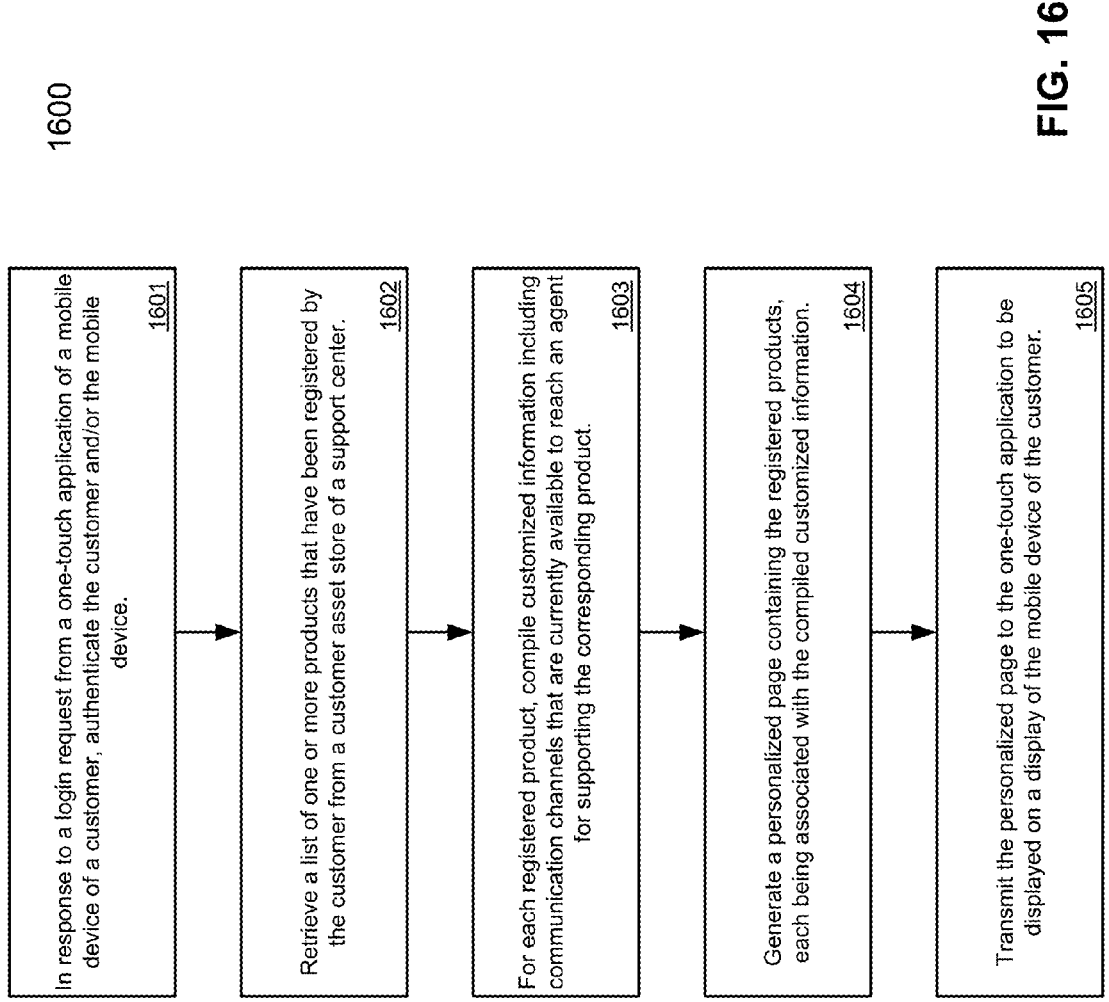
FIG. 16 is a flow diagram illustrating a method for providing personalized support services according one embodiment of the invention.

FIG. 16 is a flow diagram illustrating a method for providing personalized support services according to one embodiment of the invention. For example, method 1600 may be performed by support center 103 of FIG. 1. Referring to FIG. 16, at block 1601, in response to a login request from a one-touch application installed on a mobile device of a customer, the customer and/or mobile device is authenticated. The customer may be automatically authenticated based on the username and password cached and transmitted by the one-touch application without requiring the customer manually providing the same information. In addition, optionally for extra security, the customer may also be authenticated based on a unique device ID (e.g., MAC address or IMSI code) associated with the mobile device of the customer, such that it can be certain that a person who knows the username and password also has physical possession of the mobile device. At block 1602, a list of products that have been registered by the customer is retrieved from a customer asset store. At block 1603, for each of the registered products, customized information is compiled specifically tailored to the respective registered product, customer, and/or client, including communication channels that are currently available to reach an agent for supporting the corresponding product. At block 1604, a personalized page containing the registered products is generated, each registered product being associated with the compiled customized information. At block 1605, data representing the personalized page is transmitted to the one-touch application to be displayed on a display of the mobile device.

As described above, the availability of communication channels may be determined based on the client's preference and customer's preference, as well as presence information of a selected agent and the customer at the point in time. The preferred communication channels of a client and a customer may be different. For example, a client may want to utilize an automated or offline communication channels, rather than live communication channels for supporting certain products, which may reduce the cost for the services. Client's preferred communication channels may be configured by an administrator of the client. Client preferred communication channels may be configured per campaign basis, per program or project basis, per product basis, per customer basis, or a combination thereof. For example, the preferred communication channels may be determined based on a membership of the customer (e.g., privilege or loyalty) or a type of the product or promotion period. The privileges of customer memberships may be purchased or subscribed.

In one embodiment, the available communication channels may be those commonly preferred by the customer and the client. For example, as shown in FIG. 17, in this example, the client prefers email and Web communication channels while the customer does not mind which of the channels to be utilized. The available communication channels should then be the email and Web communication channels.

Figure 18:
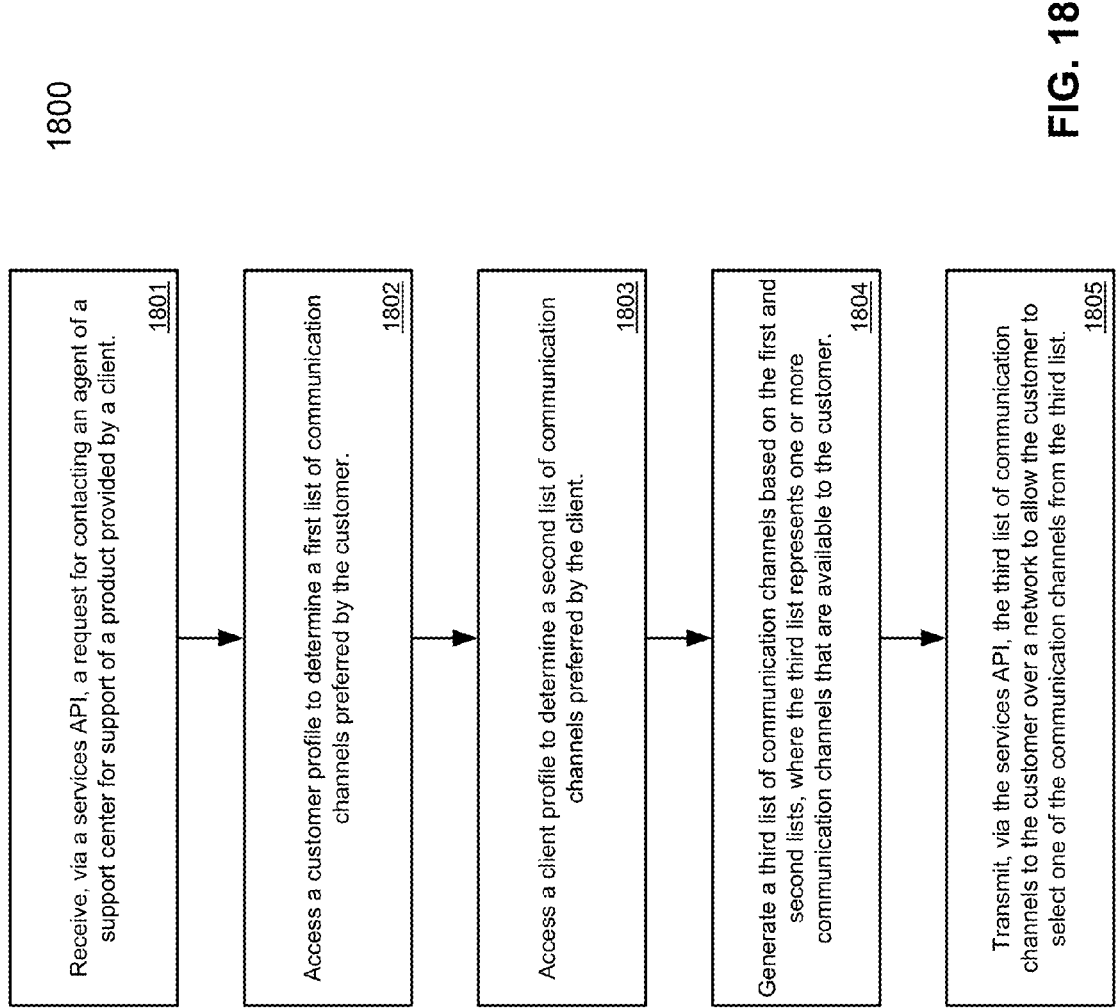
FIG. 18 is a flow diagram illustrating a method for determining availability of communication channels according to one embodiment of the invention.

FIG. 18 is a flow diagram illustrating a method for determining availability of communication channels according to one embodiment of the invention. Referring to FIG. 18, at block 1801, a request is received from a customer via a service API of a support center for contacting an agent for support of a product provided by a client of the support center. The request may be initiated from a one-touch application of a mobile device associated with the customer. At block 1802, processing logic accesses a customer profile to determine a first list of communication channels preferred by the customer. At block 1803, processing logic accesses a client profile to determine a second list of communication channels preferred by the client. At block 1804, processing logic generates a third list of communication channels based on the first and second lists. The third list represents one or more communication channels that are available for the customer to reach an agent of the support center. The available communication channels may also be subject to the presence information of the customer and/or the agent at the point in time. At block 1805, processing logic transmits, via the service API, the third list of communication channels to the customer (e.g., customer's one-touch application of its mobile device) to allow the customer to select one or more of the communication channels from the third list to contact an agent (or other services) of the support center.

Embodiments of Proactive Support Services

As described above, a support center can provide support services for a variety of products or services provided by a variety of manufacturers and/or clients. A customer may register and obtain support services from the support center for multiple products or services. In some situations, certain registered products or services may be related to each other. When one of the products or services is changed, another related product or service may need to be changed. For example, when a customer purchases a travel package from a purchasing facility such as ISIS™ or Expedia® as a client to the support center, where the travel package includes an airline ticket from an airline company as a first vendor and a hotel reservation from a hotel chain as a second vendor. When the schedule of the airline ticket has been modified or canceled, for example, due to bad weather, in addition to rearrange the flight, the hotel reservation may need to be modified or canceled. Typically, the customer has to specifically contact the airline company to rearrange the flight and specifically contact the hotel to change the hotel reservation. Sometimes, the customer may not realize that the related products or services (e.g., hotel reservation) may need to be changed.

According to one embodiment, when a customer registers multiple products or services with the support center, a touch plan is created by the touch engine. A relationship between a first product provided by a first vendor and a second product provided by a second vendor is determined. The first and second products may be purchased by a customer via a purchasing facility associated with a client of the support center. The first and second products can be registered with the support center using certain techniques described above. In response to a first event received from the client or the first vendor indicating a change of the first product/service, a first message is transmitted to the user on behalf of the client notifying the user the change of the first product/service. In addition, a second message is automatically transmitted to the user offering a support service of a possible change of the second product/service in view of the relationship between the first and second products, without requiring the user to initiate a request for the support service with respect to the second product/service.

Figure 19:
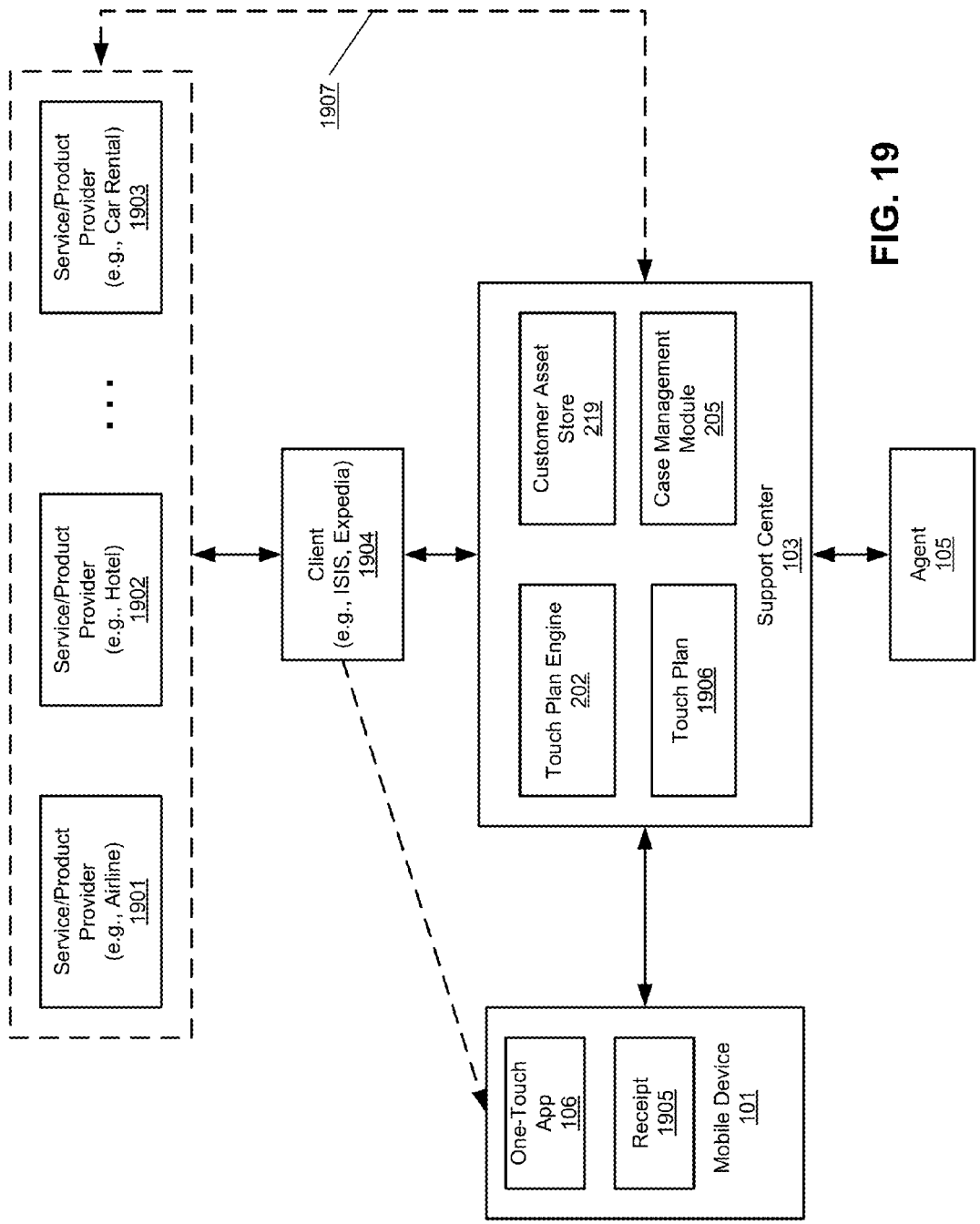
FIG. 19 is a block diagram illustrating a support system for providing proactive services according to one embodiment of the invention.

FIG. 19 is a block diagram illustrating a support system for providing proactive services according to one embodiment of the invention. Referring to FIG. 19, in this example, a customer purchases product 1901 from a first vendor, product 1902 from a second vendor, and product 1903 from a third vendor. The purchase has been made via purchasing facility 1904, which is a client of support center 103. The customer may utilize its mobile device to perform the purchase transaction. The customer may receive electronic receipt 1905 from client 1904, for example, via an email. Electronic receipt 1905 may include a purchase transaction ID that identifies the purchased products 1901-1903. In this example, product 1901 may be a flight service provided by an airline company. Product 1902 may be a hotel service (e.g., hotel reservation) provided by a hotel. Product 1903 may be car rental service (e.g., car rental reservation) provided by a car rental company.

Once the customer receives receipt 1905, the customer can activate one-touch application 106 from its mobile device 101 to transmit electronic receipt 1905 to support center 103 for registering products 1901-1903, without having to specifically provide detailed information of products 1901-1903 using at least some of the registration techniques described above. Alternatively, customer can also individually provide information concerning each of the products 1901-1903 (e.g., flight itinerary, hotel reservation confirmation, car rental reservation confirmation), where the support center can identify the relationships amongst the items. Further, electronic receipt 1905 may be automatically received by support center 103 from client 1904 and products 1901-1903 may be automatically registered without having the customer initiating the registration. The registration module of support center 103 may identify products 1901-1903 based on information extracted from electronic receipt, as well as the associated customer information, product information, and client information obtained from the appropriate informational sources as described above. The registered product information is then stored in customer asset store 219. In addition, case management module 205 may generate a unique case ID for tracking the current instant support case.

Furthermore, touch plan engine 202 may generate touch plan 1906 representing a support case context. In one embodiment, based on the touch plan, an analysis is performed on the services or products to determine the relationships among the products. In this example, the processing logic may determine that this is a travel package representing a trip of the customer. The hotel reservation (e.g., product 1902) and the car rental reservation (e.g., product 1903) can only be valid if the flight (e.g., product 1901) is on time. Another word, the change of schedule or cancellation of product/service 1901 will have an impact on the validity of products/services 1902-1903. The relationship information may also be implemented with the touch plan, for example, as triggering events or conditions, as well as processing rules.

In one embodiment, support center 103 communicates with each of the product or service providers 1901-1903 via a service API such as partner service API, collectively referred to as a partner network 1907. Support center 103 may receive any update or notification from providers 1901-1903 via the service API, for example, via a secured network such as virtual private network (VPN). In one embodiment, when support center 103 receives a notification from service provider 1901 indicating that there is a change regarding product 1901, the support center transmits a notification to mobile device 101 for the change of product 1901. The notification may be transmitted from support center 103 to mobile device 101 via one or more of communication channels, such as, for example, text, email, or voice, etc. The selected communication channels can be configured by the customer during registration of the products and/or customer and stored in a customer profile (e.g., customer profile store 218 of FIG. 2). The notification may be transmitted via the most appropriate communication channel selected at the point in time based on the presence information of the customer. The notification may be associated with a one-touch button that allows the customer to contact an agent of the support center.

In addition, according to one embodiment, based on the touch plan, support center 103 determines whether the change of product 1901 has an impact on products 1902-1903. If it is determined that a possible change for at least one of products 1902-1903 is needed, support center 103 transmits at least a second notification on behalf of client 1904 to mobile device 101 indicating the possible changes of products 1902 and/or 1903 without the customer having to initiate the contact with support center 103. In response to the notification(s), the customer can activate one-touch application 106 from the customer's mobile device to obtain support services (e.g., via one or more available communication channels) as described above. As a result, a customer does not have to remember or determine which of the other products might be affected and does not have to initiate a support call for each of the affected products. Also a result of the changes is provided to the user once all adjustments are processed.

In this situation, it is mutually beneficial to all parties involved herein. The customers will be happy because they do not have to worry about much their planned schedule (manifest) are being monitored up to and beyond the execution of each planned event (plane trip, car rental, hotel, etc.). More customers may look for the products or services that are supported by support center 103 (e.g., with a good reputation support brand name) with the peace of mind that they will receive the best possible customer satisfaction. Client 1904 will be happy because client 1904 does not have to deal with all the support issues. Since the best customer support is provided by support center 103, it will bring in more customers and business to client 1904 and product/service providers 1901-1903.

Figure 20:
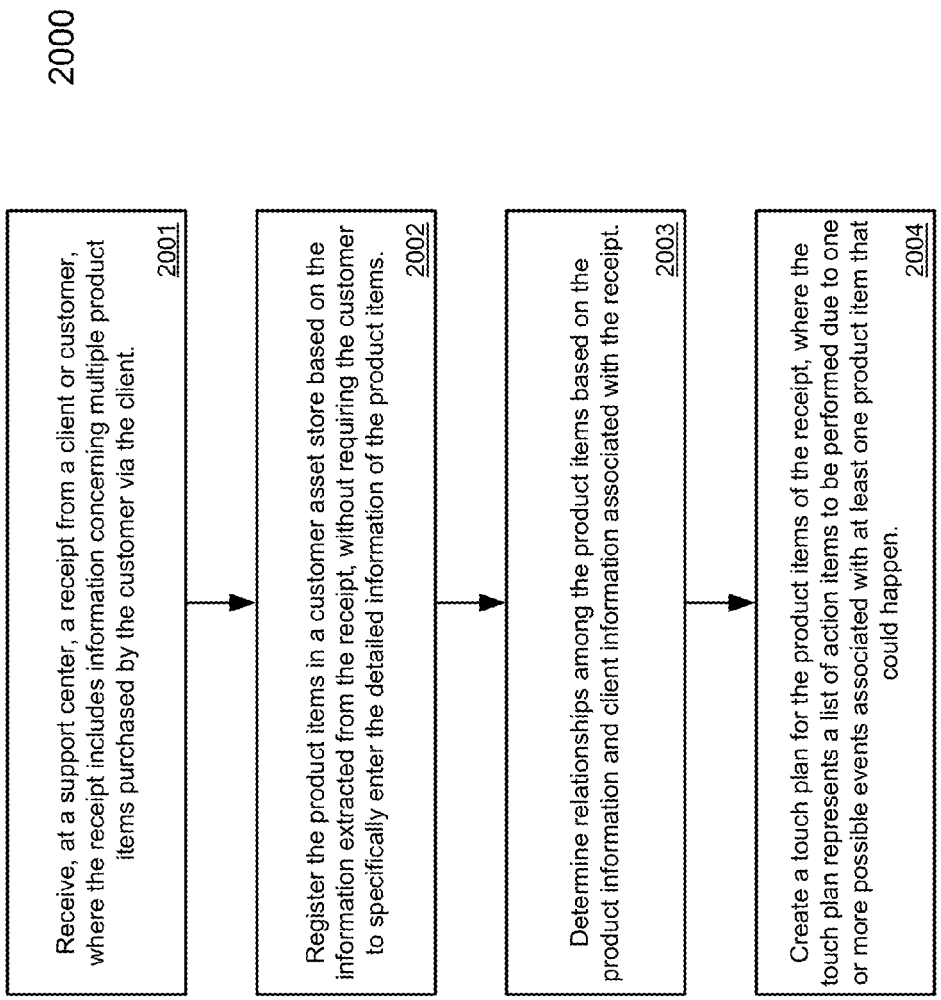
FIG. 20 is a flow diagram illustrating a method for providing proactive support services according to one embodiment of the invention.

FIG. 20 is a flow diagram illustrating a method for providing proactive support services according to one embodiment of the invention. Referring to FIG. 20, at block 2001, an electronic receipt is received at a service API of a support center from a customer or a client. The electronic receipt includes information (e.g., purchase transaction ID) identifying multiple product items that have been purchased by the customer via the client. The electronic receipt may be transmitted from a one-touch application running within a mobile device of the customer or by other means such as; a web application, API via the eWallet provider, API via the travel company, etc. The one-touch application may be associated with a client (e.g., purchasing facility such as Expedia or Amazon.com). At block 2002, the product items are registered within the support center based on the information extracted from the electronic receipt, without requiring the customer specifically provide the detailed information of the product items. At block 2003, the relationships among the product items are determined based on the product information (e.g., schedules of a travel itinerary) and/or client information associated with the electronic receipt. At block 2004, a touch plan is created for the product items of the receipt. The touch plan represents a list of action items to be performed due to one or more possible events or conditions associated with the at least one product item that could happen.

Figure 21:
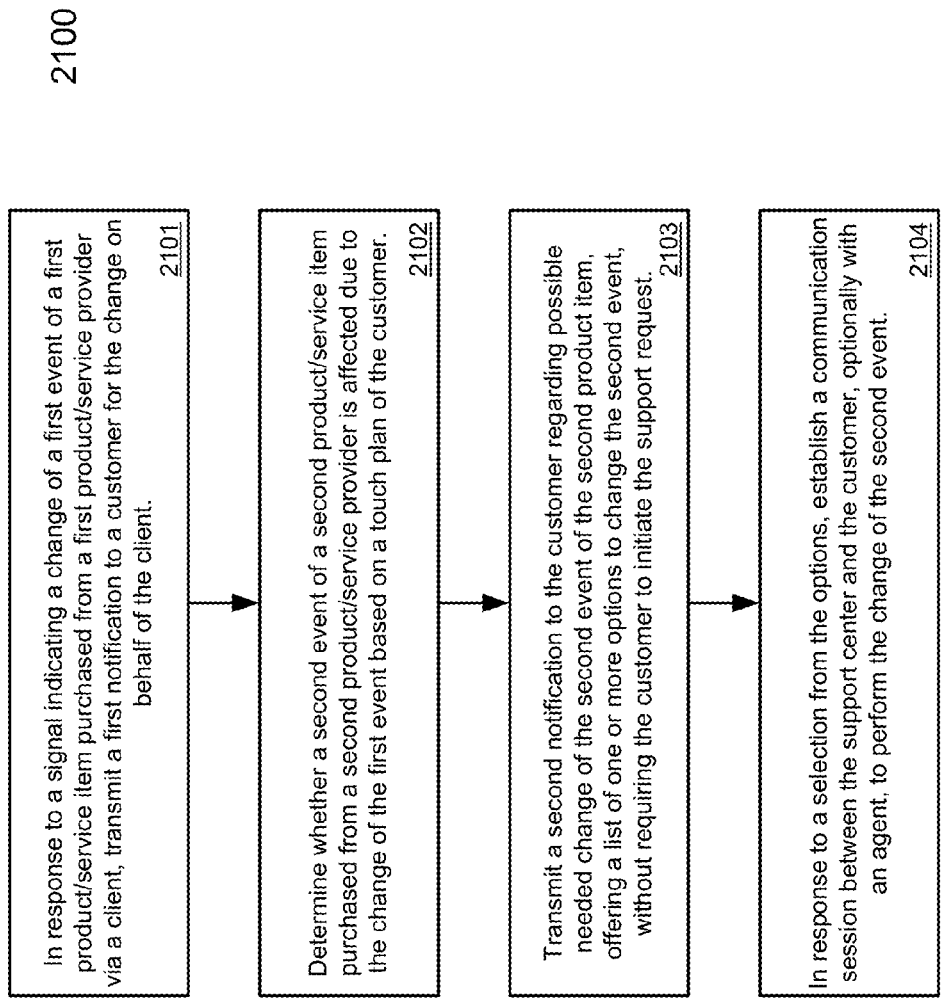
FIG. 21 is a flow diagram illustrating a method for providing proactive support services according to another embodiment of the invention.

FIG. 21 is a flow diagram illustrating a method for providing proactive support services according to another embodiment of the invention. Referring to FIG. 21, at block 2101, in response to a signal indicating a change of a first event of a first product or service item purchased from a first product or service provider via a client, a first notification is transmitted to a mobile device of a customer on behalf of the client regarding the change. At block 2102, it is determined whether a second event of a second product or service item purchased from a second product or service provider is affected due to the change of the first event based on the touch plan associated with the customer. At block 2103, a second notification is transmitted to the mobile device of the customer indicating a possible needed change of a second event of the second product item, offering a list of one or more options to change the second event, without requiring the customer to initiate the support request. In response to a selection of the options, at block 2104, establish a communication session between the support center and the customer, optionally with an agent or expert to help performing the change of the second product item for the customer. The customer can elect to be notified of the event but not have to take any action allowing (through approval within their profile) the support center (whether manual or automatically) to handle all details and rescheduling of planned events of the manifest or itinerary. Once complete a new manifest or itinerary is provided to the customer. All activity is done in real-time to keep the customer updated and well informed.

Embodiments of Self-Support Mechanisms

Embodiments of the present invention provide numerous support services options to a variety of customers for a variety of products and services from a variety of vendors or clients. As described above, the support service options may include live communications with an agent or expert via a variety of live communication channels, such as voice, chats, video conferences, etc. The support service options may also include automated (e.g., offline or delayed) communications with an agent or expert, such as IVR, texting (e.g., SMS), emails, community discussion forums, etc. Further, the support service options may also include online community-based forum such as social communities, in which services may also be provided by peers or other members of the communities. According to one embodiment, the support service options further include a self-support option in which a customer may be able to browse and/or search the self-support knowledge to find a solution to a problem of its product, without having to contact an agent or expert via the live or automated communication mechanism.

It is useful to know that different service options may be associated with different cost structures. Typically, live support option costs more, while the automated option may cost less and the self-support option may cost the least. Embodiments of the present invention provide various flexible options for a client and/or a customer to choose one or more of the options that fit their budget or other considerations. In certain situations, a client may prefer some offline or delayed support service options based on certain configurations (e.g., types of products or customers), which may be configured by an administrator associated with the client. A client may select a support service option per campaign basis, per project basis, per product basis, and/or per customer basis. For example, different support service options may be available to a customer dependent upon the type of membership of the customer with respect to the client. A loyal customer may enjoy more available support service options, while a new customer may only be entitled to limited service options such as the offline or delayed service options. Furthermore, certain support service options such as live support option may be a fee-based or subscription-based service. A customer may want to avoid the live support as much as possible. As described above, the available support service options may be displayed on the personal page of a customer.

According to one embodiment, certain knowledgebase from a variety of informational sources may be analyzed and compiled to generate articles describing solutions for certain popular problems of certain popular products. The articles are then published in a Web publishing forum to allow a customer to browse and search for an answer to the customer's problem, such that the customer does not have to initiate a contact with an agent or expert from the support center, which may be a paid-per-service option.

Figure 22:
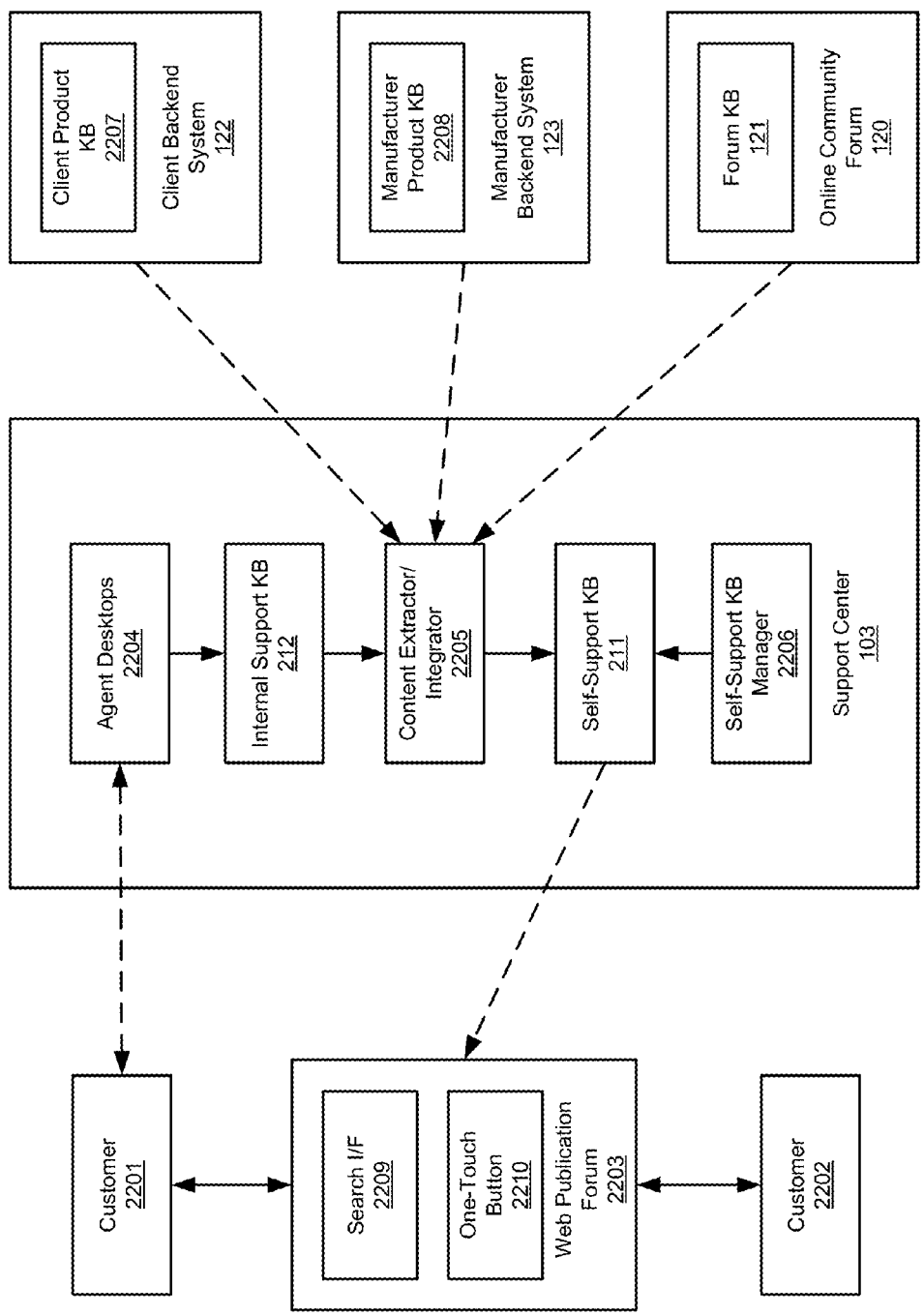
FIG. 22 is a block diagram illustrating a system for providing self-support services according to one embodiment of the invention.

FIG. 22 is a block diagram illustrating a system for providing self-support services according to one embodiment of the invention. Referring to FIG. 22, support center 103 includes content extractor or integrator 2205 to extract knowledge information from a variety of sources, such as internal KB 212, or other internal databases such as client database 213, product database 214, and customer database 215 of FIG. 2, etc. In addition, content extractor 2205 may also extract content from external KBs such as client product KB 2207 from client backend system 122 and manufacturer product KB 2208 from manufacturer backend system 123. Furthermore, content extractor 2205 may further extract information from community forum KB 121 of online community forum 120.

The extracted information turns into an article as part of self-support KB 211 managed by self-support KB manager 2206. Once the article is approved, it is published in Web publication forum 2203 that can be accessed by a variety of users such as users 2201-2202. Web publication forum 2203 may be implemented as part of Web interface 108 of FIG. 1 hosted by support center 103. Alternatively, Web publication forum may be hosted by a client or a third party vendor or partner. In one embodiment, Web publication forum 2203 includes search interface 2209 to allow a user to search articles within self-support KB 211. In addition, according to one embodiment, some articles may include or be associated with one-touch button 2210 to allow a reader to initiate a contact with an agent of support center to further discuss the corresponding article. In one embodiment, when one-touch button 2210 is activated, a voice call (e.g., VoIP) or a Web chat session (e.g., text, audio, or video chat) may be established with an agent. In addition, proper information associated with the current section of the article (e.g., as part of touch plan) may be transmitted to the agent to allow the agent to focus on the content of the current section.

That is, according to one embodiment, a self-support option may be initially presented to the customer to allow the customer to browse and search for a solution to its problem. If the customer is not satisfied with the self-support articles, the customer has an option to contact a live agent for further support. However, if the customer looks and finds a solution from the self-support knowledgebase, the contact with a live agent can be avoided, which in turn reduces the cost of the support services. The same described above are to be supported or provided via a community forum, an agent support desktop or a user via the client web site, etc. The diagram expands more than the text here.

Figure 23:
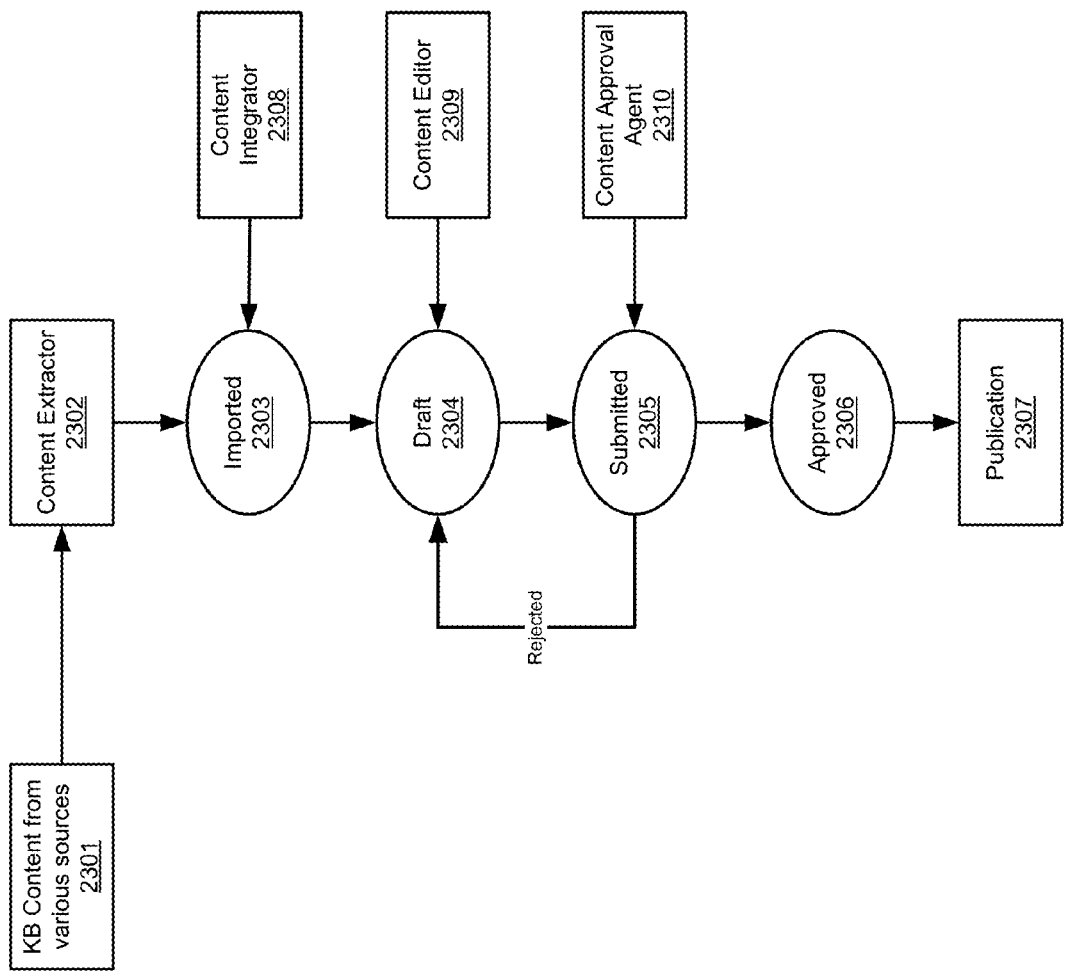
FIG. 23 is a state diagram illustrating a process for publishing content for self-support according to one embodiment of the invention.

FIG. 23 is a state diagram illustrating a process for publishing content for self-support according to one embodiment of the invention. Referring to FIG. 23, content 2301 associated with a particular product and/or similar or related products is extracted by content extractor 2302 from various sources as raw material. The extracted material is in "imported" state 2303. The content is then integrated or incorporated into a single article by an integrating agent 2308, which transitions the article into "draft" state 2304. The article may be edited by editor 2309 and submitted for approval (e.g., "submitted" state 2305). The submitted article is then approved by any number of approval agent(s). An article can be processed based on multiple approval levels (e.g., SME, manager, department lead, legal, etc.), which may be configured by a set of one or more rules. The article may be edited back and forth in several cycles until it has been approved during which an article may be transitioned between "submitted" state and "draft" state. For example, an approval agent(s) makes sure that the article does not disclose any confidential information of a client or manufacturer. Once the article has been approved by approval agent(s) 2310, the state of the article is transitioned to an "approved" state and becomes publication 2307 in the self-support KB.

In one embodiment, the editor is responsible to ensure information discussed in the article is technically accurate, while an approval agent is responsible for any other safeguards such as legal considerations, etc. When an article is in a state other than the "approved" state, the article is only exposed or visible to internal personnel such as extractor 2302, integrator 2308, editor 2309, and approval agent(s) 2310. These personnel may be different people and some people may handle multiple stages. An access control mechanism may be employed to set up proper attributes of a file associated with the article based on the states of the article, such that the file may be properly available or visible to proper personnel during different stages of the processes. For example, a community forum thread which was asked and answered by one or more people is very difficult to digest in a very long thread (e.g., many messages from many people). This thread would be flagged as answered by the original question author. Once flagged the support system extractor would extract the thread to be transformed by and editor or SME (subject matter expert) into an easy to read and understandable self-service article or publication. Most people would not have the patients to steps through a long thread of messages to find that single answer; they would abandon their search and make a support call. Once this information is published it then can be leveraged back within the community via search, within a web site for self service, via an agent desktop supporting new agents, etc.

Figure 24:
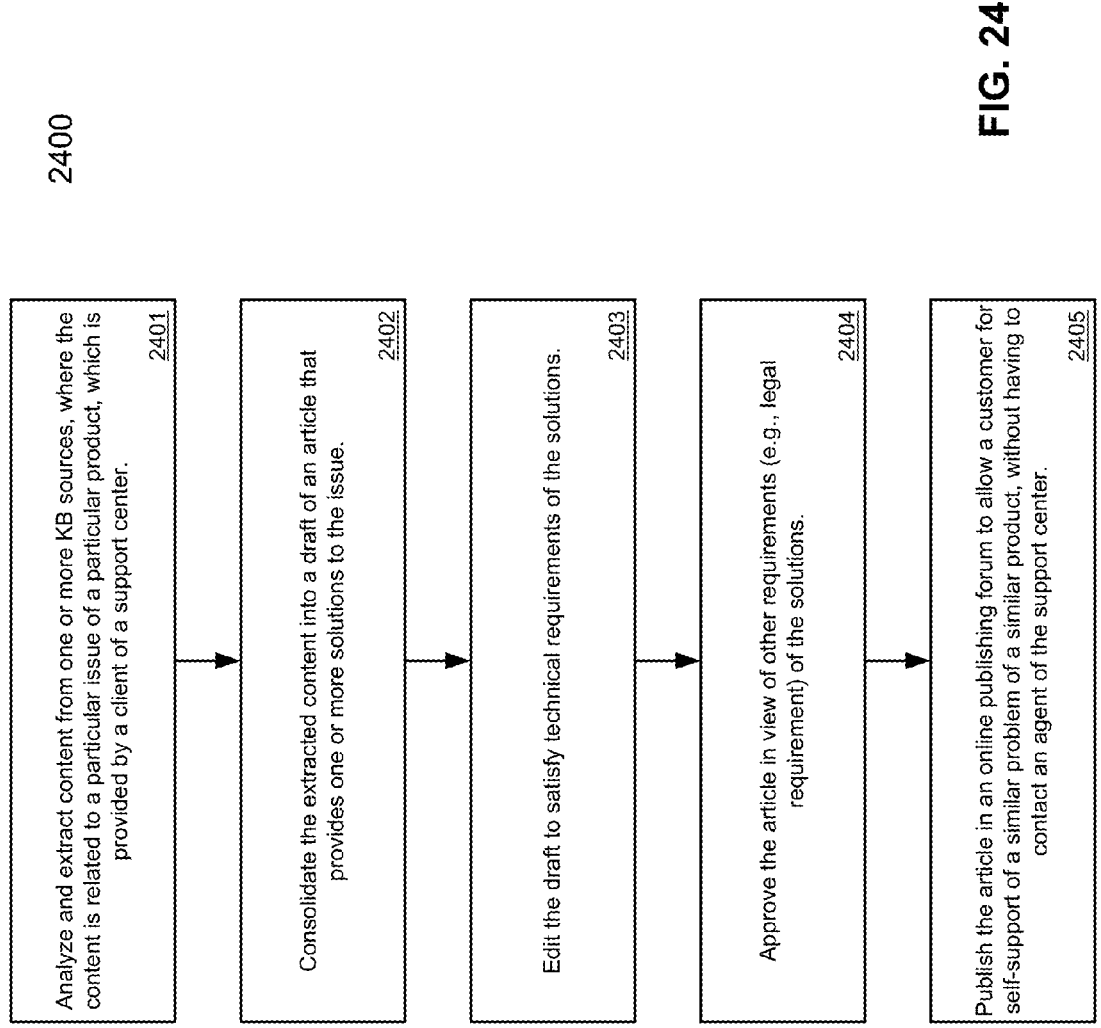
FIG. 24 is a flow diagram illustrating a method for providing self-support services according to one embodiment of the invention.

FIG. 24 is a flow diagram illustrating a method for providing self-support services according to one embodiment of the invention. Referring to FIG. 24, at block 2401, content is extracted from one or more informational sources (e.g., knowledge or some other data sources), where the content is related to a particular issue of a particular product, which is provided by a client of a support center. At block 2402, the content extracted from multiple informational sources is consolidated into a draft of an article that provides one or more solutions to the issue. All content is reviewed for duplication before being sent to an editor (e.g., SME) for authoring. At block 2403, the draft is further edited to satisfy technical requirements of the solutions. At block 2404, the article is approved by an approval agent(s) in view of other requirements (e.g., legal requirements) of the solutions. At block 2405, the article is published in an online publishing forum to allow a customer to self-support a similar or related problem of a similar or related product, without having to contact an agent of the support center.

Figure 25:
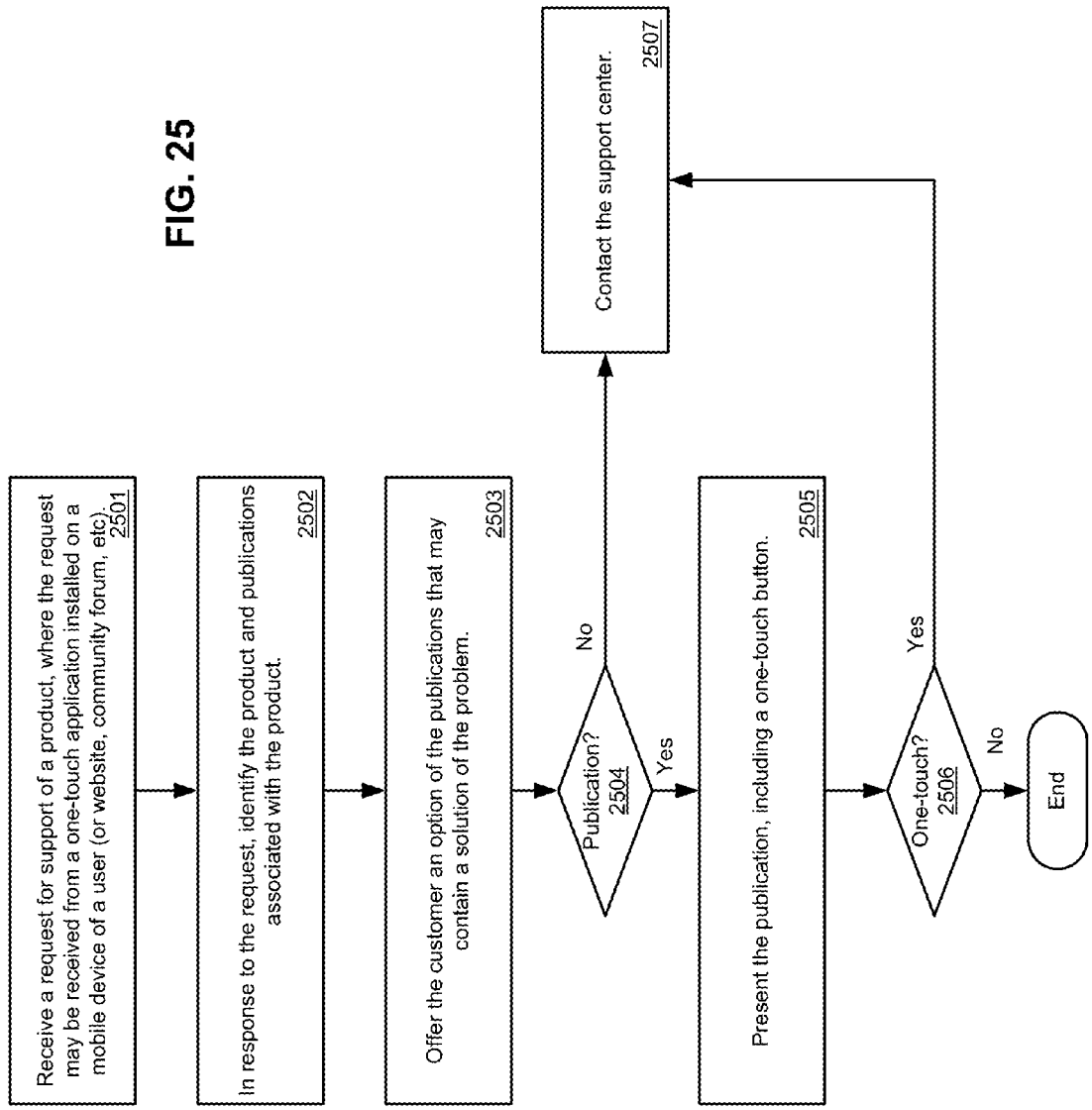
FIG. 25 is a flow diagram illustrating a method for providing self-support services according to another embodiment of the invention.

FIG. 25 is a flow diagram illustrating a method for providing self-support services according to another embodiment of the invention. Referring to FIG. 25, at block 2501, a request is received for support of a product, where the request is received from a one-touch application installed on a mobile device of a customer or alternatively, from a Web site or community forum, etc. In response to the request, at block 2502, the product is identified and publications associated with the product are also identified. The product and the customer may be identified using the techniques described above. At block 2503, in addition to a list of communication channels that are available to the customer presented to the customer via a personal page as described above, a self-support option is also presented to the customer to access the publications that may contain a solution to the problem. For example, a link specifically linked to a section of the publication forum that is related to the corresponding registered product may be presented to the customer. The link may be identified based on the product and/or vendor information received from the one-touch application, without requiring the customer to specifically provide detailed product information. Alternatively, a customer may use a search interface on the publication forum to conduct a search for its product. If at block 2504 the customer chooses to contact an agent, the customer can select one of the available communication channels to contact an agent at block 2507. Otherwise, at block 2505, the customer can access the presented published article(s) attempting to find a solution. In one embodiment, the published article may be associated with a one-touch button that if the customer is not satisfied with the solution, the customer can activate the one-touch button at block 2506 to contact an agent if allowed based on channel business rules set by the client.

Embodiments of Cross-Vendor Supports

As described above, an embodiment of a support center can provide support services for many customers on many products or services provided by many clients substantially concurrently. Some of the clients may be business competitors and their products may be competing products in the market. There may be a tremendous amount of confidential product information which can be revealed from the support history or knowledgebase of the products. Therefore, a conventional support center has to separate different agents supporting different clients from accessing other client's product information, by setting up a physical or logical wall. However, in some situations, a problem may be related to multiple products and sometimes these products may be provided by different clients. For example, a problem may be related to an external storage device interfaced with a laptop, where the storage device and the laptop may be provided by different clients. Typically, an agent supporting one of the clients may not have sufficient knowledge to solve the problem without getting help from the knowledge of the other client.

According to one embodiment, certain knowledge information across different clients is configured to be shared among agents supporting different products of different clients without disclosing the confidential information of the clients. The common or general knowledge information of a particular technology or technical area can be configured or flagged to be shared for some or all products of some or all clients. Certain client specific knowledge information can also be configured or flagged to be shared dependent upon client's preferences, which can be configured by an administrator associated with the client. Knowledge information can be configured to be shared per campaign basis, or per project basis, etc. As a result, an agent can access related knowledge information of related products to provide the best possible support services to a customer with less risk of disclosing confidential information.

Figure 26:
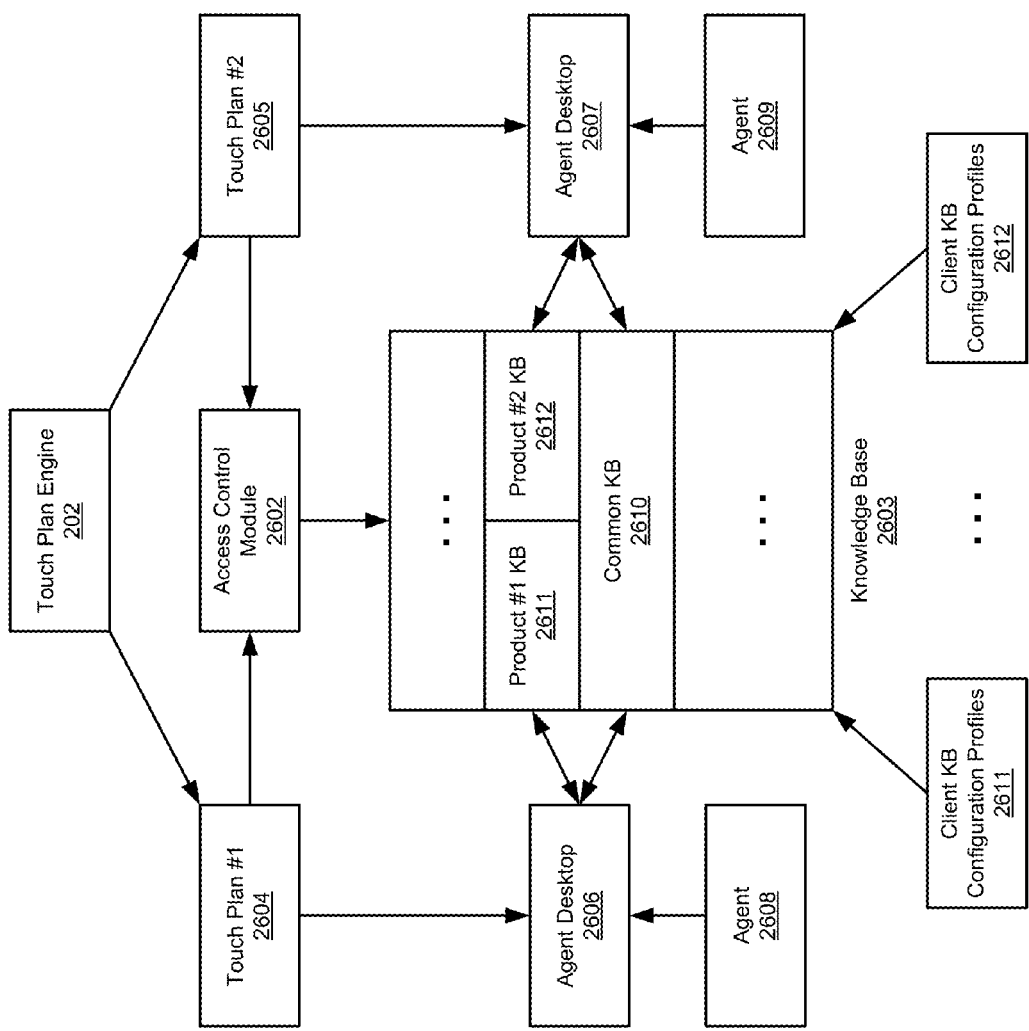
FIG. 26 is a block diagram illustrating a system for providing cross-vendor support services according to one embodiment of the invention.

FIG. 26 is a block diagram illustrating a system for providing cross-vendor support services according to one embodiment of the invention. Referring to FIG. 26, in response to a request for support services of products, touch plan engine 202 is configured to create a touch plan for each of the support cases, each being identified by a unique case ID generated by a case management module described above. In this example, touch plan engine 202 creates touch plan 2604 for a first product and touch plan 2605 for a second product. A touch plan includes or references all the necessary information concerning the corresponding customer, product, client, and customer's support history, etc. When touch plans 2604-2605 are transmitted to agent desktops 2606-2607, respectively, agents 2608-2609 can access information from a variety of informational sources (in this example, KB 2603, which may collectively represent any of the KBs described above), based on the associated touch plans. An agent desktop is configured to manage the interaction flow by providing tools, information, and scripting to an agent to ensure that each customer interaction is handled professionally and expeditiously.

In one embodiment, information stored in KB 2603 may be configured or flagged to be available for certain product support cases and some of the information may be shared among multiple products and/or multiple clients. An administrator can configure the KB 2603 regarding which part of KB 2603 can be shared and which part of KB 2603 can only be utilized for a specific product of a specific client. Such configurations may be determined based on client KB configuration profiles

2611-2612. Each of the client KB configuration profiles 2611-2612 includes information indicating what information can be shared and what information cannot be shared with another client. Based on the client KB configuration profiles 2611-2612, the files of KB 2603 may be managed in an appropriate way to be utilized by different agents 2608-2609 for supporting different products of different clients.

For example, a support interaction comes in via client 1 (e.g., a telecom provider) about connecting their phone to a computer for the purpose of transferring photos and music. They are requesting support on how to resolve a connection issue with this transfer. The problem in this example may be that of a driver problem in the computers operating system and is beyond the expertise of the telecom agent to support and instructs the customer to call the computer manufacturer to resolve the problem. The call then comes in via client 1 of the computer manufacturer with the same problem. The agent identifies it is not a computer problem but something at the OS layer and escalates to an engineer to resolve. The receiving engineer (e.g., a high paid individual) helps to resolve the problem and posts an article (following proper procedures) within the support self-service knowledge base. The article via analysis is determined to cover several client verticals and is posted as general knowledge. Now a new customer comes along and depending on the channel they take they can be supported by: a) via mobile or web based self-service knowledge article that can walk the customer through their problem; b) via a telecom agent armed with the knowledge article; c) via a computer manufacturer agent armed with the knowledge article; and d) via a community forum search where the article is made available. In any case the single article is made available through all channels. If this had been an issue specific to a port on the phone, the article may not be made available to anyone other than the telecom agent.

Figure 27:
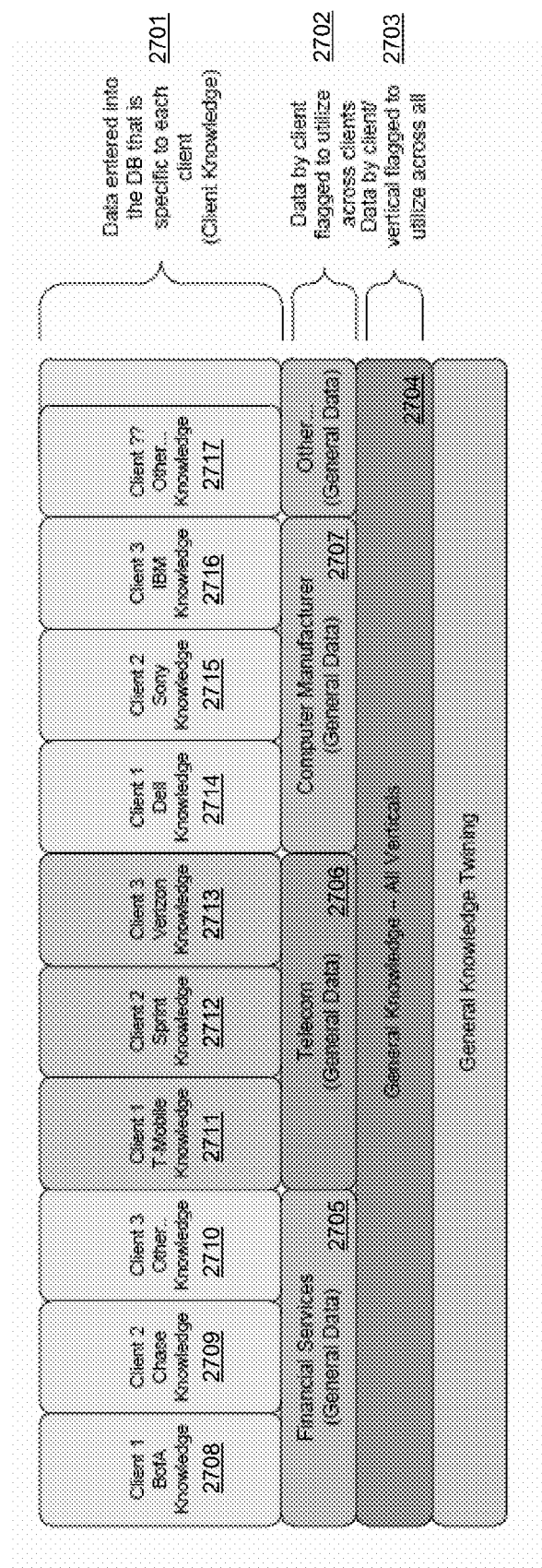
FIG. 27 is a block diagram illustrating knowledgebase architecture for cross-vendor support according to one embodiment of the invention.

FIG. 27 is a block diagram illustrating knowledgebase architecture for cross-vendor support according to one embodiment of the invention. Referring to FIG. 27, KB information may be categorized in at least three tiers 2701-2703. The first tier 2701 contains client specific KB information that is limited to a particular client. The second tier 2702 contains KB information that can be shared by multiple clients within a particular product or technology/service area. The third tier 2703 contains KB information that is common to all technology/service areas. For example, KB data 2704 can be shared by all agents handling clients 2708-2717. KB data 2705 can be shared by agents handling clients 2708-2710; KB data 2706 can be shared by agents handling clients 2711-2713; and KB data 2707 can be shared by agents handling clients 2714-2716. KB data 2708-2717 can only be utilized the corresponding agent handling that particular client.

Figure 28:
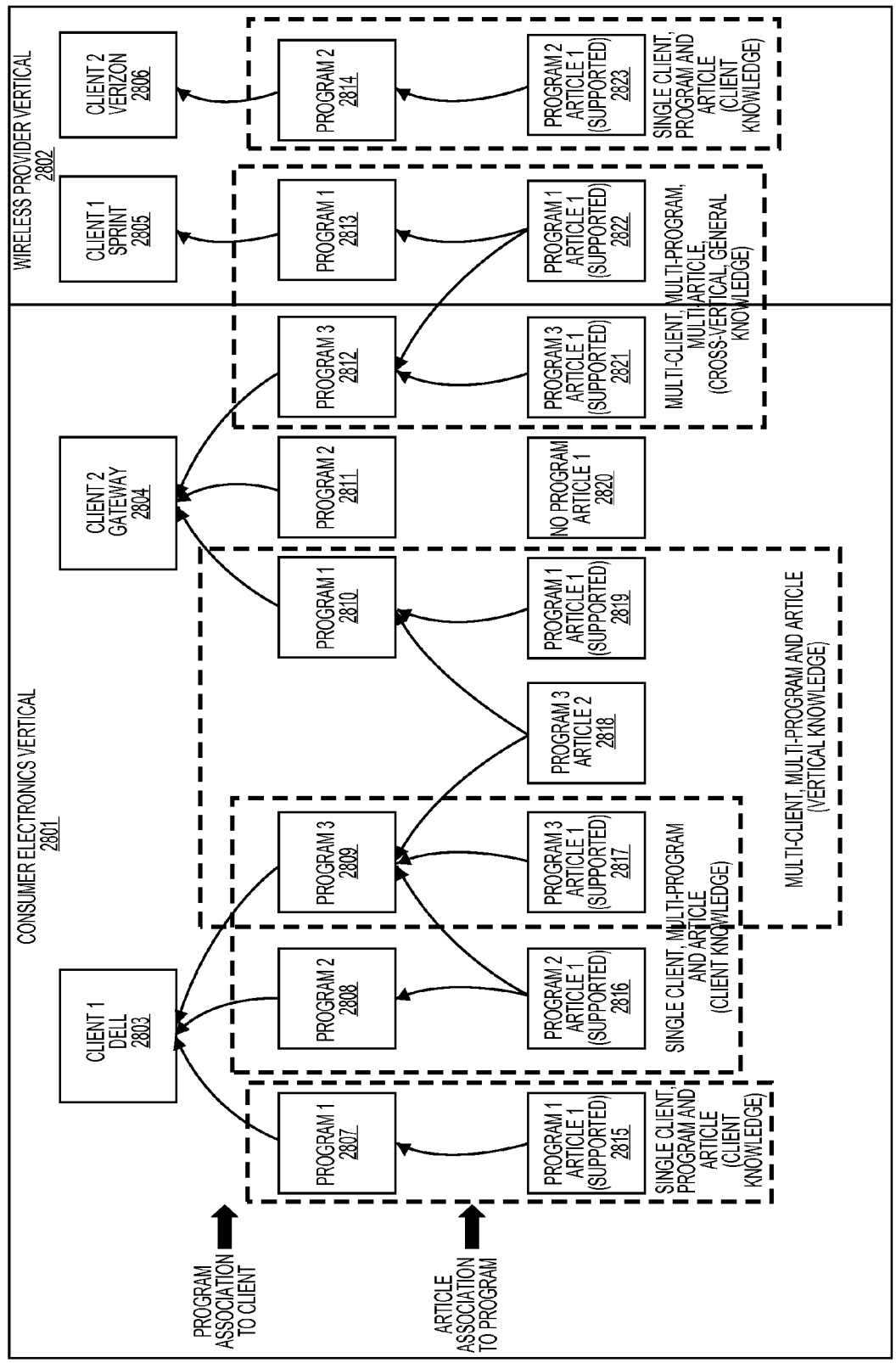
FIG. 28 is a block diagram illustrating associations of clients, programs, and articles for support services according to one embodiment of the invention.

According to one embodiment, an article or file of KB data can be associated with different programs (e.g., projects) of a client. An article can also be associated with multiple programs of multiple clients. FIG. 28 is a block diagram illustrating associations of clients, programs, and articles for support services according to one embodiment of the invention. Referring to FIG. 28, there are two product categories 2801 and 2802 in this example. Clients 2803-2804 are associated with product category 2801 while clients 2805-2806 are associated with product category 2802. There are three support programs 2807-2809 currently provided by the support center for client 2803 in product category 2801. There are three programs 2810-2812 currently associated with client 2804 in product category 2801. There is one program 2813 associated with client 2805 and one program 2814 associated with client 2806 under product category 2802.

In one embodiment, each of articles 2815-2823 in the knowledgebase is tagged with one or more keywords representing certain terms (taxonomy's) that are typically used in the industry related to the corresponding product category. In online computer systems terminology, a tag is a non-hierarchical keyword or term assigned to a piece of information (such as an Internet bookmark, digital image, or computer file). This kind of metadata helps describe an item and allows it to be found again by browsing or searching. Tags are generally chosen informally and personally by the item's creator or by its viewer, depending on the system. Labeling and tagging are carried out to perform functions such as aiding in classification, marking ownership, noting boundaries, and indicating online identity. They may take the form of words, images, or other identifying marks.

In one embodiment, a tag can be used to associate an article with a particular product category and/or product. The tags may be defined by an administrator or engineer of the support center or the clients (in view of security considerations). The list of product categories may be defined as standard categories in the support industry and managed by the support center. The categories may be linked to the articles (e.g., via tags) and utilized in a search. A category pool may include, but is not limited to, hardware, webcam, memory, video display, keyboard, disk drive, input device, universal serial bus (USB), and Bluetooth, etc. A list of tags may be defined by a client and thus, each client may have a different pool of tags. The tags may be managed by the support center and/or the client.

Referring back to FIG. 28, in this example, article 2815 has been tagged and associated with program 2807. Article 2816 has been tagged and associated with programs 2808-2809. Article 2818 has been tagged and associated with different programs 2809-2810 of different clients 2803-2804. Thus, article 2818 is considered as a cross-vendor article that may be part of tier 2702 of FIG. 27. Article 2822 has been tagged and associated with different programs 2812-2813 of different clients 2804-2805 in different product categories 2801-2802. Thus, article 2822 is considered as general knowledge in tier 2703 of FIG. 27. Article 2820 has not been associated with any program, which means that article 2820 has not been tagged with a keyword related to any program. When an agent attempts to search a solution from a KB, the agent may search (e.g., from agent desktop) for a tag as a search term that is closely related to the product in question. A list of articles may be returned that have been tagged by the tag. As a result, the information stored in a KB can be shared across different products of different clients in different product categories for better support services and better use of the content thus having very little to no duplicates of information across the system as a whole. The access control of the articles may be enforced based on tags that are associated with the product categories, which may be used to control whether a particular article is available or visible to an agent.

Referring back to FIG. 26, in one embodiment, access control module 2602 is configured to control the access of information stored in KB 2603 by agents 2608-2609 based on the information provided by touch plans 2604-2605. In this example, it is assumed that KB segment 2611 can only be utilized by agent 2608 for supporting the first product of a first client, while KB segment 2612 can only be utilized by agent 2609 for supporting the second product of a second client. However, based on the KB configurations from client KB configuration profiles 2611-2612, KB segment 2610 may be shared by agents 2608-2609 in supporting both products of both clients. In one embodiment, access control module 2602 may enable KB segments 2611 and 2610 to be available to agent 2608, and enable KB segments 2612 and 2610 to be available to agent 2609.

In one embodiment, KB segment 2611 may be stored in a particular storage or network subnet that agent 2609 cannot access, while allowing agent 2608 to access the information. Similarly, KB segment 2612 may be stored in another storage or network subnet that agent 2608 is not entitled to access, while allowing agent 2609 to access the information. KB segment 2610 may be stored in a storage or network subnet that both agents 2608-2609 can access. As a result, confidential information of KB segment 2611 is not exposed to agent 2609, and confidential information of KB segment 2612 is not exposed to agent 2608.

Figure 29:
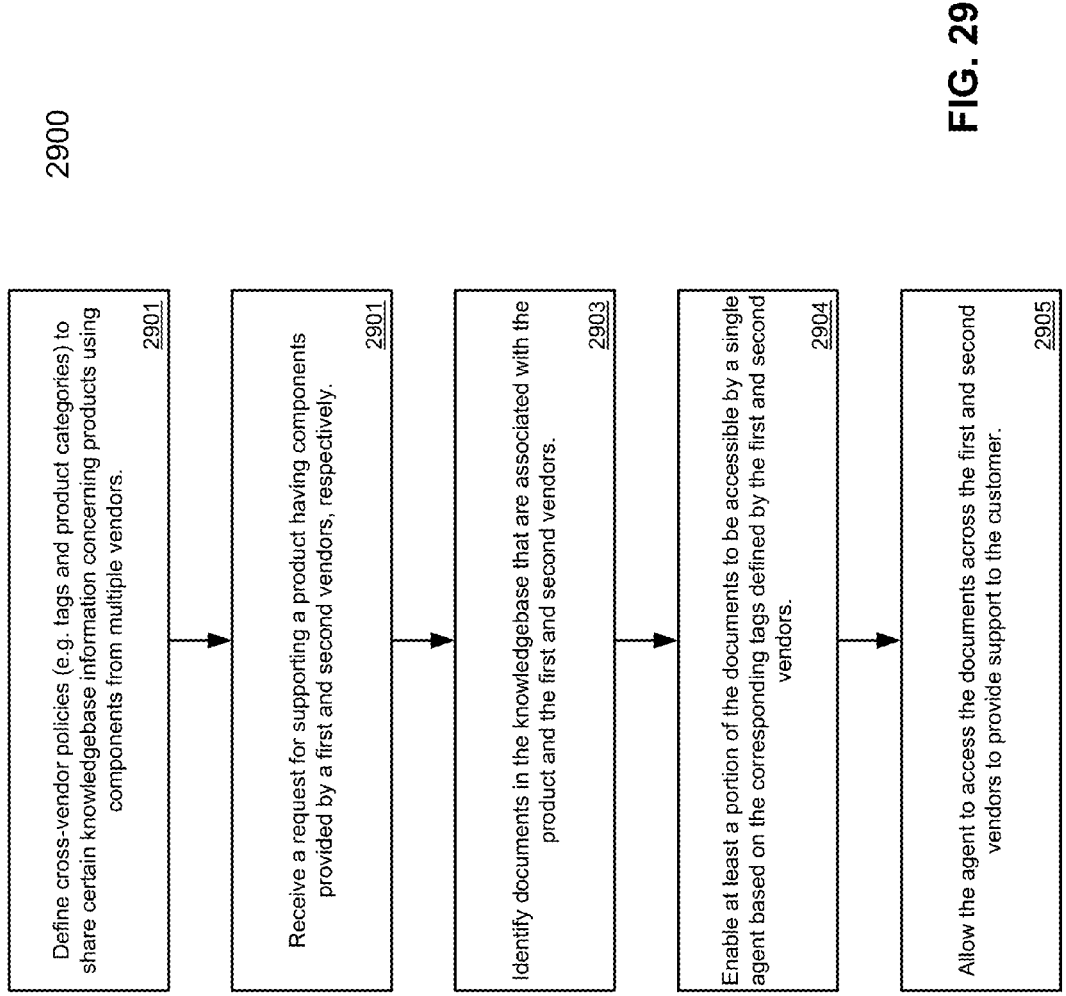
FIG. 29 is a flow diagram illustrating a method for providing cross-vendor supports according to one embodiment of the invention.

FIG. 29 is a flow diagram illustrating a method for providing cross-vendor supports according to one embodiment of the invention. For example, method 2900 may be performed by the system as shown in FIG. 26. Referring to FIG. 29, at block 2901, a set of tags and product categories is defined to share certain knowledgebase information concerning products using components from multiple vendors or clients. At block 2902, a request is received from supporting a product having components provided by a first vendor and a second vendor, respectively. At block 2903, documents are identified in the knowledgebase that have been associated or tagged with the product and the first and second vendors. At block 2904, at least a portion of the documents is enabled to be accessible by a single agent based on the tags defined by the first and second vendors. At block 2905, the agent is allowed to access the at least a portion of the documents.

Example of Use Case: Mobile Phone Support via Web, Chat, and Email

The embodiments described above can be applied to a variety of support applications or situations. In this example, the product being supported is a mobile phone, where a wireless carrier and/or phone manufacturer is a client of the support center. In this example it is assumed a cloud based system (e.g., systems as shown in FIGS. 1 and 2) is setup and available for customer projects. The cloud based system is a multi-tenant system to support many clients and projects, and can be scaled to support any client/project volume. The cloud based system is monitored and managed by a staff of technologists in various disciplines (e.g., administrators, agents, and/or experts). It is assumed that the client has established and selected all communication channels and rules for support and defined all touch plans and business processes (e.g., preferred communication channels, client and product databases, integrated client processing methods, available shared knowledgebase, etc., which may be done by a client integration system of the support center).

It is also assumed that the customer has already registered with the system. For example, the customer may have registered and created a user account in the support center and registered a mobile device by downloading and installing a one-touch application associated with the client. The customer may have also registered the product or products with the system by scanning a machine-readable code of the product using a scanner or camera of a mobile device and sending the scanned information to the support center via the service API, without having to specifically provide product information.

In this example an existing customer needs support and follows the one touch support process, and the customer is defaulted to a chat channel to resolve the problem. The client establishes when and where a one touch button for customer service/support via their customer Web site based is offered via specific business rules (i.e. customer value, shopping cart, type of service, propensity to buy, etc.). A returning customer visits the client's web site and logs into the site. The customer requests a service/support via the one touch button, which in turn communicates with the service API of the support center. In response, the system identifies the customer and/or client, creates a case (e.g., unique case ID uniquely identifying the current support session) and collects user data. The system collects initial customer information and updates customer account (if necessary). System logs all activities of the customer to the customer's interaction account history.

In this example, a chat client appears on customer's computer or mobile device. The system touch plan is initiated and creates a unique case for the interaction to track the occurrence and overall interaction, where updates are made to the case for every action. The system via a customer chat (live) calls up the chat application. The system receives chat request from Customer computer and places it into a project queue where some rules may apply. The system locates an available associate/specialist (e.g., agent or expert) and routes the customer chat to the associate/specialist. The system also routes the touch plan as part of support case context, including all the necessary information associated with the customer, client, and the product being supported. For example, the system performs a data dip to find associated customer information and interaction history for customer.

The system causes a screen pop to be displayed at the associate/specialists desktop with the associated customer information and interaction history. The system touch plan engine creates a custom email (based on an email template defined by the client, which may be part of the associated client integration system) and sends a case notification to the customer (e.g., notification channel having been setup or preferred by the customer) based on initiating the service/support interaction. The touch plan causes an appropriate component of the system to start logging all transaction steps of manual and/or automated steps/processes with updates visible via dashboard and reporting. The associate/specialist's desktop displays start of interaction including all customer data and interaction history.

In this example, the customer requests a replacement phone since customer's phone is damaged. The associate/specialist reviews customer contract and starts a process to sell replacement device to customer. The system touch plan receives an event from the associate/specialist desktop that they are looking into a phone change/upgrade/replacement on behalf of the customer. The system touch plan calls an "equipment review" business process based on the phone replacement request and customer data, completes successfully, and presents a result to the associate/specialist. In addition, the associate/specialist is prompted via desktop with an upsell option to provide to the customer with a Smartphone equal to, or better in price than the replacement phone. The associate/specialist presents the upsell option to the customer and the customer makes a selection.

In response, the system touch plan based on phone selection calls a "contract review" business process based on the Smartphone request, completes successfully, and presents a result to the associate/specialist. Further, the associate/specialist is prompted via desktop with another upsell option of an unlimited service plan with more options for a slight monthly increase. The associate/specialist presents the upsell option to the customer and the customer makes a selection. It is assumed that the customer agrees to both upsell options. The associate/specialist submits a new phone order to the client system. The associate/specialist collects proper payment information and finalizes order in the client system (e.g., via integrated or partner service API). The system touch plan then calls a payment authorization business process based on finalized order and receives purchase confirmation (e.g., from a third party payment facility via the integrated or partner service API).

The system touch plan then calls a new equipment order business process based on phone order and receives order confirmation, and possibly calls a client fulfillment system. The system touch plan measures the response time of request and makes customer feedback score results visible via dashboard and reporting. The system touch plan calls a service change business process based on the contract service change. The system touch plan measures the response time of request and makes results visible via dashboard and reporting. The system touch plan (during interaction) creates a custom email and sends the phone order & service change notification (optional) to the customer based on the customer's order. The associate/specialist completes the interaction with the customer and disconnects the chat.

The system touch plan however, may remain open. The system touch plan (at the end of interaction) creates a custom email and sends a case completion summary notification to the customer based on the interaction, with a survey. The system touch plan measures customer's response to the survey to rank customer experience determining an alteration (escalation, live interaction, etc.) of the touch plan or continue on current path, in this example the system determines no alteration is needed. The system touch plan then calls a ship equipment business process based on the completed order and queues shipment to customer. The system touch plan measures response time of request and makes results visible via dashboard and reporting.

In the event that the customer is a new customer visiting the client's web site for the first time, and chooses not to register to create a new account, and does not log into the web site, but requests service/support, then the client will not be identified and no data except anonymous data will be collected by the system. In the event a returning customer does not log into the web site and requests service/support, then the client is not identified, but a case is created and data collected.

Example of Use Case: Healthcare Monitoring—Nutrition Network

The embodiments described above can also be applied to healthcare monitoring of a nutrition network, where a nutritionist is a client of the support center. In this example, it is assumed that a client has set up the project in the support center and a patient has installed client's one-touch application on its mobile device. In addition, the patient has performed the user registration and device registration with the support center. Based on patient's personal profile, the system knows the location and time zone of the patient. The nutritionist has set up notification rules in the support system (e.g., as part of integrated client rules, database, or profile). In this project or service, the patient is supposedly keeping a daily diary (e.g., log) of intakes of food to be monitored by a nutritionist for medical or fitness purposes.

Normally, the patient runs the one-touch application from its mobile device and opens its daily diary. The patient needs to capture a meal by selecting the appropriate day then captures an image of the meal using a camera of the mobile device. The patient is prompted by the application to specify a type of meal (e.g., breakfast, lunch, dinner, or others). In this example, the patient specifies the type of meal as breakfast. The patient is then prompted by the application to enter a description of the meal (e.g., type of food, condiments, etc.). In this example, the patient may enter: 1) 2 eggs over medium; 2) a slice of toast with no butter; and 3) 1 cup of coffee with light sugar. The patient is prompted by the application to enter a time the meal was consumed. The patient then saves the diary entry and receives a confirmation that the entry was saved. The patient on a daily basis captures its weight and logs it in its diary. The system receives a notification that the patient has posted a new diary entry. In response, the system saves the entry and sends a confirmation back to the patient.

The system (e.g., an automated agent) reviews the entered data from the patient against a library of good and bad food intake identifying any items not allowed or not recommended in the patient's diet and updates the diary entry. The system analyzes daily weight of the patient and compares it with the projected goals. The system calculates the assumptive calorie intake and updates the diary entry. The system calculates overall goals and trend report for the nutritionist on the patient. The system creates a daily summary of the patient's activity and emails the daily summary to the nutritionist. When the nutritionist receives email notification of patient diary entries for the day, the nutritionist can click a link in email and is taken to the patient's diary page and goals trend report in the nutrition Web application. The nutritionist then reviews patient diary entries and goals trend report and may post comments to the patient in reply of the diary post(s). The comments are received by the patient's application on the mobile device.

When there is a need to meet the patient in person or over a live conference, the nutritionist can create a calendar entry based on the availability of the patient (e.g., presence information) and submit the calendar entry to the system. The patient receives notification via their application of a scheduled meeting with the nutritionist and meets with the nutritionist accordingly. During the meeting, the nutritionist can validate all of the data according to the plan.

In the event that the patient needs to modify or update the daily diary entry, the patient can also do that via its one-touch application from its mobile device. For example, if the patient realizes that something was left out on one of the meals for the day, the patient can add that to the entry via the one-touch application. The system receives the notification that the patient has posted an updated diary entry. In response, the system saves the update, replies a confirmation to the patient, and updates the log file of the patient for tracking and auditing purposes. In addition, the system may have to reanalyze the food intake, recalculate calorie intake, and reassess the goal and trend report based on the patient's update.

Subsequently, the system reviews the data entered from the patient against a library of good and bad food intake identifying any items not allowed or not recommended in the Patients diet and updates the diary entry based on the assumptive calorie intake and generating a trend report for the nutritionist. The report is then transmitted to the nutritionist and the patient is informed. Based on the patient's profile and/or nutritionist's setting, the system may create a daily summary of the patient's activity and emails the summary to the nutritionist.

In the event that the nutritionist does not receive the summary or report, the nutritionist can notify the system. For example, the nutritionist can select one of the communication channels such as a chat function on its application (e.g., Web application) to contact (e.g., via a service API) a support specialist (e.g., agent of the support center) for assistance. A support specialist enters the chat, opens a case (e.g., tracked by a unique case ID), and collects the problem information from the nutritionist. The support specialist then fixes the problem for the nutritionist.

In the event that the system identifies that something goes wrong based on the analysis of patient's diary entries, the nutritionist may receive an early notification from the support system. For example, the nutritionist receives an email notification of patient's diary entries early due to an item identified from the NOT allowed diet foods. The nutritionist clicks a link in the email and is taken to the patient's diary page and goals trend report in their nutrition Web application. The nutritionist reviews patient's diary entries and goals trend report. The nutritionist can select a click-to-call button from the Web application to contact the patient, discuss the problem with the patient, and establish a corrective action.

In some situations, the system may identify some items in the patient's diary report that are not in accordance with the plan based on the analysis. For example, the system reviews the data entered from the patient against a library of good and bad food intake to identify any items that are not allowed or not recommended in the patient's diet. The system may identify an exception to report based on an item entered by the patient, where this item was identified from the NOT allowed diet foods. The system calculates the assumptive calorie intake and updates the diary entry. The system further calculates overall goals and trend report for nutritionist on the patient, updates a daily summary of the patient's activity, and emails the summary to the nutritionist immediately.

In response, the nutritionist can provide a corrective intervention or action based on patient's daily goals and trend. The nutritionist after discussing the problem with the patient and setting corrective action, can sets a flag on the patient's diary for immediate notification for a period of time (e.g., number of meals or number of days) to monitor patient's activities closely.

Example of Use Case: Payment Support

The embodiments described above can also be applied to payment support for certain products or services. For example, the techniques described above can be applied to payment support of hotel services, where the hotel service provider is a client of the support center. In this example, it is assumed that a client supports customer check-in via magnetic strip card (loyalty/credit card/other). The client supports customer check-in via a near field communications (NFC) enabled device. A client project has already been set up and configured on the support center. A customer already has a digital wallet client application (e.g., one-touch application) loaded on its mobile device. The customer has already registered with a client site setting up profile, preferences, payment specifics and digital wallet ID, etc. The customer has set up a reservation with quick check-in based on digital wallet ID.

When the customer arrives at the hotel and approaches quick check-in at a kiosk near the front desk, the customer uses NFC enabled device to check in. The customer activates scan of NFC device for check in and scan is accepted. The system communicatively coupled to the kiosk receives an NFC request and information from customer device. The system pulls up customer folio and presents to the customer at the kiosk for review. The customer is asked to review and confirm reservation specifics and is noted how all charges are to be handled. In addition, the system determines from customer history etc., an upsell offer available and presents the offer to customer. For example, the customer is presented with an upsell for a larger room if paid for using its digital wallet ID during the stay. If the customer accepts, the system applies changes to room selection, rate and assigns room for guest. Thereafter, the system authorizes Customer digital wallet for access.

Further, the system determines from customer history etc., a coupon available and presents the coupon or coupons to the customer and applies coupon specifics to digital wallet. The customer is presented with loyalty discount opportunities available at the restaurant and bar if paid for using its digital wallet ID during the stay. The customer is presented with a welcome message and information about activities available during the stay. The system may further determine activities the customer would be interested in based on the customer profile and present the same to the customer. Once the check-in process is done, the customer heads to the hotel room and uses NFC device instead of guest room card to access the room. The system matches NFC information to customer list to determine access and the access is granted.

In another scenario, if the kiosk does not accept the check-in scanning (e.g., NFC device fails), the system detects the problem and prompts the customer to use their credit card instead. Meanwhile, the kiosk sends an error event to the support system, where the support system logs the customer event it has received during the NFC scan error (possibly multiple times). In response to the error event, the support center creates a unique case ID and a touch plan tracked by the case ID as described above.

The touch plan engine forwards the touch plan to an available support specialist with all the necessary data (e.g., client, product, history, etc.) Meanwhile, the customer pulls out a credit card and swipes (backup to NFC) and the customer is prompted with a click-to-call option to resolve the issue. If the customer selects click-to-call option from the kiosk, the customer is routed to the available support associate currently working issue via VoIP on the Kiosk. The support specialist receives the call, updates case, reviews, and resolves the problem if possible during call. The customer is asked to perform a test scan of their NFC device, which works successfully. The support specialist updates case and closes the touch plan, and sends a summary of interaction to customer via an email.

Example of Use Case: Ticketing Support

The embodiments described above can also be applied to ticketing support in a concert environment, where the tickets are provided by a client of the support center. In this example, it is assumed that the client already supports customer check in via near-field chip (NFC) enabled devices or barcode enabled devices. A client project has already been set up and configured in the support center (e.g., client profile or rules). A customer has a mobile device as a digital wallet with a client application (e.g., one-touch application) loaded on the mobile device. The customer has already registered with a client site setting up profile, preferences, payment specifics and digital wallet ID, etc.

It is also assumed that the customer has purchased ticket(s) for a concert via a mobile application or Web (e.g., Ticketmaster.com, Cheaptickets.com, Livenation.com, Gotickets.com, Ticketsnow.com, etc.) and the system emails customer the ticket(s) upon completion of the purchase (e.g., barcode). The customer receives emailed tickets via its mobile device (or PC) to be used at a venue ticket scanner. The system sends the customer a notification to use the ticketed line once at the theatre (based on rules, history, perk). The customer receives a notice to use the ticketed line at the venue (perk for pre-purchase) and arrives at the venue with the purchased ticket to see a concert.

The customer enters the ticketed line to scan ticket(s) at a kiosk (puts them ahead of people just making ticket purchase). The customer scans ticket(s) and is confirmed for the concert, and receives a coupon (from the system, via their mobile) for a discount off their concession purchase. The customer proceeds to concession for other goods (e.g., drinks or snacks) using its mobile wallet as well as the coupon received at ticket check-in to purchase concession items. The system accepts the purchase from the customer's mobile wallet and applies the discount provided at check-in. The consumer proceeds to the venue hall to watch the concert. Further, the customer receives notification (upon completion of concert) of an upcoming concert meeting their preconfigured/profile music preferences and elects to pre-order tickets and makes purchase via mobile application/wallet. The system accepts funds and emails new ticket(s) for concert and the customer leaves the venue.

In another scenario, the customer never receives the ticket(s) purchased and calls support line from its mobile device to locate status of tickets while heading to the concert venue. The system received the call and forwards to a specialist support queue. A support specialist receives the call and is communication with the customer. The customer describes problem and the support specialist identifies a problem and corrects the problem (e.g., email in profile incorrect, changes and resubmits). In this example, the system updates email address and resends tickets to customers email address.

At the entrance of the concert, the customer tries to scan the ticket in the email but the system will not accept. The system identifies that customer's scan is not working and prompts the customer at its mobile device to speak with a specialist. The customer clicks a call button to accept and the system places the call to customer then connects to a support specialist. The customer describes problem and the support specialist identifies and corrects the problem (e.g., scanner on kiosk or NFC device is bad). The support specialist checks the customer in and sends a confirmation receipt to the customer.

Example of Use Case: Nook Support on Google ePub

The embodiments described above can also be applied to support an eBook on an eBook reader provided by a client of the support center. In this example, a customer has purchased an eBook from a vendor such as an ePub™ from Google®, where an ePub is an Adobe® Adept Digital Rights Management (DRM) document for Google viewer. An ePub must have DRM transferred (converted) from Google to Nook™ (e.g., an eBook format from Barnes & Noble® Adept DRM). It is assumed that the customer has already performed user and product registration and made changes to their profile for support using some of the techniques described above, such as, for example, one-touch registration processes set forth above.

In this example, the customer has purchased an ePub from Google and would like to view on a Nook reader. However, the customer has trouble trying to convert document for viewing on a Nook device. For example, the customer places an ePub file on the Nook device and cannot read. The customer goes to Nook support Web site (e.g., client hosted support site) and searches knowledgebase for support articles, which may be prepared and published by the support center using some of the self-support techniques described above. The customer is presented with a document on how to convert the Google Adept DRM to Nook Adept DRM, such that the document can be read on its Nook device. The customer is instructed to go to the Adobe Web site (link provided within the document) to download and install Adobe Digital Editions for transferring rights to the nook device. The customer opens Digital Editions and is asked to plug in the Nook device and the Digital Editions mounts the Nook device. The customer is instructed to drag ePub from its computer to the Nook device and the conversion is performed. The customer opens the eBook on the Nook device to verify book can be viewed successfully.

However, in some situations, there may be a problem for the customer to convert the eBook even after reviewing the self-support articles. For the purposes of illustration, it is assumed that the customer searches the knowledgebase (e.g., procedure to convert the DRM), does not find an article to assist. The customer may go to an online community forum and cannot get help from anyone. The customer is frustrated and enters a chat with a support specialist for proper directions to convert. In this example, the customer from the forum clicks on a "chat now" button (e.g., one-touch button) to initiate a request for a live session with a support specialist (e.g., agent or expert). The request may be received at the support center via the service API described above.

In response to the request, the support system creates a session case ID that uniquely identifies the current instant of support case and initiates a touch plan. The support specialist enters a chat session with the customer and informs the customer that they can perform the entire process for them for a fee. It is assumed that the customer agrees and provides proper billing information. The support specialist captures billing information and submits order for support interaction, for example, using a third party billing system via an integrated or partner service API. The support specialist asks the customer to plug the Nook into the computer, instructs the customer to navigate to a link and enter a code for a remote computer control session.

The support specialist goes to the Adobe's Web site, downloads and installs Adobe Digital Editions for transferring rights to the nook onto the customer's computer. The support specialist opens the Digital Editions and the Digital Editions mounts the Nook device. The support specialist drags the ePub file from the computer to Nook device and conversion is performed. The support specialist asks the customer (via chat) to open the eBook on the Nook device to verify that the eBook can be viewed. The customer confirms that the eBook can be read and the support specialist ends remote control of the customer's computer. The support specialist submits final case information and ends the session with the customer.

Examples of Use Case: Travels

The embodiments described above can also be applied to support travel situations such as a vacation trip. In this situation, a customer of a support center may be a traveler who is presented with a multitude of potential issues or mishaps while executing on a travel itinerary setup by the traveler or someone else. In the case of simple events the traveler can be overcome easily but when more complex events happen (e.g., cascading events) the traveler is left in a bad state and cannot be helped by any one vendor whom they have purchased assets for travel from.

The example set forth below is in reality a worst case scenario for a consumer and demonstrates the ramifications (cascading events or domino effect) of a single issue effecting reservations and events downstream. In this example, it is assumed that a traveler for a given trip will need to schedule the following:

A ride to the airport
    A flight to Miami
    Some where to stay prior to the cruise
    A booking for a cruise to the Bahamas
    A car to do some sightseeing in Miami after the cruise
    A return flight home from Miami
    A shuttle ride from the airport to home The customer embarks on their travel leaving on the shuttle to the airport. While in transit to the airport the shuttle encounters an accident on the highway. Due to the accident the shuttle arrives late to the airport and the customer misses its flight to Miami. Typically, the customer goes to the airline and is re-ticketed for the next flight out. The customer's baggage must be located to forward to the new flight. The customer travels on the flight to Miami, arrives and takes a shuttle to the hotel. Since its flight was late the customer arrives at the hotel late. Not having flagged the reservation with a late check in, their room was given to someone else. They are not able to get a new room at the same hotel so they have to move to a motel that has an open room. They get to their room and turn in for the night. The next day they embark on their cruise.

Once they return from the cruise the customer who will be staying a couple days in Miami calls the rental car company to find that the reservation for a mid-size car made weeks ago has been lost and all that is available is a sub-compact. The customer takes the car and travels to their new hotel room during their Miami stay and checks in. They then go sightseeing in Miami in their sub compact. Once their sightseeing excursion is over they embark for the airport for their trip home. Upon arriving at the airport they find that their flight is delayed due to poor weather, they are rebooked onto a later flight and depart for home. Once at their home airport they pick up their baggage and head to the shuttle finding that they have missed it due to the flight delay. They must wait for two hours for the next shuttle. Once the shuttle arrives they head for home.

The above hassles can be avoided or reduced if the traveler becomes a customer of the support center and takes advantage of support services from the support center. Note that the above event services may be provided by multiple different vendors or service providers. For example, the ride to and back from the airport may be provided by the same or different taxi, shuttle bus, or car rental companies. The hotel stays prior to and after the cruise may be provided by the same or different hotels or hotel chains. The flights to and back from Miami may be provided by the same or different airline companies. It would be a nightmare for the customer to rearrange the schedule for some of the events with individual vendors or service providers.

The customer may purchase a travel package from a client of the support center such as Expedia and has registered with the support center. As described above, the customer may register with the support center by sending a copy of electronic receipt(s), itinerary or eTicket(s), or a transaction ID of the purchase to the support center from a one-touch application from its mobile device, without having to provide all the necessary information concerning all of the reservations from various vendors. The support center can compile all of the necessary information from various sources (e.g., from vendors via integrated or partner APIs).

Once the travel package has been registered with the support center, a touch plan is created specifically tailored to the travel schedule. In addition, relationships amongst the activities or events are identified or determined. All activities and events occurring from each activity are monitored and managed accordingly by the support center. That is, the support center has all the tools and "connections" with at least some of the vendors or service providers (e.g., via integrated or partner APIs) to rearrange the schedule on behalf of the customer and/or client, without requiring the customer to individually contact the vendors or service providers.

In this example, on the way to Miami, the system may receive real-time traffic information from a traffic report service provider, for example, via an integrated or partner service API. Based on the touch plan, the system can notify (e.g., via the driver of the shuttle of the situation on the highway and provide an alternate route to the airport to possibly get the consumer there in time for their flight.

If the shuttle still arrives late at the airport, the system can automatically rebook the customer for a different flight (even on an alternate airline) and notify the customer of the change as well as updating and sending new eTickets to customer's mobile device. In addition, having rebooked the flight the system tracks the reroute of the consumer's baggage to ensure they end up on the proper flight. Further, the consumer's hotel reservations are updated by the system for a late check-in such that the room is not assigned to someone else. All these operations are proactively performed by the support center without having the customer to initiate the rearrangement.

Similarly, on the way back from Miami, the system manages the confirmation of the rental car. If the rental car is not available, the system can book a car at another car rental agency and alerts the consumer on their mobile device. Due to the poor weather experienced the airport has delayed flights. The system monitoring the flight for the consumer automatically rebooks the flight for the next available, alerts the consumer, and sends the customer a new eTicket for rebooked flight. The shuttle driver is alerted that a consumer and family are arriving from Miami and meets them at baggage claim for their ride home.

Example of Data Processing System

Figure 30:
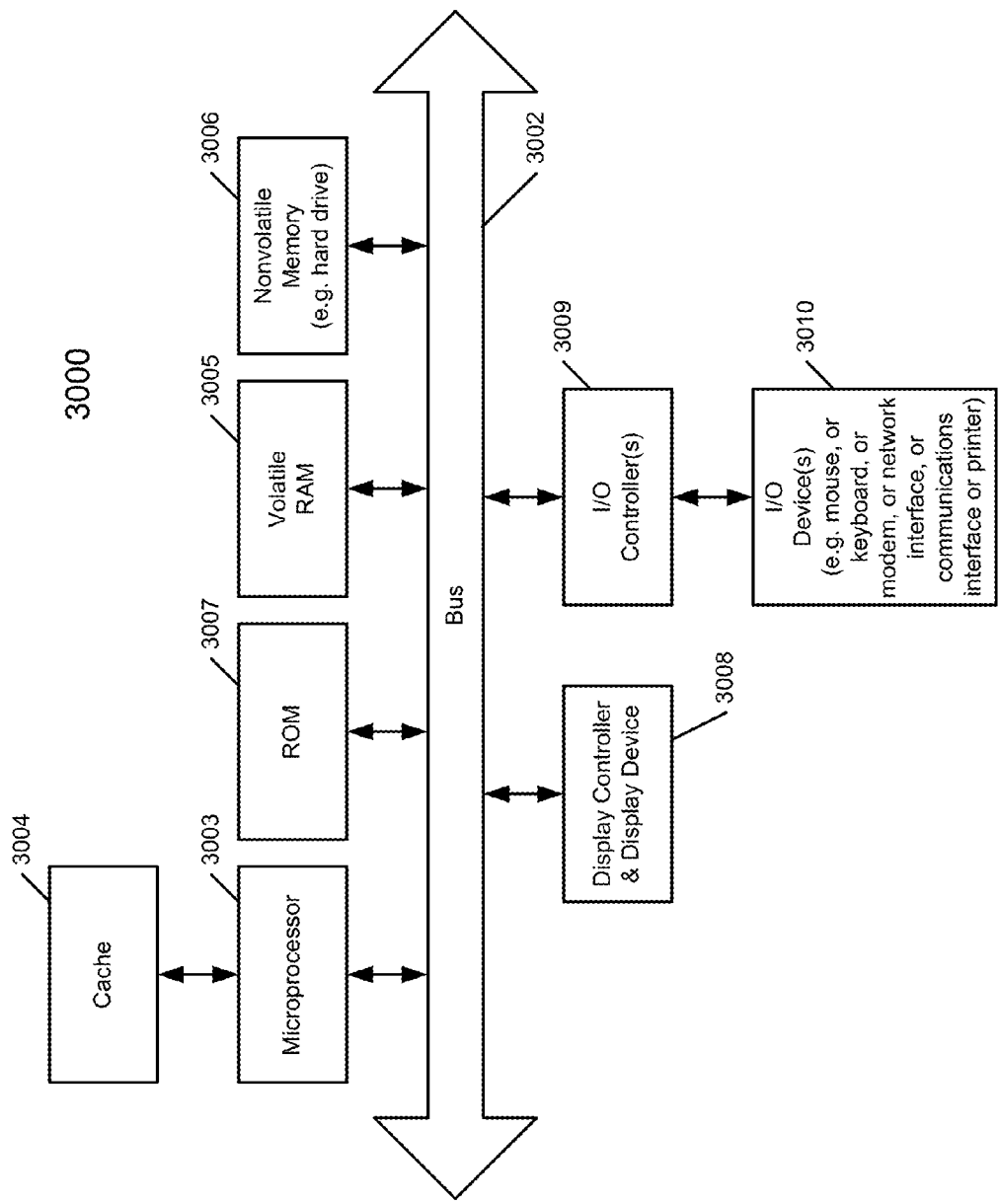
FIG. 30 is a block diagram of a data processing system, which may be used with one embodiment of the invention.

FIG. 30 is a block diagram of a data processing system, which may be used with one embodiment of the invention. For example, the system 3000 may be used as part of a client or server system as shown in FIG. 1. Note that while FIG. 30 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 30 may, for example, be an Apple Macintosh computer or MacBook, an IBM compatible PC, or a computer server.

As shown in FIG. 30, the computer system 3000, which is a form of a data processing system, includes a bus or interconnect 3002 which is coupled to one or more microprocessors 3003 and a ROM 3007, a volatile RAM 3005, and a non-volatile memory 3006. The microprocessor 3003 is coupled to cache memory 3004. The bus 3002 interconnects these various components together and also interconnects these components 3003, 3007, 3005, and 3006 to a display controller and display device 3008, as well as to input/output (I/O) devices 3010, which may be mice, keyboards, modems, network interfaces, printers, and other devices which are well-known in the art.

Typically, the input/output devices 3010 are coupled to the system through input/output controllers 3009. The volatile RAM 3005 is typically implemented as dynamic RAM (DRAM) which requires power continuously in order to refresh or maintain the data in the memory. The non-volatile memory 3006 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 30 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 3002 may include one or more buses connected to each other through various bridges, controllers, and/or adapters, as is well-known in the art. In one embodiment, the I/O controller 3009 includes a USB (Universal Serial Bus) adapter for controlling USB peripherals. Alternatively, I/O controller 3009 may include an IEEE-1394 adapter, also known as FireWire adapter, for controlling FireWire devices.

Embodiments of Graphical User Interfaces

Figure 31B:
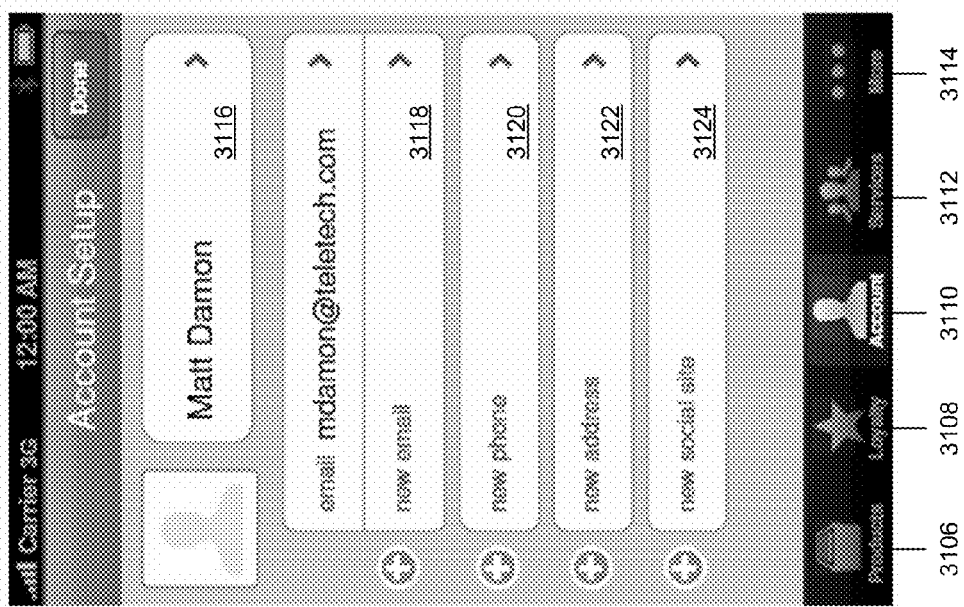
FIGS. 31A-31D are screenshots representing examples of graphical user interfaces of a one-touch application according to one embodiment of the invention.
Figure 31A:
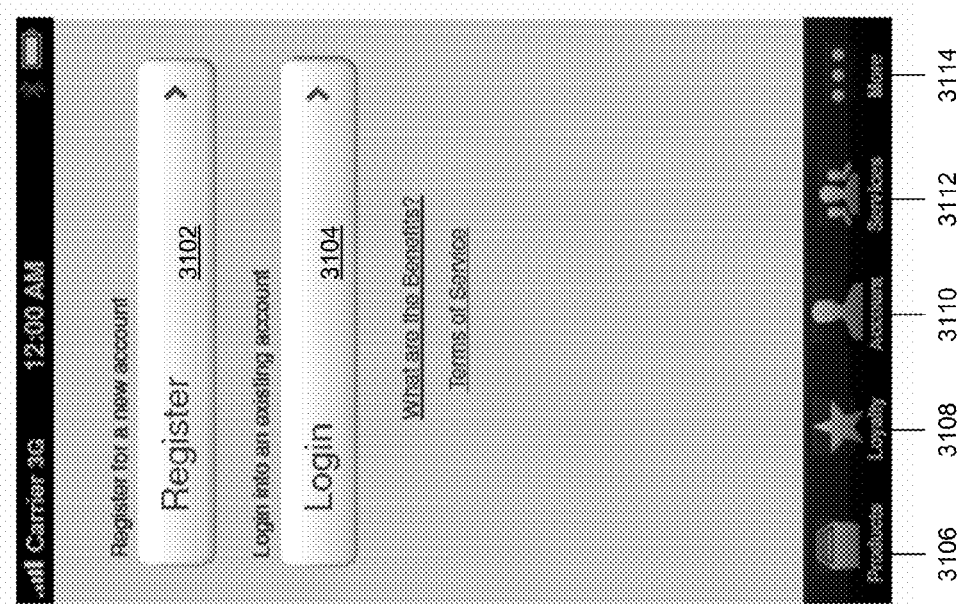

FIGS. 31A-31D are screenshots representing examples of graphical user interfaces of a one-touch application according to one embodiment of the invention. For example, the GUIs as shown in FIGS. 31A-31D may be implemented as part of one-touch application 106 installed on mobile device 101 of FIG. 1. Referring to FIGS. 31A-31D, the GUI as shown in FIG. 31A is displayed when a user launches the one-touch application from its mobile device. The one-touch application as shown in FIG. 31A includes multiple pages 3106-3114, each of which can be activated and displayed by activating (e.g., clicking, tapping, or via a voice interactive command) the corresponding graphical representation (e.g., icon). Before a user can access any one of the pages 3106-3114, the user has to either create a user account or log into an existing user account of the support center.

Figure 31D:
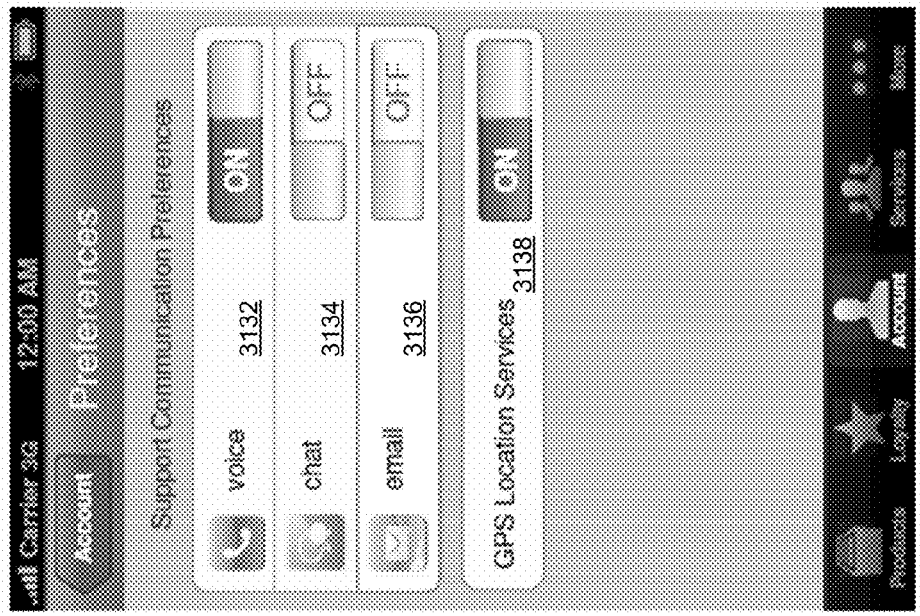
Figure 31C:
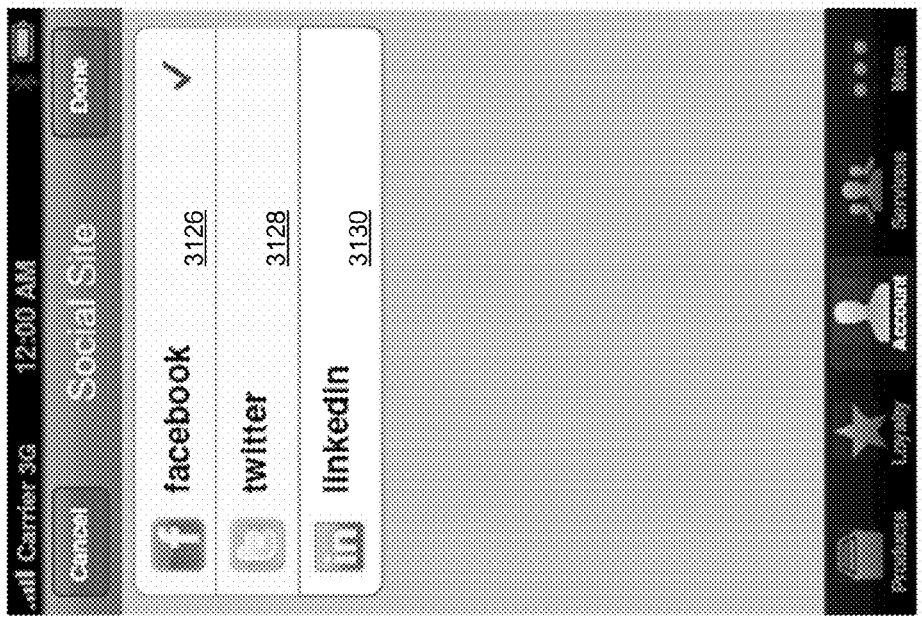

As described above, when the one-touch application is launched, the one-touch application is configured to communicate with the support center via a set of APIs. A user can log in and access its existing account via button 3104, which in turn access the existing account at the support center. If the user does not have an existing account, the user can also create a new account via button 3102. When button 3102 is activated, the GUI page as shown in FIG. 31B is displayed, which is a part of account page 3110. In one embodiment, the GUI page as shown in FIG. 31B allows the user to enter any user specific information, such as, for example, name 3116, email address(es) 3118, phone number(s) 3120, address(es) 3122, social site(s) 2124, and other information such as preferences (not shown), etc. For example, a user can activate social site 3124 to specify one or more social sites in which the user has an account, such as social sites 3126-3130 as shown in FIG. 31C. By specifying social sites 3126-3130, the user gives a consent or permission to the system to access its information via the corresponding social sites (not limited to shown) 3126-3130.

In one embodiment, a user can also specify support communication preferences by activating the corresponding preference item (not shown) from the list displayed on the GUI page as shown in FIG. 31B. A preference setting page as shown in FIG. 31D allows a user to specify one or more communication channels, such as voice 3132, chat 3134, email 3136, and other channels (e.g., video chat, SMS, scheduled call back, etc.). Such communication preferences of the user can be used in combination of communication preferences of a client to determine availability of communication channels to allow the user to reach an agent of the support center during a subsequent support service as described above. The user can also specify, via setting 3138, whether the system can utilize global positioning system (GPS) location services to provide geographical location information of the user (e.g., presence information) as part of support services provided to the user. By enabling GPS location services 3138, the user gives consent or permission to the system for such a usage for the purpose of privacy concerns.

Figure 32D:
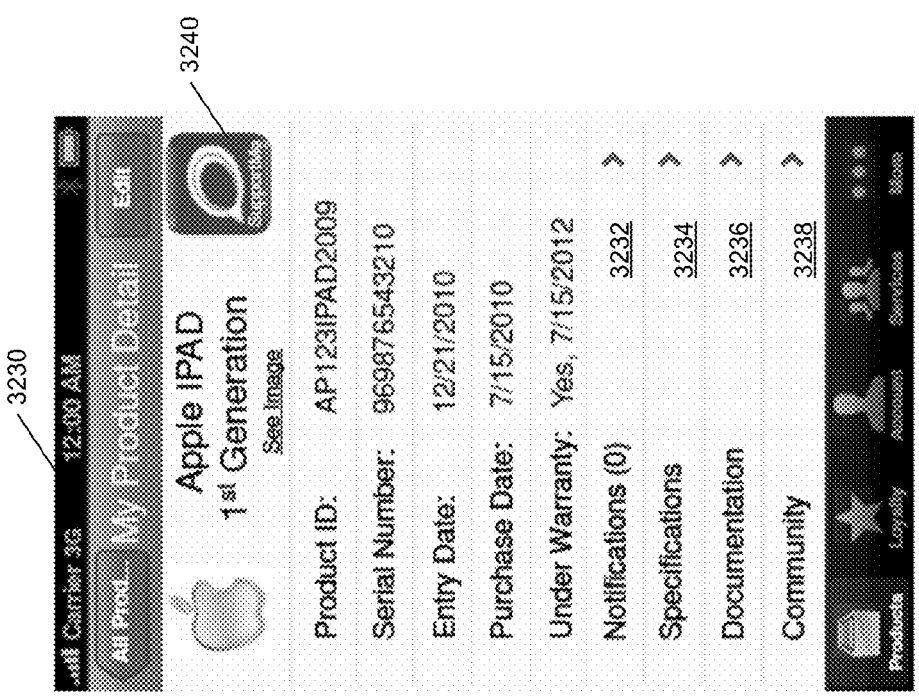

FIGS. 32A-32F are screenshots representing examples of graphical user interfaces of a one-touch application according to another embodiment of the invention. For example, GUI page 3200 of FIGS. 32A-32F can be displayed by activating products tab 3106 from GUI pages of FIGS. 31A-31D. Referring to FIGS. 32A-32F, GUI 3200 is displayed including a list of one or more products, such as products 3206 and 3208, which are owned and have been registered by the user. GUI page 3200 further includes search tool 3204 to allow a user to search a particular registered product. From the list of registered products as shown in FIG. 32A, if a particular product has an event or notification pending, a number representing number of events or notifications is also displayed within proximity of the corresponding product. For example, number 3210 indicates that there is at least one pending event or notification of product 3208.

In one embodiment, GUI page 3200 further includes button 3202 to register an additional product. When button 3202 is activated, GUI page 3218 is displayed as shown in FIG. 32B. GUI page 3218 allows a user to register a product via variety current of mechanisms as well as future mechanisms as they are technically made available. A user can register a product by scanning a barcode or barcodes of a product via link 3212 or scanning a QR code or codes of a product via link 3214. Alternatively, a user can manually enter product information via link 3216.

Figure 32C:
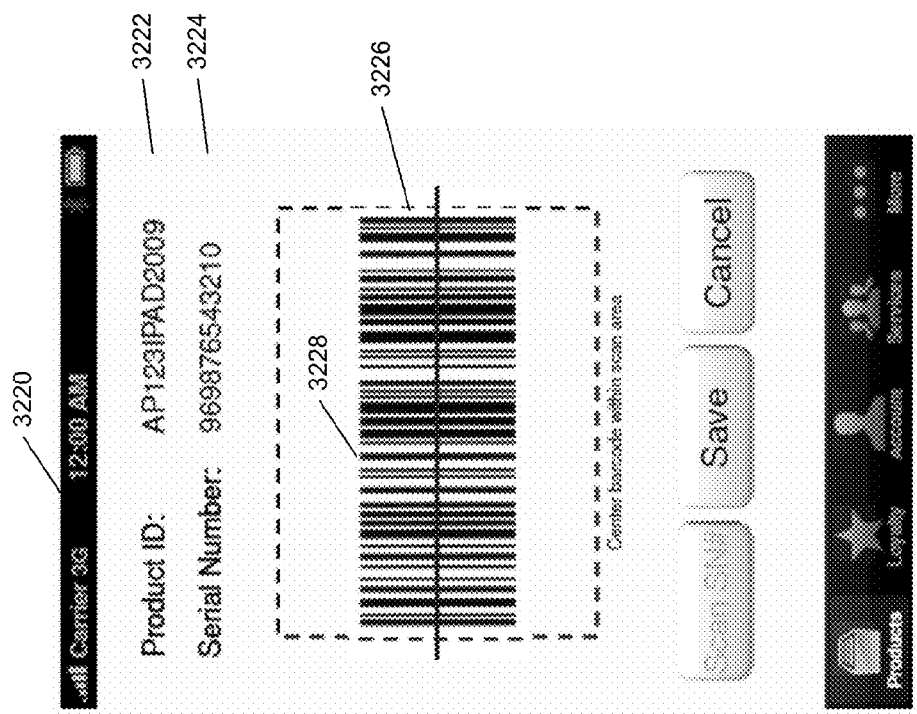

For the purpose of illustration, it is assumed that the user wishes to register a product by scanning a barcode via link 3212. According to one embodiment, when link 3212 is activated, GUI page 3220 is displayed as shown in FIG. 32C. Referring to FIG. 32C, in this embodiment, a user can scan a barcode using GUI page 3220 to register a product. The user can place barcode 3228 of the product within scanning window 3226 to obtain product ID 3222 and/or serial number 3224 of the product. The scanned information is then transmitted from the mobile device to the support center to allow the system to compile the necessary information about the product and/or user. As described above, the system can communicate with all the parties (e.g., retailer, manufacturer, etc.) via proper service APIs to automatically obtain information such as product information, loyalty information, or the like, without user intervention. For certain information that cannot be obtained automatically, the user can manually enter the information. The detailed information can then be stored in a customer asset store (e.g., asset store 219 of FIG. 2).

In one embodiment, the product detailed information can be retrieved from the support center and displayed on the mobile device as part of GUI page 3230 as shown in FIG. 32D. Referring to FIG. 32D, the displayed product detailed information includes (but not limited to) the product ID, serial number, purchase date, and warranty information, etc. In addition, GUI page 3230 further includes one or more links 3232-3238 to allow a user to access other information associated with the corresponding product. In one embodiment, link 3232 allows a user to access a notification issued on the product, such as an offer to upgrade or discount, a recall notification, etc. Link 3234 allows a user to access the detailed specification of the product. Link 3236 allows a user to access documents such as user manuals of the product. Link 3238 allows a user to access an online community (e.g., discussion forum) associated with the product. Note that GUI page 3230 can also be accessed or displayed by selecting one of the registered products (e.g., product 3206) from GUI page 3200 of FIG. 32A.

Figure 32F:
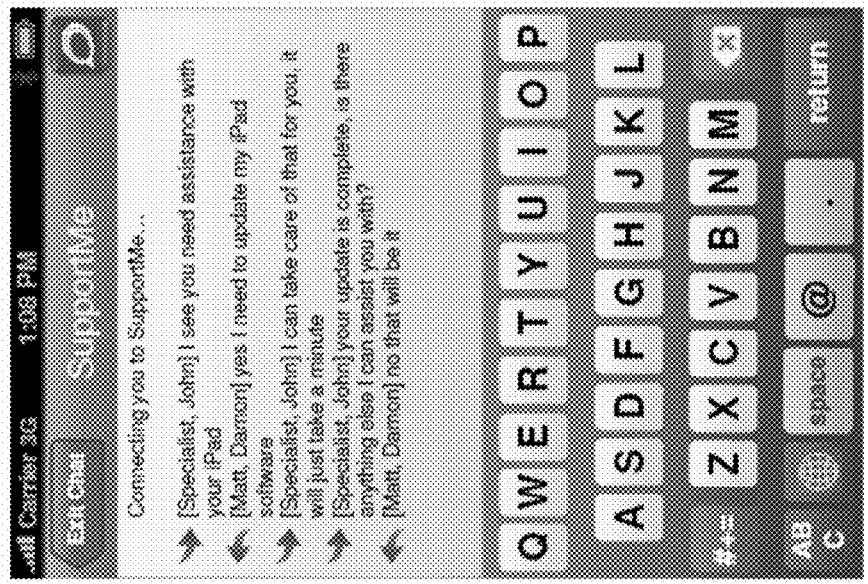
Figure 32E:
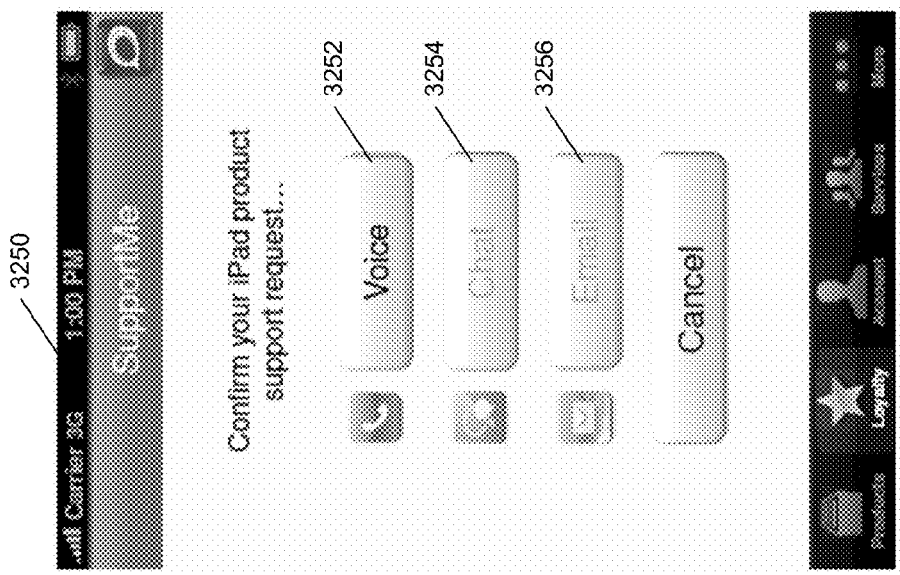

According to one embodiment, GUI page 3230 further includes button 3240 to allow a user to obtain one-touch support services from the support center. When button 3240 is activated from GUI page 3230 of FIG. 32D, GUI page 3250 is displayed as shown in FIG. 32E. Within GUI page 3250, according to one embodiment, a list of one or more communication channels or mechanisms that are available to a user to contact a support agent is displayed. In this example, the available communication channels include voice 3252, while chat 3254 and email 3256 are unavailable. As described above, the availability of the communication channels is determined based on user's preferences and client's preferences. Note that for purposes of illustration only, voice, chat, and email are utilized examples of communication channels; other communication channels such as video chat, SMS, call back, etc., can also be utilized. Assuming that chat 3254 is available in this example, a user can launch a chat session with an agent of the support center to obtain support services as shown in FIG. 32F.

Figure 33B:
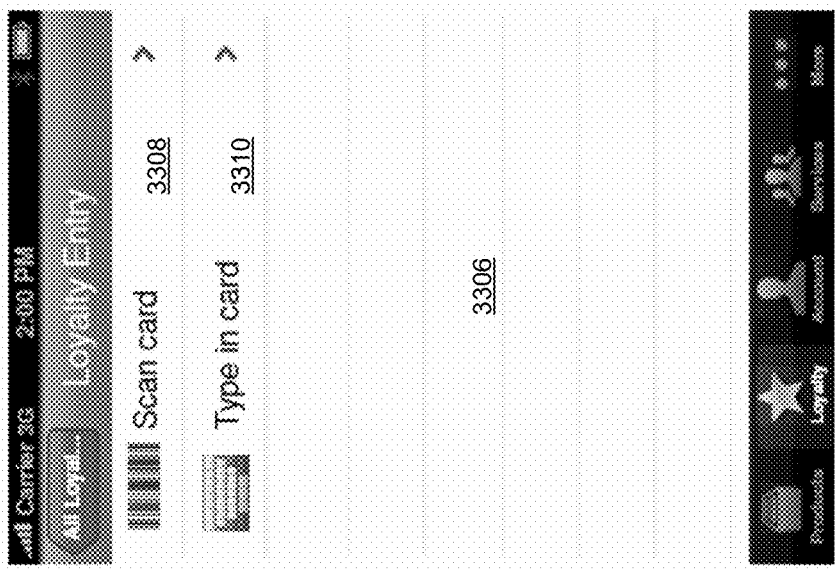
FIGS. 33A-33D are screenshots representing examples of graphical user interfaces of a one-touch application according to another embodiment of the invention.
Figure 33A:
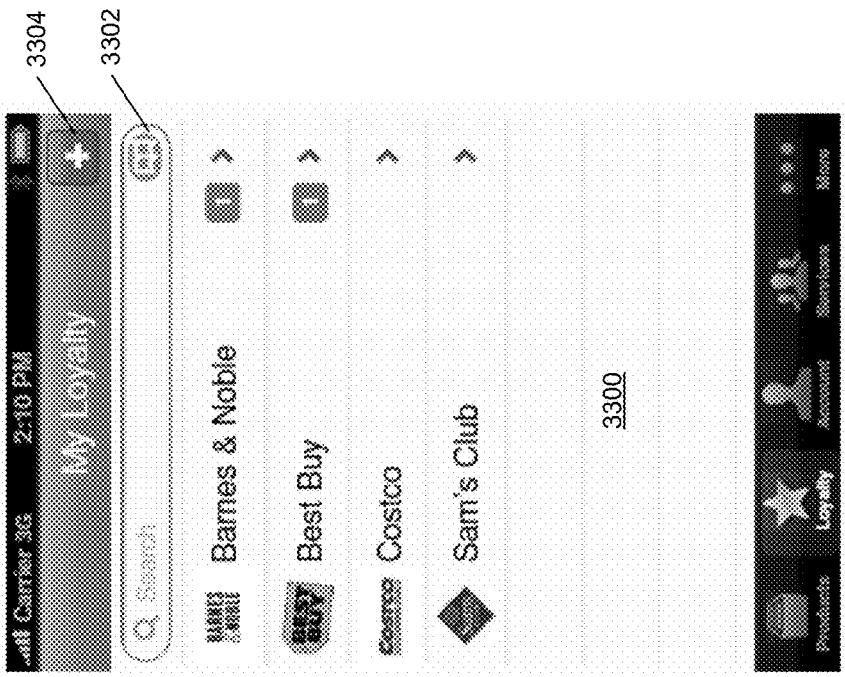
Figures 33C, 33D:

Similar to product registration, according to one embodiment, a loyalty or reward card of a client (e.g., retailer) can also be registered with the support center via the one-touch application. FIGS. 33A-33D are screenshots representing examples of graphical user interfaces of a one-touch application according to another embodiment of the invention. For example, GUI page 3300 of FIG. 33A can be retrieved and displayed by activating loyalty tab 3108 from other GUI pages, which lists a list of registered loyalty programs of the user. Referring to FIGS. 33A-33D, a user can also search a registered loyalty program using search tool 3302. A user can also register an additional loyalty program by activating button 3304, which displays GUI page 3306 as shown in FIG. 33B. From GUI page 3306, the user can register a loyalty program by either scanning a barcode of a loyalty card via link 3308 or manually entering the information via link 3310. If the user wishes register via scanning, the user can activate link 3308, which displays the GUI page as shown in FIG. 33C. Similar to scanning barcodes of a product, from the GUI page of FIG. 33C, a user can register a loyalty program by scanning a barcode of a loyalty card or reward card.

Based on the information obtain from the scanning or from the user, detailed loyalty information can be obtained by the support center from proper informal sources via proper APIs. The detailed information can also be retrieved from the system and displayed as GUI page 3320 on the mobile device as shown in FIG. 33D. Referring to FIG. 33D, from GUI page 3320, a user can access one or more offers (e.g., rewards, discounts, upgrades) from the program via link 3322. The user can also find a nearby office via link 3324; access an online community associated with the program via link 3326; and access the program's Web site via link 3328. If the user needs to talk to a live agent concerning the corresponding loyalty program, the user can activate support button 3330, which brings the user to a support GUI page similar those as shown in FIGS. 32E and 32F.

Figure 34B:
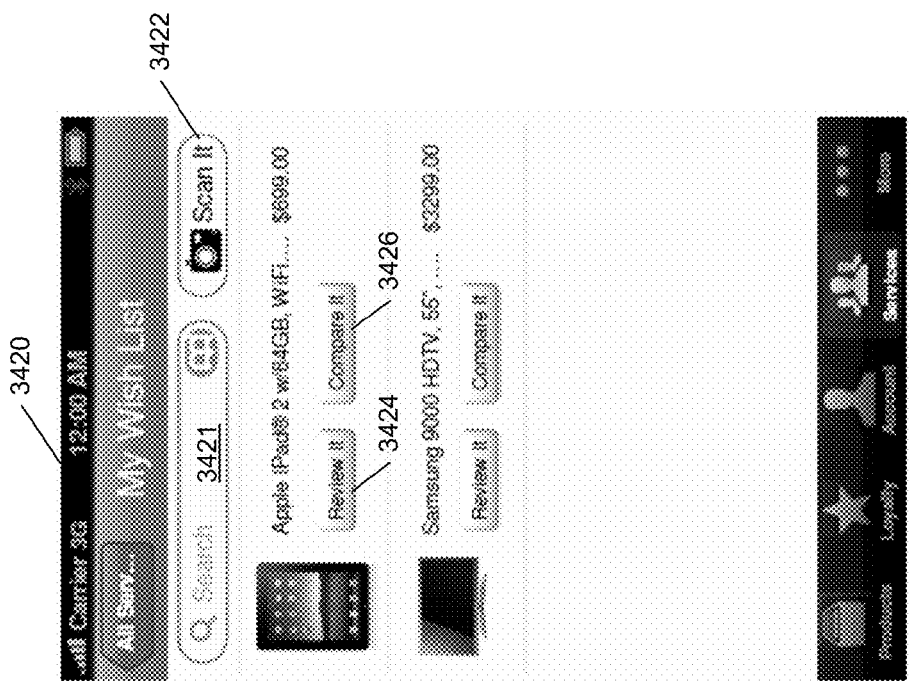

FIGS. 34A-34L are screenshots representing examples of graphical user interfaces of a one-touch application according to another embodiment of the invention. For example, GUI page 3400 of FIG. 34A can be displayed by activating services tab 3112. Referring to FIGS. 34A-34L, GUI page 3400 of FIG. 34A includes (but not limited to) displayed therein a list of services 3402-3418 that can be provided to the user by the support center. In one embodiment, a user can compile a list of items the user wishes to have by activating link 3402, which displays GUI 3420 as shown in FIG. 34B.

Referring to FIG. 34B, from GUI page 3420, a user can search for an item that is interesting to the user using search tool 3421. For example, a user can search on the Internet for an item the user wishes for. Alternatively, the user can scan using scanning tool 3422 a barcode or QR code of the wished product. This is useful when a user is shopping in a retail store in that the user can scan the barcode of the product in order to add the product into its wish list. In one embodiment, for each of the items listed in the wish list, the user can review other people's comments about the product by activating button 3424, which brings a list of comments from other users as shown in FIG. 34C. In addition, the user can also compare the product with another one by activating button 3426, which displays comparison GUI page as shown in FIG. 34D. From the GUI page of FIG. 34D, each of the products listed also includes information indicating whether the corresponding product is currently owned by the user. Further, the user can display detailed comparison information (e.g., side-by-side information) by activating button 3428. Note that the GUI page as shown in FIG. 34C can also be displayed via link 3404 of FIG. 34A and the GUI page as shown in FIG. 34D can also be displayed via link 3406 of FIG. 34A.

Figure 34A:
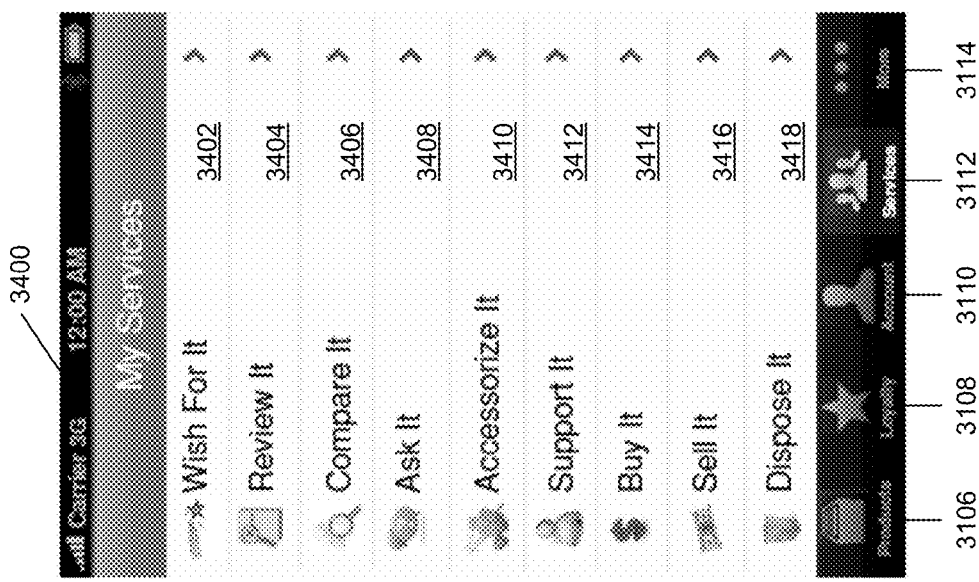
Figures 34C, 34D:
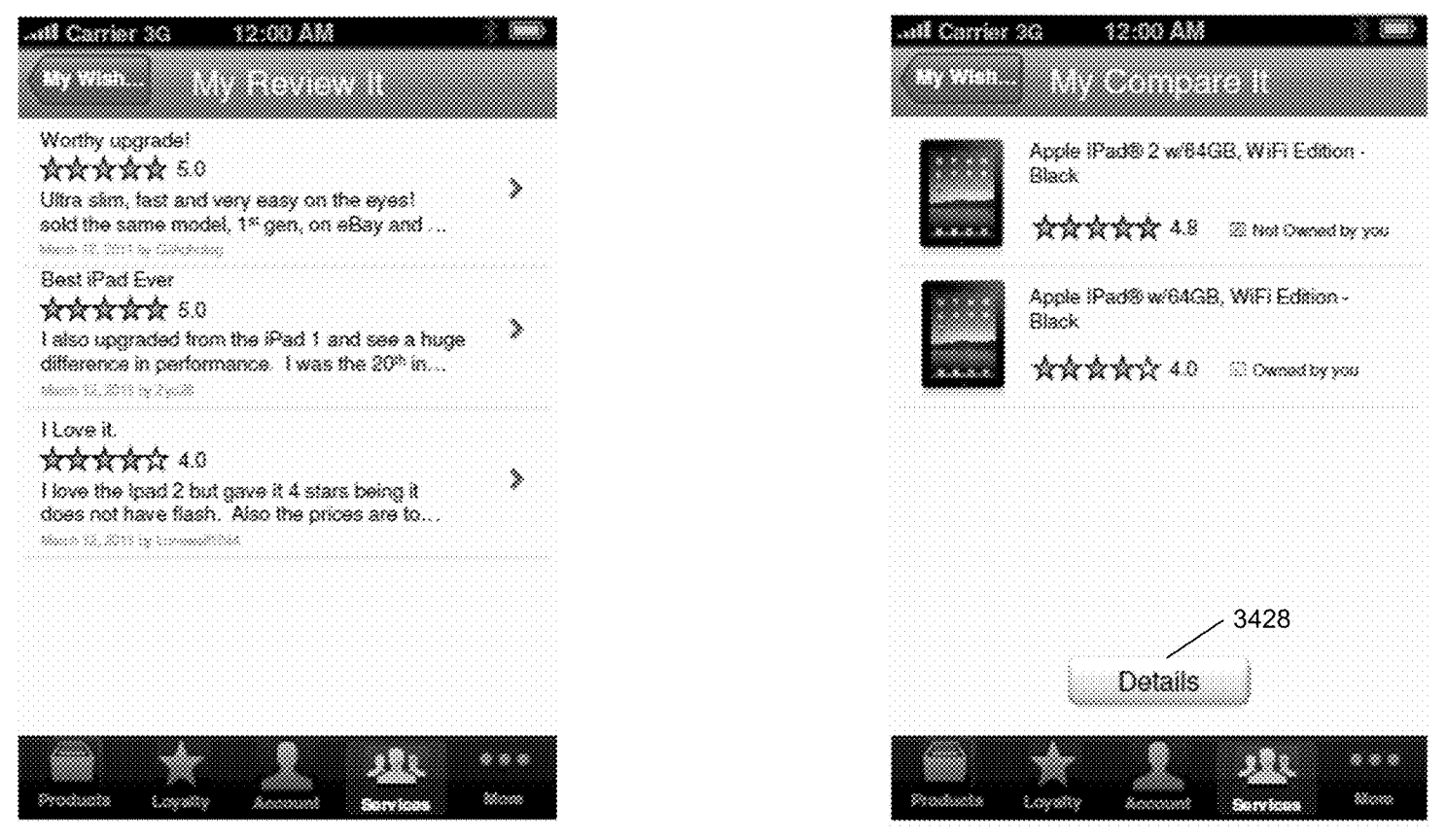
Figure 34F:
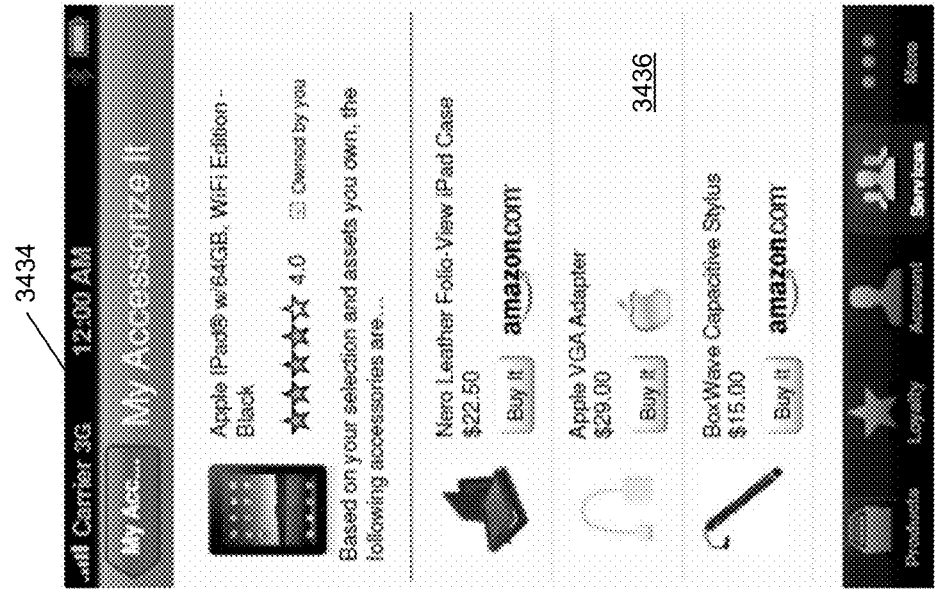
Figure 34E:
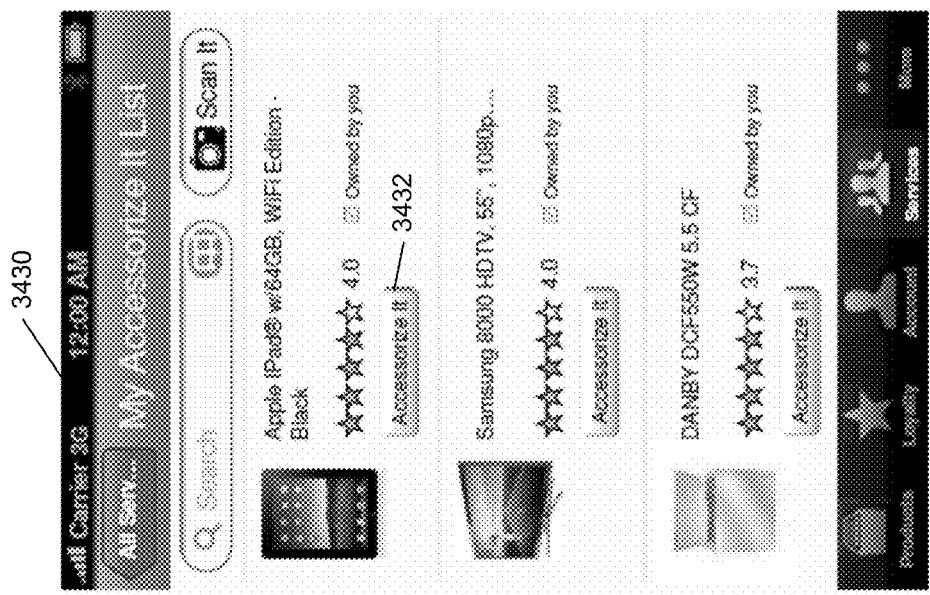

Referring now to FIGS. 34E and 34F, a user can also obtain support services from the support center to obtain information about accessories associated with a particular product. In one embodiment, GUI page 3430 can be displayed via link 3410 of FIG. 34A. GUI page 3430 includes a list of products that have been registered. Each of the listed products includes a button to accessorize the corresponding product such as button 3432. When the button, in this example, button 3432, is activated, GUI page 3434 is displayed. In one embodiment, GUI page 3434 includes a list of accessories 3436 including retailers from which the accessories can be purchased (e.g., via link 3414 of FIG. 34A). All of the information is obtained and provided by the support center, where the support center communicates with each of the retailers via a proper API to obtain the detailed information as described above, without requiring user's manual efforts.

Figures 34G, 34H:
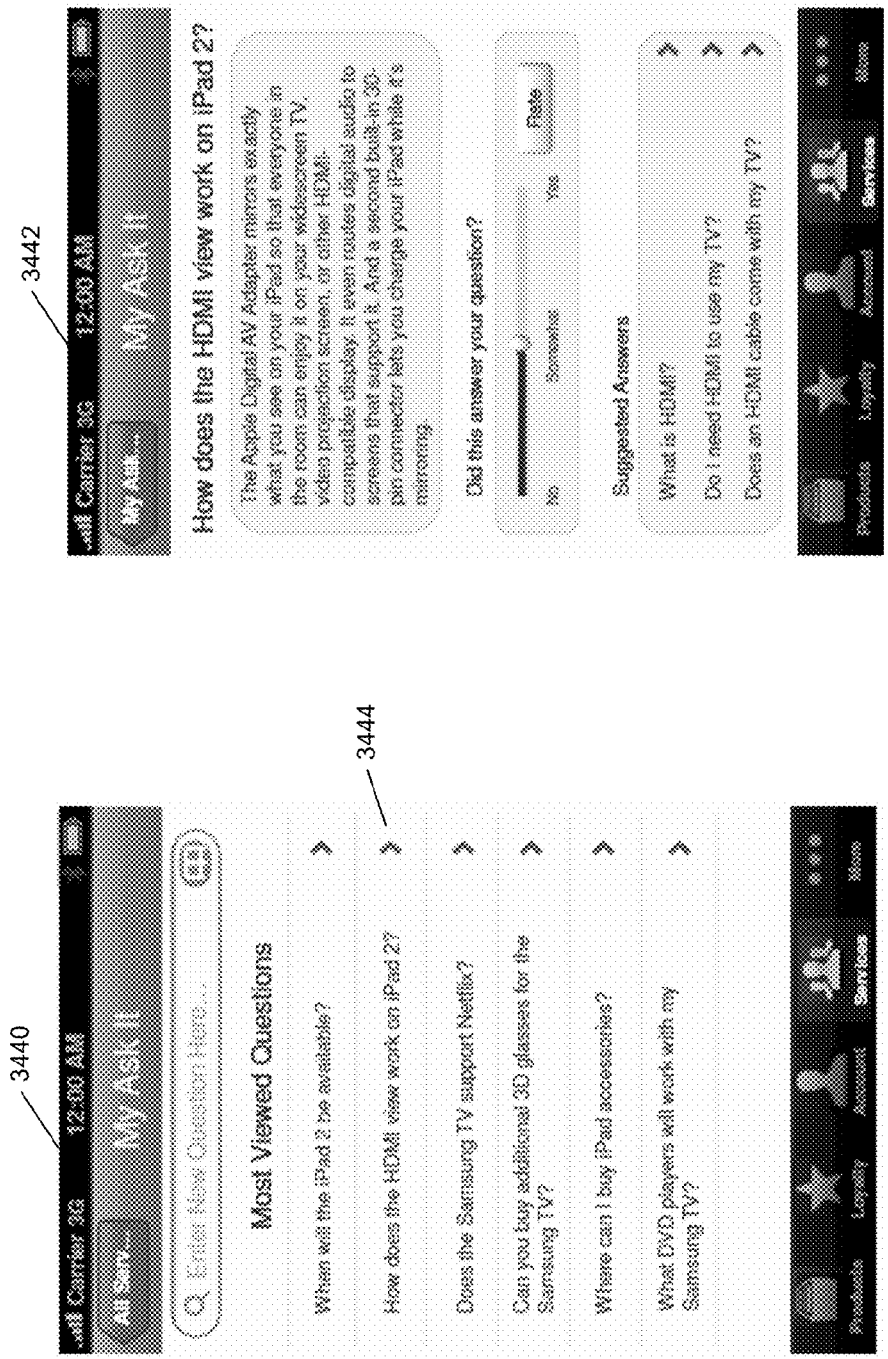
Figure 34J:
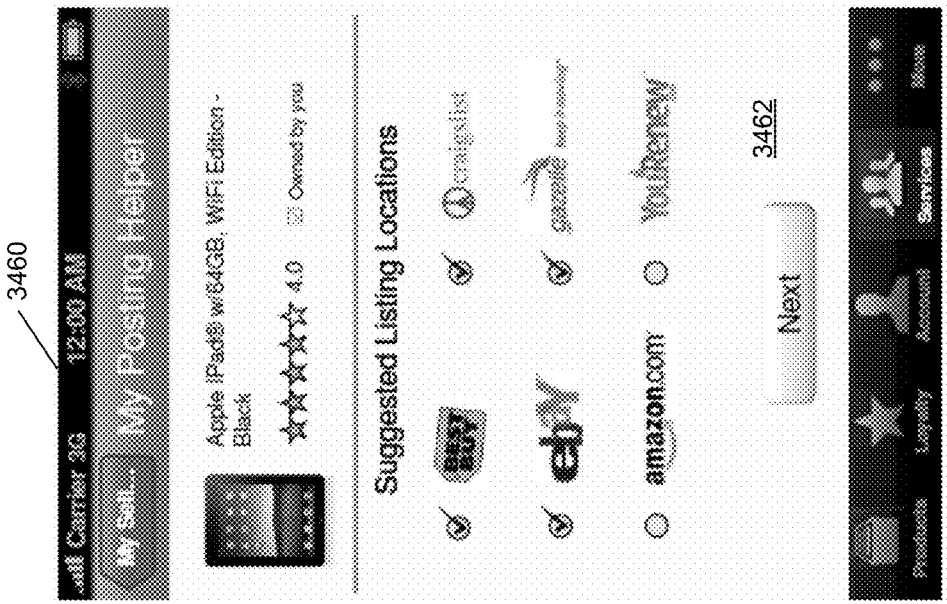

According to one embodiment, a user can also access self-support knowledge such as most asked questions via link 3408 of FIG. 34A. When link 3408 is activated, GUI page 3440 of FIG. 34G is displayed. GUI page 3440 includes a list of answers to most viewed questions asked by other users on the same or similar product. The information may be compiled by the support center (e.g., self-support modules 2205-2206 of FIG. 22) based on data collected from a variety of informational sources as described above. The list of articles displayed may also be compiled based on user's profile such as registered products and/or historical interaction or purchases. Detailed answers to each of questions such as question 3444 can be displayed (in this example as GUI page 3442) via the corresponding link as shown in FIG. 34H. Referring to FIG. 34H, an article concerning detailed answer is displayed on the GUI page. In addition, the user can rate the article, which contributes to the overall rating of the article. Further, based on the article, the system also compiles and provides a list of suggested articles that may be related to the currently displayed article or is the next typical article other users have reviewed in conjunction with the first.

Figure 34I:
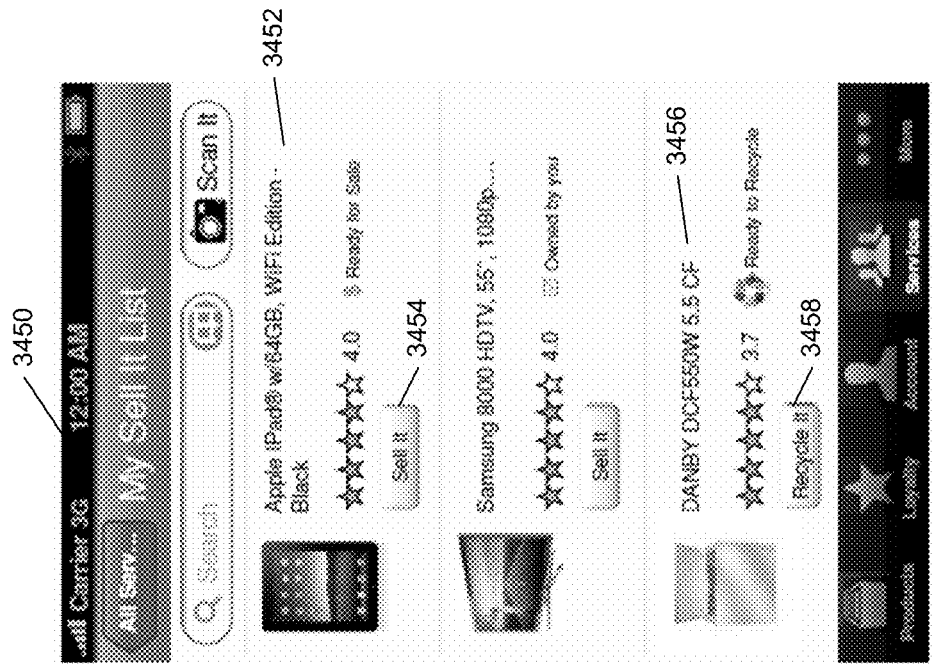
Figure 34L:
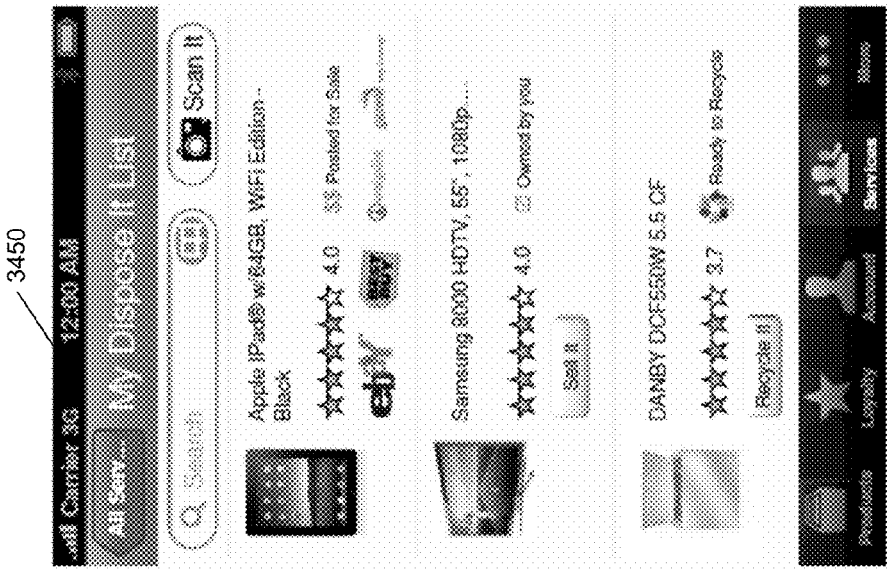
Figure 34K:
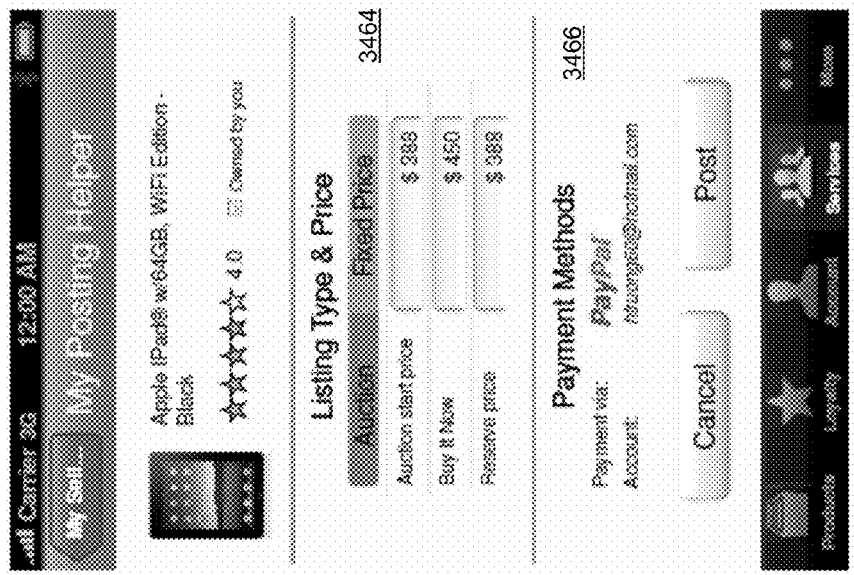

According to one embodiment, for each of the registered products, the support center can also provide services to a user to sell the product at a variety of ecommerce platforms. In one embodiment, a user can activate link 3416 to arrange selling one or more of its registered products. When link 3416 is activated, selling GUI page 3450 is displayed as shown in FIG. 34I. GUI page 3450 lists all the products that have been registered with the support center. A user can sell any one of them by activating a sell button of the corresponding product. For example, a user can sell product 3452 by activating sell button 3454, which displays GUI page 3460 as a posting helper. From GUI page 3460, the user can specify one or more selling platforms or venues to sell the corresponding product. The user can also specify the selling or auction price 3464 and payment method 3466 as shown in FIG. 34K. In one embodiment, the posting helper provides a user interface to query the user concerning certain conditions of the product to be sold. Based on the condition information received from the user, the system can estimate a market price to be sold or auctioned. Such an estimate may be generated by the system based on the market condition and/or other users' transactions on similar products. After the sale has been posted, the selected selling platforms are also displayed on GUI page 3450 as shown in FIG. 34L.

Referring back to FIG. 34I, for some products such as product 3456, based on the available information, the processing logic may determine that it is time to recycle the product. In one embodiment, when a user attempts selling or disposing a product, a disposal helper may be displayed and utilized to collect condition information of the product. Based on the information received from the user and the market condition, the disposal helper may suggest whether the product should be disposed or sold. If the system determines that the product should be disposed, recycle button 3458 is displayed, which when activated, the processing logic is configured to arrange a recycle vendor to pick up and/or dispose the corresponding product. The disposal helper may further provide suggestions to dispose if the user decides to dispose itself. As a result, the user does not have to individually find a recycling vendor to handle the recycle. Note that the disposal GUI can also be displayed via link 3418 of FIG. 34A. Note that GUIs as shown in FIGS. 31A-31D, 32A-32F, 33A-33D, and 34A-34L are shown and described for the purposes of illustration only; other formats or layouts may also be applied herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for product support services, the method comprising:

receiving, at a services application programming interface (API) of a support center, a first request from a first user for support services of a first product provided by a first client of the support center, wherein the support center provides support services for a plurality of products provided on behalf a plurality of clients, wherein each of the plurality of clients represents one of a product manufacturer, a product distributer, and a product retailer of the products, wherein the first user has purchased the first product from the first client and has registered the first product with the support center for support services;

receiving, at the services API of the support center, a second request from a second user for support services of a second product provided by a second client of the support center, wherein the second user has purchased the second product from the second client and has registered the second product with the support center for support services;

identifying a first knowledgebase (KB) associated with the first client and a second KB associated with the second client, wherein the first KB contains information describing one or more solutions of one or more problems of the first product that have been previously identified and the first KB has been compiled specifically tailored to the first client's needs, and wherein the second KB contains information describing one or more solutions of one or more problems of the second product that have been previously identified and the second KB has been compiled specifically tailored to the second client's needs;

identifying a third KB that contains information describing one or more technical solutions to one or more technical problems common to the first product and the second product, but are not specifically related to the first client and the second client;

enabling the first KB and the third KB to be accessible by a first agent assigned to provide support services of the first product to the first user without exposing the second KB to the second agent;

enabling the second KB and the third KB to be accessible by a second agent assigned to provide support services of the second product to the second user without exposing the first KB to the first agent;

establishing a first communication session between the first user and the first agent to enable the first agent to conduct a live support session to provide support services of the first product to the first user using the first KB and the third KB; and establishing a second communication session between the second user and the second agent to enable the second agent to conduct a live support session to provide support services of the second product to the second user using the second KB and the third KB, such that confidential information of the first KB of the first client and the second KB of the second client is not shared across different clients during the first live session and the second live session.

2. The method of claim 1, further comprising:

in response to the first request, creating a first touch plan describing a first outline of support services to be provided to the first user, wherein the first touch plan includes first access control information pertaining to the first KB and the third KB; and transmitting the first touch plan to the first agent to allow the first agent to access the first KB and the third KB based on the first access control information.

3. The method of claim 2, wherein the first access control information is configured to prevent the first agent from accessing the second KB.

4. The method of claim 2, further comprising:

in response to the second request, creating a second touch plan describing a second outline of support services to be provided to the second user, wherein the second touch plan includes second access control information pertaining to the second KB and the third KB; and transmitting the second touch plan information to the second agent to allow the second agent to access the second KB and the third KB based on the second access control information.

5. The method of claim 4, wherein the second access control information is configured to prevent the second agent from accessing the first KB.

6. The method of claim 1, wherein data stored in the first KB has been flagged to be specifically utilized for supporting the first product by an administrator of the first client, wherein data stored in the second KB has been flagged to be specifically utilized for supporting the second product by an administrator of the second client, and wherein data stored in the third KB has been flagged to be utilized for supporting the first and second products by administrators of the first and second clients.

7. The method of claim 1, wherein the first request is originated from a first one-touch application installed on a first mobile device of the first user, the first user being identified based on a device identifier (ID) of the first mobile device without having the first user to specifically provide user information, and wherein the second request is originated from a second one-touch application installed on a second mobile device of the second user, the second user being identified based on a device identifier (ID) of the second mobile device without having the second user to specifically provide user information.

8. A non-transitory computer-readable storage medium having instructions stored therein, which when executed by a computer, cause the computer to perform a method for product support services, the method comprising:

receiving, at a services application programming interface (API) of a support center, a first request from a first user for support services of a first product provided by a first client of the support center, wherein the support center provides support services for a plurality of products provided on behalf of a plurality of clients, wherein each of the plurality of clients represents one of a product manufacturer, a product distributer, and a product retailer of the products, wherein the first user has purchased the first product from the first client and has registered the first product with the support center for support services;

receiving, at the services API of the support center, a second request from a second user for support services of a second product provided by a second client of the support center, wherein the second user has purchased the second product from the second client and has registered the second product with the support center for support services;

identifying a first knowledgebase (KB) associated with the first client and a second KB associated with the second client, wherein the first KB contains information describing one or more solutions of one or more problems of the first product that have been previously identified and the first KB has been compiled specifically tailored to the first client's needs, and wherein the second KB contains information describing one or more solutions of one or more problems of the second product that have been previously identified and the second KB has been compiled specifically tailored to the second client's needs;

identifying a third KB that contains information describing one or more technical solutions to one or more technical problems common to the first product and the second product, but are not specifically related to the first client and the second client;

enabling the first KB and the third KB to be accessible by a first agent assigned to provide support services of the first product to the first user without exposing the second KB to the second agent; and enabling the second KB and the third KB to be accessible by a second agent assigned to provide support services of the second product to the second user without exposing the first KB to the first agent;

establishing a first communication session between the first user and the first agent to enable the first agent to conduct a live support session to provide support services of the first product to the first user using the first KB and the third KB; and establishing a second communication session between the second user and the second agent to enable the second agent to conduct a live support session to provide support services of the second product to the second user using the second KB and the third KB, such that confidential information of the first KB of the first client and the second KB of the second client is not shared across different clients during the first live session and the second live session.

9. The computer-readable storage medium of claim 8, wherein the method further comprises:

in response to the first request, creating a first touch plan describing a first outline of support services to be provided to the first user, wherein the first touch plan includes first access control information pertaining to the first KB and the third KB; and transmitting the first touch plan to the first agent to allow the first agent to access the first KB and the third KB based on the first access control information.

10. The computer-readable storage medium of claim 9, wherein the first access control information is configured to prevent the first agent from accessing the second KB.

11. The computer-readable storage medium of claim 9, wherein the method further comprises:

in response to the second request, creating a second touch plan describing a second outline of support services to be provided to the second user, wherein the second touch plan includes second access control information pertaining to the second KB and the third KB; and transmitting the second touch plan to the second agent to allow the second agent to access the second KB and the third KB based on the second access control information.

12. The computer-readable storage medium of claim 11, wherein the second access control information is configured to prevent the second agent from accessing the first KB.

13. The computer-readable storage medium of claim 8, wherein data stored in the first KB has been flagged to be specifically utilized for supporting the first product by an administrator of the first client, wherein data stored in the second KB has been flagged to be specifically utilized for supporting the second product by an administrator of the second client, and wherein data stored in the third KB has been flagged to be utilized for supporting the first and second products by administrators of the first and second clients.

14. The computer-readable storage medium of claim 8, wherein the first request is originated from a first one-touch application installed on a first mobile device of the first user, the first user being identified based on a device identifier (ID) of the first mobile device without having the first user to specifically provide user information, and wherein the second request is originated from a second one-touch application installed on a second mobile device of the second user, the second user being identified based on a device identifier (ID) of the second mobile device without having the second user to specifically provide user information.

15. A system for product support services provided by a support center, the system comprising:
    a processor;
    a memory coupled to the processor;
    a services application programming interface (API), executed in the memory by the processor, to receive a first request from a first user for support services of a first product provided by a first client of a support center, the support center providing support services for a plurality of products provided on behalf of a plurality of clients, wherein the services API is configured to receive a second request from a second user for support services of a second product provided by a second client of the support center, wherein each of the plurality of clients represents one of a product manufacturer, a product distributer, and a product retailer of the products, wherein the first user has purchased the first product from the first client and has registered the first product with the support center for support services, and wherein the second user has purchased the second product from the second client and has registered the second product with the support center for support services;
    a knowledge manager, executed in the memory by the processor, coupled to the services API to identify a first knowledgebase (KB) associated with the first client, a second KB associated with the second client, and a third KB that contains information describing one or more technical solutions to one or more technical problems common to the first product and the second product, but are not specifically related to the first client and the second client, wherein the first KB contains information describing one or more solutions of one or more problems of the first product that have been previously identified and the first KB has been compiled specifically tailored to the first client's needs, and wherein the second KB contains information describing one or more solutions of one or more problems of the second product that have been previously identified and the second KB has been compiled specifically tailored to the second client's needs;
    an access control module, executed in the memory by the processor, coupled to the knowledge manager to enable the first KB and the third KB to be accessible by a first agent assigned to provide support services of the first product to the first user without exposing the second KB to the second agent and to enable the second KB and the third KB to be accessible by a second agent assigned to provide support services of the second product to the second user without exposing the first KB to the first agent; and
    a multi-channel communication system to establish a first communication session between the first user and the first agent to enable the first agent to conduct a live support session to provide support services of the first product to the first user using the first KB and the third KB, and to establish a second communication session between the second user and the second agent to enable the second agent to conduct a live support session to provide support services of the second product to the second user using the second KB and the third KB, such that confidential information of the first KB of the first client and the second KB of the second client is not shared across different clients during the first live session and the second live session.

16. The system of claim 15, further comprising a touch plan engine, in response to the first request, to create a first touch plan describing a first outline of support services to be provided to the first user, wherein the first touch plan includes first access control information pertaining to the first KB and the third KB, and wherein the touch plan engine is configured to transmit the first touch plan to the first agent to allow the first agent to access the first KB and the third KB based on the first access control information.

17. The system of claim 16, wherein the first access control information is configured to prevent the first agent from accessing the second KB.

18. The system of claim 16, wherein the touch plan engine is further configured to
    in response to the second request, create a second touch plan describing a second outline of support services to be provided to the second user, wherein the second touch plan includes second access control information pertaining to the second KB and the third KB, and
    transmit the second touch plan to the second agent to allow the second agent to access the second KB and the third KB based on the second access control information.

19. The system of claim 18, wherein the second access control information is configured to prevent the second agent from accessing the first KB.

20. The system of claim 15, wherein data stored in the first KB has been flagged to be specifically utilized for supporting the first product by an administrator of the first client, wherein data stored in the second KB has been flagged to be specifically utilized for supporting the second product by an administrator of the second client, and wherein data stored in the third KB has been flagged to be utilized for supporting the first and second products by administrators of the first and second clients.

21. The system of claim 15, wherein the first request is originated from a first one-touch application installed on a first mobile device of the first user, the first user being identified based on a device identifier (ID) of the first mobile device without having the first user to specifically provide user information, and wherein the second request is originated from a second one-touch application installed on a second mobile device of the second user, the second user being identified based on a device identifier (ID) of the second mobile device without having the second user to specifically provide user information.

* * * * *